United States Patent
Adams et al.

(10) Patent No.: US 9,605,478 B2
(45) Date of Patent: *Mar. 28, 2017

(54) MOTORIZED WINDOW TREATMENT

(71) Applicant: Lutron Electronics Co., Inc., Coopersburg, PA (US)

(72) Inventors: Jason O. Adams, Emmaus, PA (US); Edward J. Blair, Telford, PA (US); Andrew Karl Cooney, Quakertown, PA (US); Soumya Jain, Alentown, PA (US); David A. Kirby, Zionsville, PA (US); Stephen Lundy, Coopersburg, PA (US); Justin J. Mierta, Allentown, PA (US); Daniel W. Mistarz, Allentown, PA (US); Robert C. Newman, Jr., Emmaus, PA (US); Peter W. Ogden, Jr., Breinigsville, PA (US); Jonathan L. Roe, Coopersburg, PA (US); Chen Ming Wu, Emmaus, PA (US); Justin M. Zernhelt, Northampton, PA (US)

(73) Assignee: Lutron Electronics Co., Inc., Coopersburg, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/579,024

(22) Filed: Dec. 22, 2014

(65) Prior Publication Data

US 2015/0159433 A1 Jun. 11, 2015

Related U.S. Application Data

(62) Division of application No. 13/415,084, filed on Mar. 8, 2012, now Pat. No. 8,950,461.

(Continued)

(51) Int. Cl.
*E06B 9/262* (2006.01)
*E06B 9/38* (2006.01)
(Continued)

(52) U.S. Cl.
CPC .......... *E06B 9/38* (2013.01); *E06B 9/32* (2013.01); *E06B 9/322* (2013.01); *E06B 9/68* (2013.01);
(Continued)

(58) Field of Classification Search
CPC ..... E06B 2009/6809; E06B 2009/6818; E06B 2009/6845; E06B 9/68; E06B 9/70
(Continued)

(56) References Cited

U.S. PATENT DOCUMENTS 2,802,523 A   8/1957   Anderle
3,169,006 A   2/1965   Lorentzen et al.
(Continued)

FOREIGN PATENT DOCUMENTS

CN   2141456   9/1993
CN   1104289   6/1995
(Continued)

OTHER PUBLICATIONS

Dataweek Electronics & Communications Technology; Issue Date Jun. 4, 2003; Voltage detector IC helps prevent battery leakage; Technews Publishing (Pty) Ltd; http://www.dataweek.co.za/news.aspx?pklnewsid=10676.
(Continued)

*Primary Examiner* — David Purol
(74) *Attorney, Agent, or Firm* — Mark Rose; Philip Smith

(57) ABSTRACT

A motorized window treatment provides a low-cost solution for controlling the amount of daylight entering a space through a window. The window treatment includes a covering material, a drive shaft, at least one lift cord rotatably received around the drive shaft and connected to the covering material, and a motor coupled to the drive shaft for raising and lowering the covering material. The window treatment also includes a spring assist unit for assisting the (Continued)

motor by providing a torque that equals the torque provided by the weight on the cords that lift the covering material at a position midway between fully-open and fully-closed positions, which helps to minimize motor usage and conserve battery life if a battery is used to power the motorized window treatment. The window treatment may comprise a photosensor for measuring the amount of daylight outside the window and temperature sensors for measuring the temperatures inside and outside of the window. The position of the covering material may be automatically controlled in response to the photosensor and the temperature sensors to save energy, or may also be controlled in response to an infrared or radio-frequency remote control.

62 Claims, 35 Drawing Sheets

Related U.S. Application Data

(60) Provisional application No. 61/451,960, filed on Mar. 11, 2011, provisional application No. 61/530,799, filed on Sep. 2, 2011, provisional application No. 61/547,319, filed on Oct. 14, 2011.

(51) Int. Cl.
  *E06B 9/32* (2006.01)
  *E06B 9/322* (2006.01)
  *H04W 52/02* (2009.01)
  *E06B 9/70* (2006.01)
  *E06B 9/72* (2006.01)
  *E06B 9/62* (2006.01)
  *E06B 9/68* (2006.01)

(52) U.S. Cl.
  CPC ............... *E06B 9/70* (2013.01); *E06B 9/72* (2013.01); *H04W 52/0238* (2013.01); *H04W 52/0245* (2013.01); *E06B 9/62* (2013.01); *E06B 2009/2625* (2013.01); *E06B 2009/6818* (2013.01); *E06B 2009/6872* (2013.01); *H04W 52/0287* (2013.01); *Y02B 60/50* (2013.01); *Y02B 80/50* (2013.01)

(58) Field of Classification Search
  USPC ......... 160/84.02, 168.1 P, 170, 171, DIG. 17
  See application file for complete search history.

(56) References Cited

U.S. PATENT DOCUMENTS

| | | | |
|---|---|---|---|
| 4,395,135 A | 7/1983 | Frantz |
| 5,063,984 A | 11/1991 | Cherveny |
| 5,134,347 A | 7/1992 | Koleda |
| 5,212,478 A | 5/1993 | Moseley |
| 5,391,967 A | 2/1995 | Domel et al. |
| 5,406,176 A | 4/1995 | Sugden |
| 5,413,161 A | 5/1995 | Corazzini |
| 5,467,808 A | 11/1995 | Bell |
| 5,482,100 A | 1/1996 | Kuhar |
| 5,531,257 A | 7/1996 | Kuhar |
| 5,682,157 A | 10/1997 | Asmussen et al. |
| 5,760,558 A | 6/1998 | Popat |
| 5,793,174 A | 8/1998 | Kovach et al. |
| 5,848,634 A | 12/1998 | Will et al. |
| 5,883,480 A | 3/1999 | Domel et al. |
| 5,982,519 A | 11/1999 | Martnelli et al. |
| 5,990,646 A | 11/1999 | Kovach et al. |
| 6,057,658 A | 5/2000 | Kovach et al. |
| 6,064,949 A | 5/2000 | Werner et al. |
| 6,121,889 A | 9/2000 | Janda et al. |
| 6,181,089 B1 | 1/2001 | Kovach et al. |
| 6,199,617 B1 | 3/2001 | Schweiss |
| 6,259,218 B1 | 7/2001 | Kovach et al. |
| 6,369,530 B2 | 4/2002 | Kovach et al. |
| 6,433,498 B1 | 8/2002 | Domel et al. |
| 6,497,267 B1 | 12/2002 | Azar et al. |
| 6,545,434 B2 | 4/2003 | Sembhi et al. |
| 6,580,017 B1 | 6/2003 | Echelard et al. |
| 6,605,910 B2 | 8/2003 | Mullet et al. |
| 6,781,335 B2 | 8/2004 | Osinga et al. |
| 6,812,662 B1 | 11/2004 | Walker |
| 6,819,081 B2 | 11/2004 | Izawa et al. |
| 6,984,951 B2 | 1/2006 | Osinga et al. |
| 7,389,806 B2 | 6/2008 | Kates |
| 7,401,634 B2 | 7/2008 | Kovach et al. |
| 7,417,785 B2 | 8/2008 | Malvino |
| 7,424,905 B2 | 9/2008 | Lai |
| 7,466,090 B2 | 12/2008 | Meewis et al. |
| 7,617,857 B2 | 11/2009 | Froese |
| 7,673,667 B2 | 3/2010 | Domel et al. |
| 7,719,215 B2 | 5/2010 | Meewis et al. |
| 7,772,798 B2 | 8/2010 | Rodas et al. |
| 7,783,277 B2 | 8/2010 | Walker et al. |
| 7,839,109 B2 | 11/2010 | Carmen, Jr. et al. |
| 7,940,167 B2 | 5/2011 | Steiner et al. |
| 7,971,086 B2 | 6/2011 | Itkin |
| 7,975,748 B2 | 7/2011 | Yu et al. |
| 8,009,042 B2 | 8/2011 | Steiner et al. |
| 8,950,461 B2 * | 2/2015 | Adams ..................... E06B 9/32 |
| | | | 160/1 |
| 2005/0087394 A1 | 4/2005 | Toti |
| 2005/0215210 A1 | 9/2005 | Walker et al. |
| 2007/0089841 A1 | 4/2007 | Rossato et al. |
| 2008/0128097 A1 | 6/2008 | Yu |
| 2008/0150461 A1 | 6/2008 | Adamus et al. |
| 2008/0202708 A1 | 8/2008 | Opendo |
| 2008/0204856 A1 | 8/2008 | Malvino |
| 2008/0236763 A1 | 10/2008 | Kates |
| 2008/0260363 A1 | 10/2008 | Carmen et al. |
| 2009/0174217 A1 | 7/2009 | Lawall et al. |
| 2009/0199975 A1 | 8/2009 | Yeh |
| 2009/0251352 A1 | 10/2009 | Altonen et al. |
| 2009/0308543 A1 | 12/2009 | Kates |
| 2010/0052574 A1 | 3/2010 | Blakeley et al. |
| 2010/0052576 A1 | 3/2010 | Steiner et al. |
| 2010/0154999 A1 | 6/2010 | Oh et al. |
| 2010/0225240 A1 | 9/2010 | Shearer et al. |
| 2010/0244709 A1 | 9/2010 | Steiner et al. |
| 2010/0269988 A1 | 10/2010 | Mullet et al. |
| 2011/0080110 A1 | 4/2011 | Nuhfer et al. |
| 2011/0203748 A1 | 8/2011 | Mullet et al. |
| 2011/0272106 A1 | 11/2011 | Mullet et al. |
| 2012/0032626 A1 | 2/2012 | Tranchand et al. |
| 2012/0068686 A1 | 3/2012 | Steiner et al. |
| 2012/0073765 A1 | 3/2012 | Hontz et al. |
| 2012/0125543 A1 | 5/2012 | Chambers et al. |

FOREIGN PATENT DOCUMENTS

| | | |
|---|---|---|
| CN | 101-317203 | 10/2008 |
| CN | 101824958 | 9/2010 |
| DE | 2209249 | 9/2009 |
| EP | 08886030 | 6/1998 |
| EP | 2209249 | 7/2010 |
| WO | WO 97/18501 | 5/1997 |
| WO | WO 2005/093682 | 10/2005 |
| WO | WO 2007/055574 | 5/2007 |

OTHER PUBLICATIONS

Freescale Semiconductor Application Note AN3053; Rev. 1, Mar. 2008; Infrared Remote Control Techniques on MC9S08RC/RD/RE/RG Family; by Pavel Lajsner; Freescale Semiconductor, Inc., 2005, 2008.
Texas Instruments; LM317; SLVS044U—Sep. 1997—Revised Apr. 2008; 3-Terminal Adjustable Regulator.
International Search Report and Written Opinion dated Nov. 15, 2012 in corresponding International Application No. PCT/US2012/028315.
International Preliminary Report on Patentability dated Sep. 26, 2013 issued in PCT International Application No. PCT/US12/028329.

(56) References Cited

OTHER PUBLICATIONS

Chinese Office Action dated Dec. 31, 2014 issued in related Chinese Patent Application No. 201280012632.9.
Chinese Office Action and Written Opinion dated Nov. 4, 2015 issued in related Chinese Patent Application No. 201410483953.8.

* cited by examiner

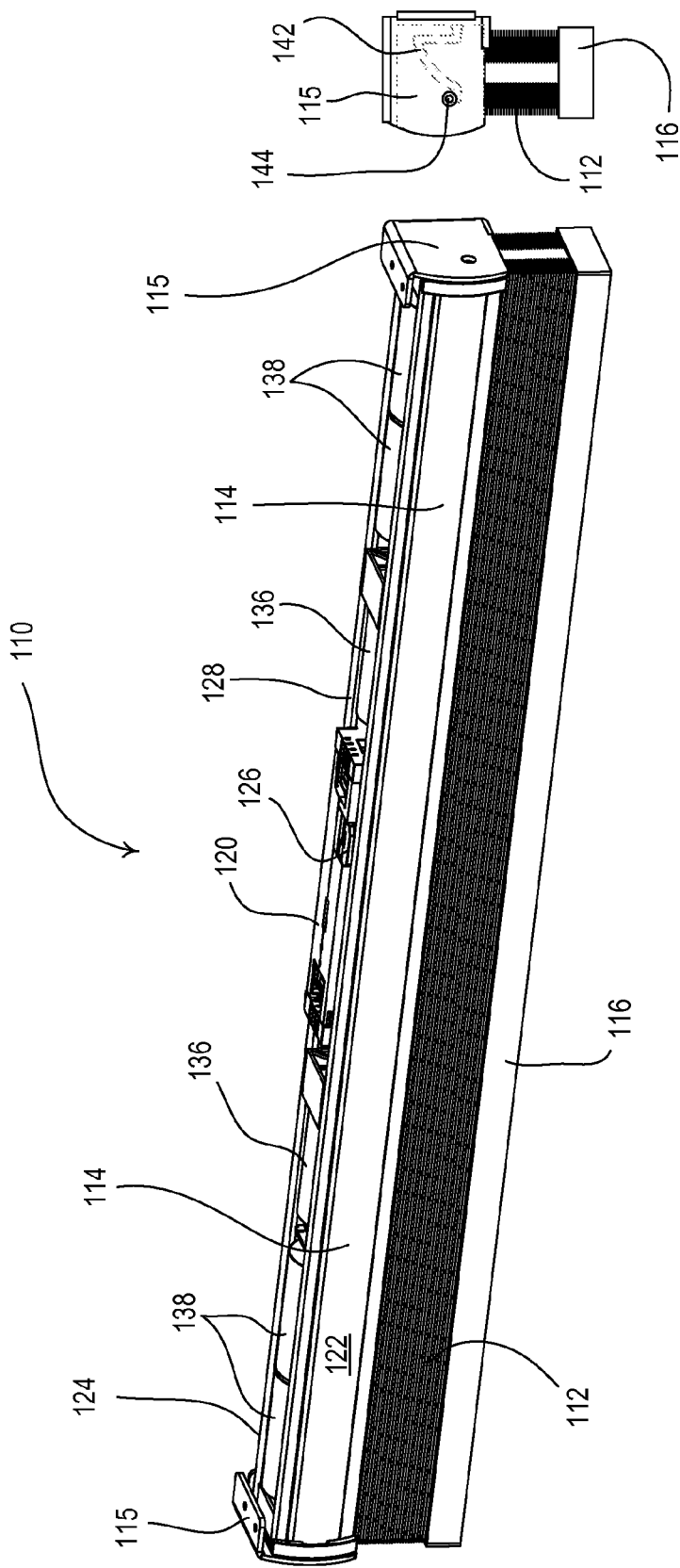

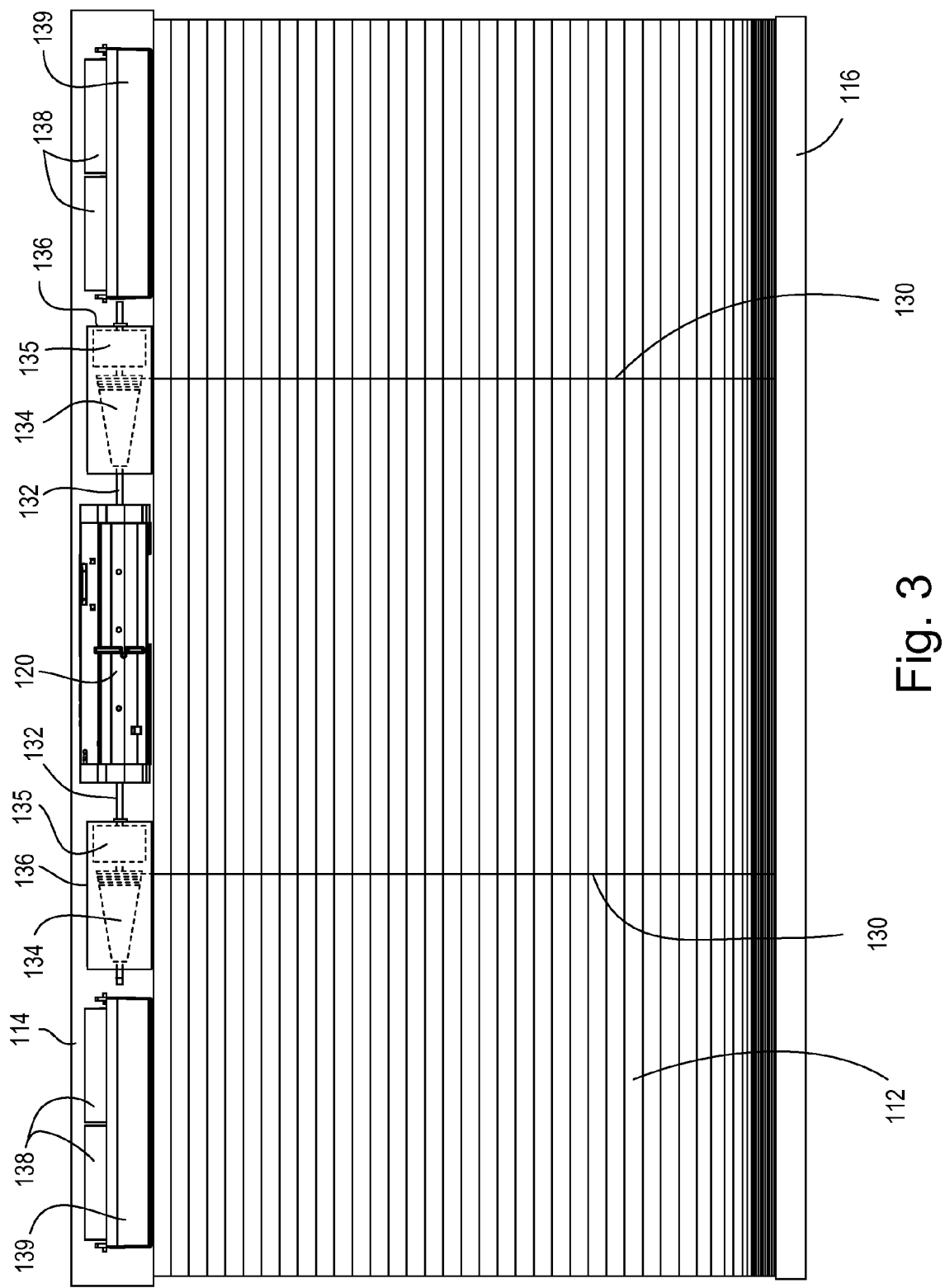

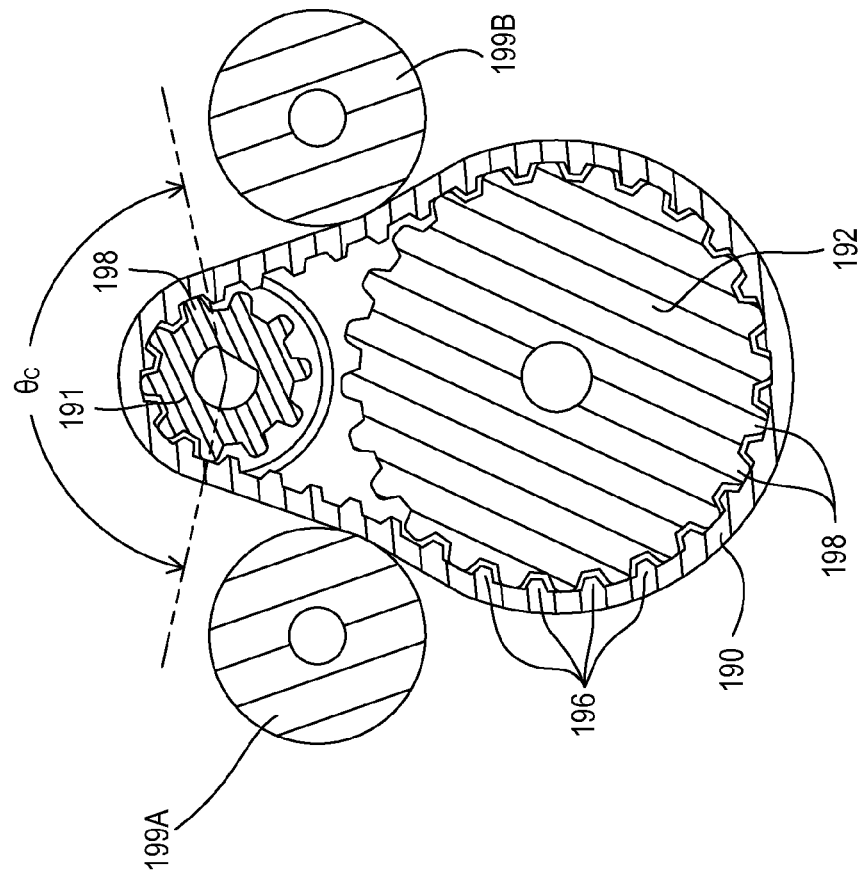
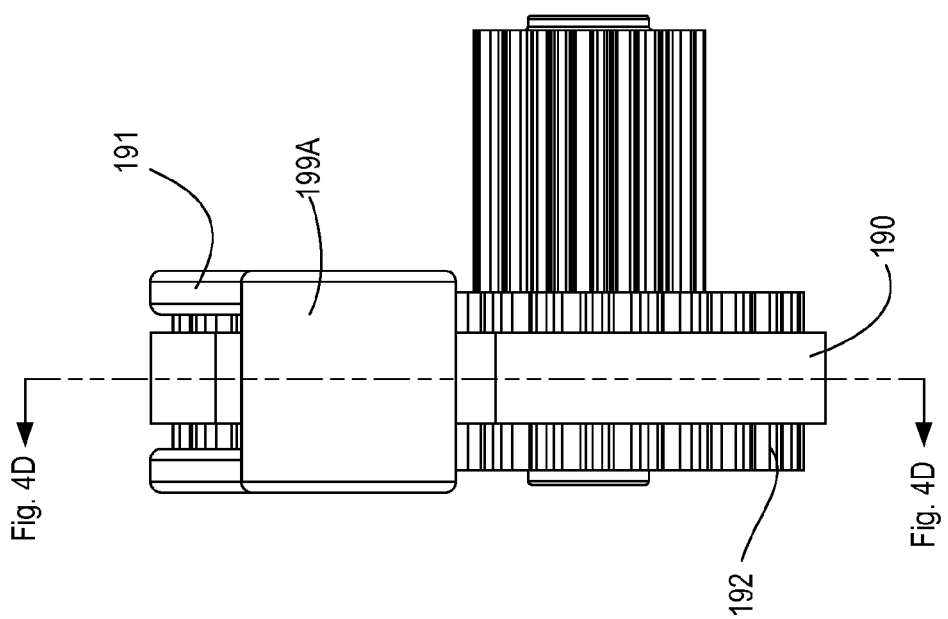
Fig. 4D
Fig. 4C

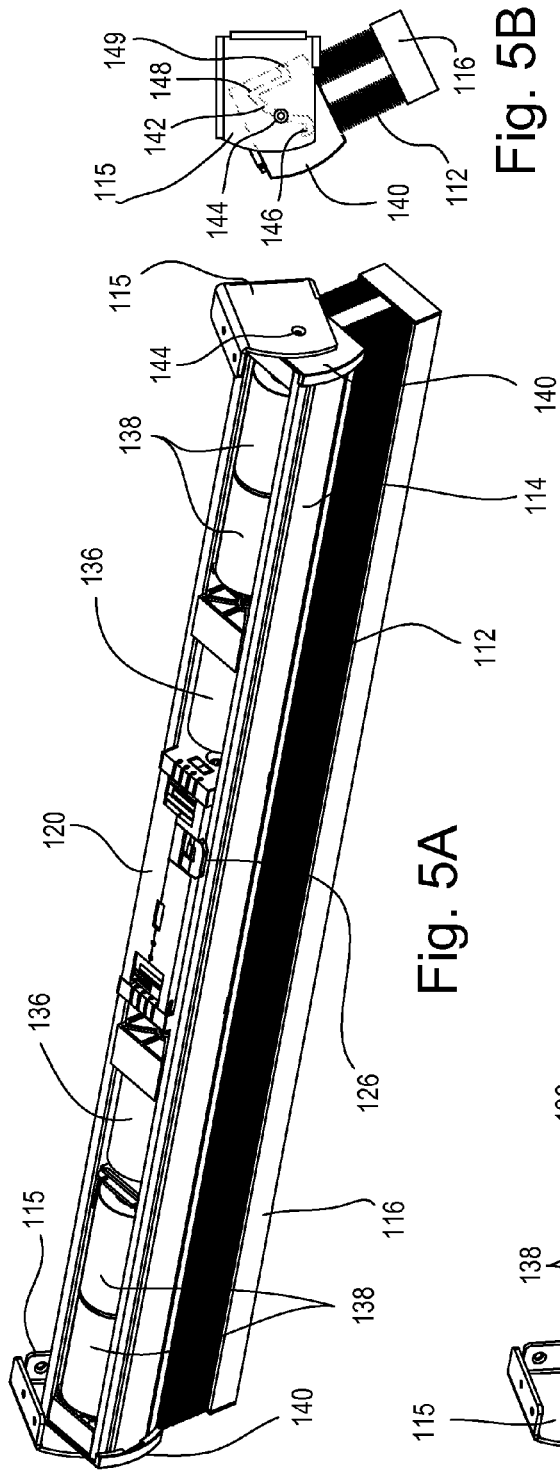

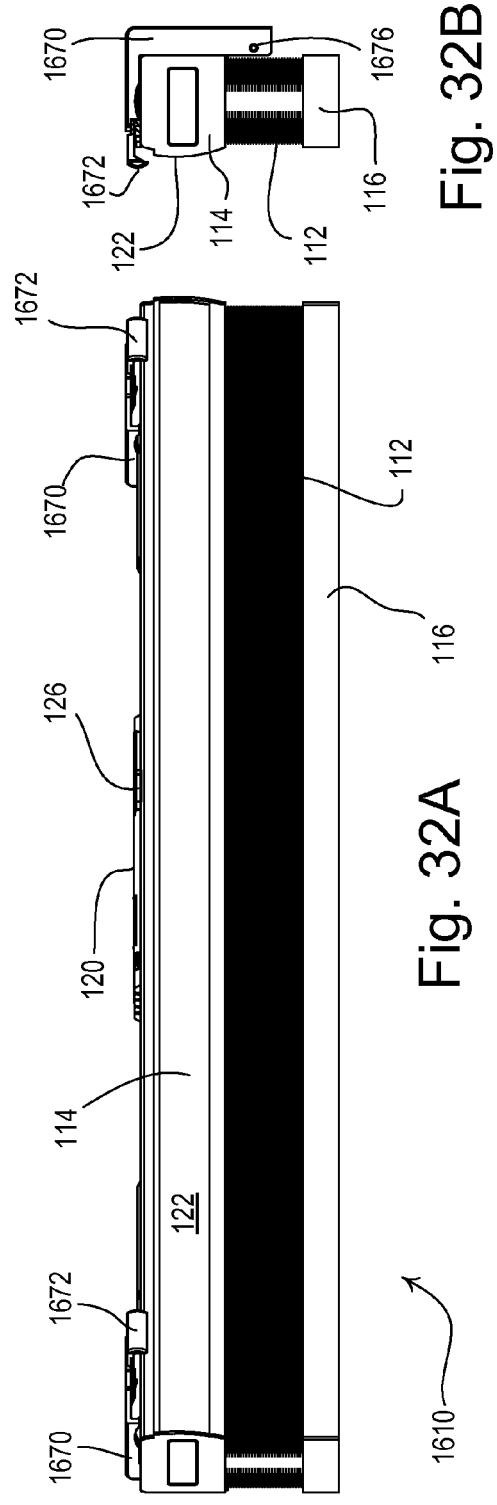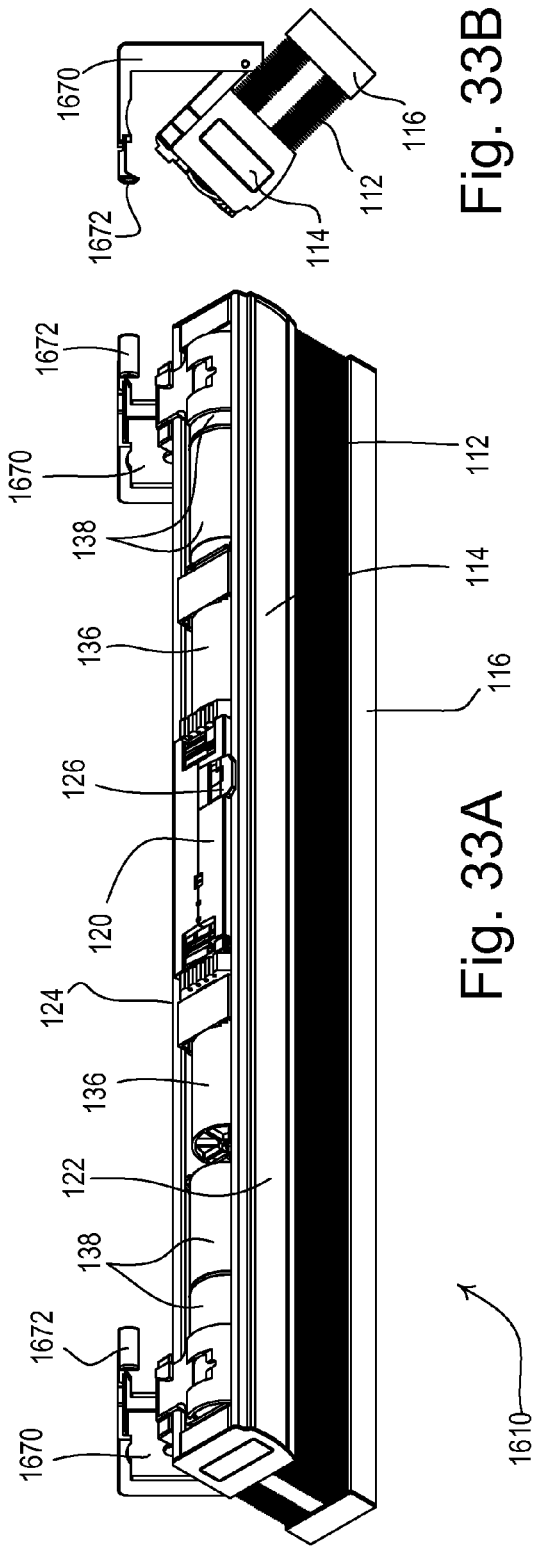

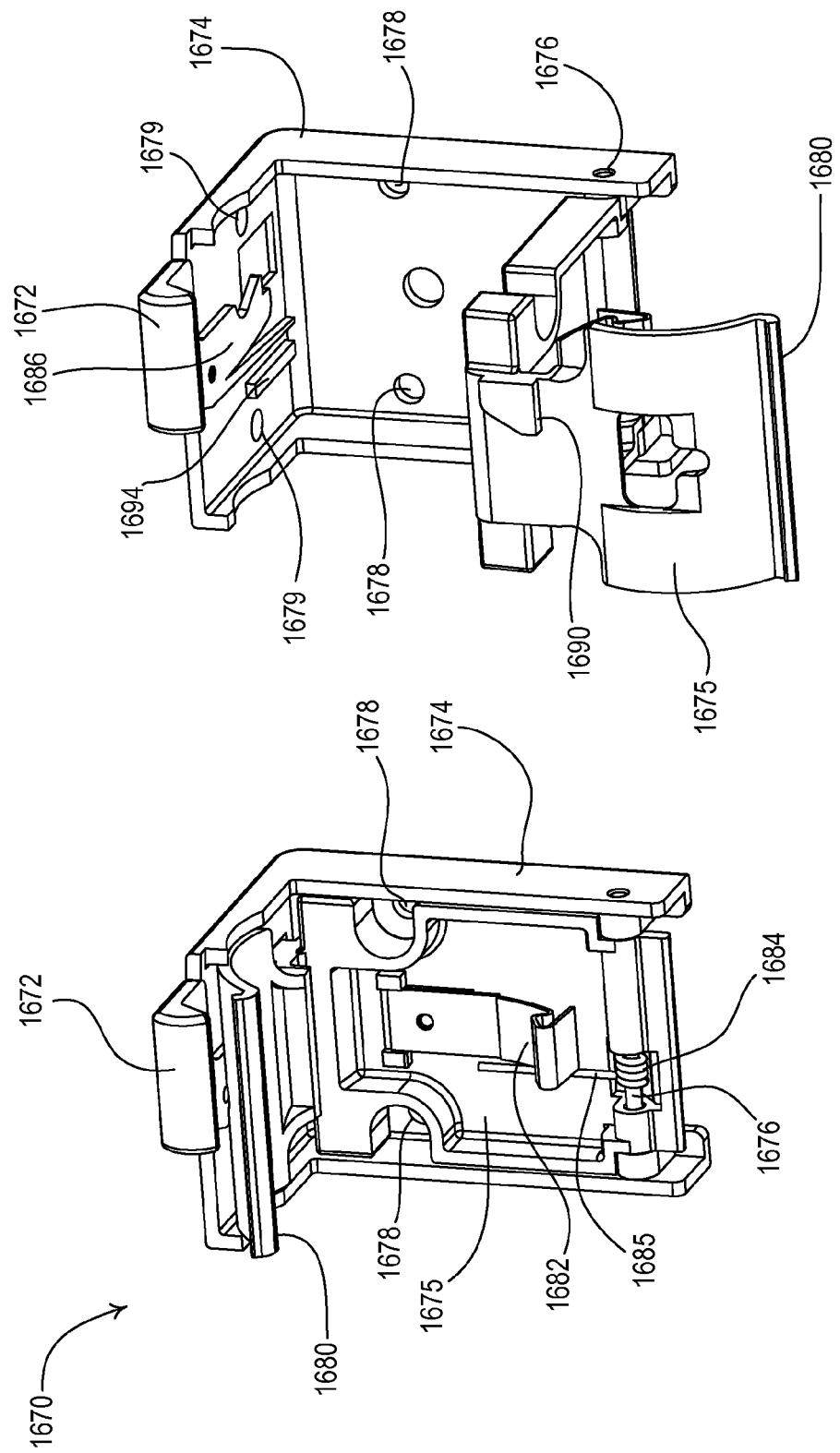

MOTORIZED WINDOW TREATMENT

CROSS REFERENCE TO RELATED APPLICATIONS

This is a divisional of commonly-assigned U.S. patent application Ser. No. 13/415,084, filed Mar. 8, 2012, entitled MOTORIZED WINDOW TREATMENT, which is a non-provisional application of commonly-assigned U.S. Provisional Application No. 61/451,960, filed Mar. 11, 2011; U.S. Provisional Application No. 61/530,799, filed Sep. 2, 2011; and U.S. Provisional Application No. 61/547,319, filed Oct. 11, 2011, all entitled MOTORIZED WINDOW TREATMENT, the entire disclosures of which are hereby incorporated by reference.

BACKGROUND OF THE INVENTION

Field of the Invention

The present invention relates to a motorized window treatment, and more specifically, to a low-cost, quiet, battery-powered motorized window treatment that is characterized by an ultra-low power consumption that makes battery power more convenient for a user and results in long and practical battery lifetimes. In addition, the present invention relates to a battery-powered motorized window treatment that is controlled in response to wireless input signals and may be installed without requiring any additional wiring.

Description of the Related Art

Motorized window treatments typically include a flexible fabric or other means for covering a window in order to block or limit the daylight entering a space and to provide privacy. The motorized window treatments may comprise roller shades, cellular shades, Roman shades, Venentian blinds, and draperies. The motorized window treatments include a motor drive for movement of the fabric in front of the window to control the amount of the window that is covered by the fabric. For example, a motorized roller shade includes a flexible shade fabric wound onto an elongated roller tube with an electronic drive unit installed in the roller tube. The electronic drive unit includes a motor, such as a direct-current (DC) motor, which is operable to rotate the roller tube upon being energized by a DC voltage.

Prior art electronic drive units are typically powered directly from an AC mains line voltage (e.g., 120 VAC) or from a low-voltage DC voltage (e.g., approximately 24 VDC) provided by an external transformer. Unfortunately, this requires that electrical wires to be run from the power source to the electronic drive unit. Running additional AC main line voltage wiring to the electronic drive unit can be very expensive, due to the cost of the additional electrical wiring as well as the cost of installation. Typically, installing new AC main line voltage wiring requires a licensed electrician to perform the work. In addition, if the pre-existing wiring runs behind a fixed ceiling or wall (e.g., one comprising plaster or expensive hardwood), the electrician may need to breach the ceiling or wall to install the new electrical wiring, which will thus require subsequent repair. In some installations where low voltage (e.g., from a low-voltage DC transformer) is used to the power the electronic drive unit, the electrical wires have been mounted on an external surface of a wall or ceiling between the electronic drive unit and the transformer, which is plugged into an electrical receptacle. However, this sort of installation requires the permanent use of one of the outlets of the electrical receptacle and is aesthetically unpleasing due to the external electrical wires.

Therefore, some prior art motorized window treatments have been battery powered, such that the motorized window treatments may be installed without requiring any additional wiring. Examples of prior art battery-powered motorized window treatments are described in greater detail in U.S. Pat. No. 5,883,480, issued Mar. 16, 1999, entitled WINDOW COVERING WITH HEAD RAIL-MOUNTED ACTUATOR; U.S. Pat. No. 5,990,646, issued Nov. 23, 2009, entitled REMOTELY-CONTROLLED BATTERY POWERED-WINDOW COVERING HAVING POWER SAVING RECEIVER; and U.S. Pat. No. 7,389,806, issued Jun. 24, 2008, entitled MOTORIZED WINDOW SHADE SYSTEM.

However, the typical prior art battery-powered motorized window treatments have suffered from poor battery life (such as, one year or less), and have required batteries that are difficult and expensive to replace. Thus, there is a need for a low-cost battery-powered motorized window treatment that has longer battery life and makes battery power practical and convenient for the end user.

SUMMARY OF THE INVENTION

The present invention provides a low-cost, quiet, battery-powered motorized window treatment for controlling the position of a covering material that is adapted to hang in front of an opening, such as a window. The motorized window treatment comprises a motor for rotating a drive shaft to thus raise and lower the covering material. The motorized window treatment is powered by batteries that are not expensive to replace and have a much longer (and more practical) lifetime than the typical prior art battery-powered motorized window treatment (e.g., approximately three years). The batteries are located inside a headrail of the motorized window treatment and thus out of view of a user of the motorized window treatment. The headrail may be adjusted to a service position to provide access to the batteries to allow for easy replacement of the batteries without unmounting the headrail. In addition, the motorized window treatment makes battery power more convenient for the user by controlling the motor at a reduced speed when the battery voltage is low to harvest the remaining battery power and to signal to the user that the batteries need to be replaced and by preventing movement of the covering material when the battery voltage is too low to thus reserve enough energy to move the covering material to the fully-raised position one last time.

The motorized window treatment may be operable to receive input signals from input devices to allow for both local and central control of the position of the covering material. For example, the motorized window treatment may be operable to receive infrared (IR) signals from an IR remote control or radio-frequency (RF) signals from one or more RF transmitters. The input devices of the load control system may comprise, for example, battery-powered remote controls, occupancy sensors, vacancy sensors, daylight sensors, temperature sensors, humidity sensors, security sensors, proximity sensors, keypads, key fobs, cell phones, smart phones, tablets, personal digital assistants, personal computers, timeclocks, audio-visual controls, safety devices, central control transmitters, or any combination of these input devices.

Since the motorized window treatment is battery-powered and is operable to be controlled in response to wireless input signals transmitted by an input device, the motorized window treatment may be installed without requiring any additional wiring. In addition, the motorized window treatment is easily programmed to operate in response to the wireless signals transmitted by the input device, and may be configured to automatically adjust the position of the covering material in response to, for example, a photosensor and one or more temperature sensors, in order to provide for energy savings of other loads in the building in which the motorized window treatment is installed. In addition, the upper and lower limits of the motorized window treatment may be easily programmed using the input device. The battery-powered motorized window treatment may also be integrated as part of a larger load control system, such as, an RF load control system, and may be operable to transmit digital messages including, for example, data regarding the battery voltage of the batteries, or the temperatures measured by the temperature sensors.

The motorized window treatment uses various power-saving methods to lengthen the lifetime of the batteries. For example, the motorized window treatment comprises a constant-force spring operatively coupled to a drive shaft and a motor of the motorized window treatment for reducing the amount of power consumed as the covering material is raised and lowered. If the motorized window treatment includes an RF receiver for receiving RF signals, the motorized window treatment is operable to use an RF sub-sampling technique to put the RF receiver to sleep for longer periods of time than typical prior art RF receivers to thus conserve battery power. If the motorized window treatment is included in a large load control system, the motorized window treatment may be responsive to RF signals transmitted at a different frequency than the frequency to which the other control devices of the load control system are responsive to limit the amount of time that the RF receiver wakes up to process incoming RF signals and thus conserve battery power. Finally, when the battery voltage is low (i.e., near the end of the lifetime of the batteries), the motorized window treatment is operable to reduce the speed at which the motor rotates to thus conserve additional battery power and thus extend the lifetime of the batteries.

According to an embodiment of the present invention, a motorized window treatment comprises: (1) a headrail having opposite ends; (2) a covering material that has a top end connected to the headrail and extends from the headrail to a second end; (3) a motor drive unit including a motor and located in the center of the headrail; (4) two drive shafts extending from both sides of the motor drive unit and rotatably coupled to the motor drive unit, such that rotations of the motor result in rotations of the drive shafts; (5) two lift cords, each lift cord rotatably received around a respective one of the drive shafts and extending vertically to the bottom end of the covering material, such that bottom end of the covering material is adjusted between a fully-closed position and a fully-open position in response to rotations of the drive shaft; and (6) at least two batteries for powering the motor drive unit, wherein at least one of the two batteries is located on each side of the motor drive unit adjacent each of the opposite sides of the headrail.

According to another embodiment of the present invention, a motorized window treatment comprises a motor drive unit that operates in a low-battery mode when the magnitude of a battery voltage of a battery-powered supply for powering the motor drive unit is low. The motorized window treatment may comprise a covering material, a drive shaft, and at least one lift cord rotatably received around the drive shaft and extending to a bottom of the covering material for raising and lowering the covering material between a fully-open and fully-closed position and to any position intermediate the fully-open and fully-closed positions. The motor drive unit comprises a motor adapted to be coupled to the drive shaft, such that the motor drive unit is operable to raise and lower the covering material by rotating the drive shaft, and a controller for controlling the motor to raise and lower the covering material. The controller is operable to monitor the magnitude of the battery voltage of the battery-powered supply and operate in the low-battery mode when the magnitude of the battery voltage drops below a first predetermined low-battery threshold.

According to one embodiment of the present invention, the motor drive unit is operable to monitor the state of charge of the battery and when the state of charge is reduced below a first predetermined threshold to operate the motor at a reduced motor speed. According to another embodiment of the present invention, the motor drive unit is operable to determine when the magnitude of the voltage is getting low and to reserve enough energy in the battery to allow for at least one additional movement of the covering material to the fully-open position.

According to another embodiment of the present invention, the motor drive unit comprises a power supply for receiving the battery voltage and generating a DC supply voltage having a first nominal magnitude for powering the controller. The controller is operable to control the magnitude of the DC supply voltage to a second increased magnitude greater than the first magnitude when the controller is controlling the motor to rotate the drive shaft.

According to another embodiment of the present invention, the motor drive unit includes a sensor arrangement coupled to the drive shaft for sensing movement of the drive shaft and used for determining the position of the bottom of the covering material. The motor drive unit also has a control unit coupled to the sensor arrangement for determining from at least one sensor signal from the sensor arrangement the position of the bottom of the covering material between the fully-open and fully-closed positions. The control unit for the motor drive unit is arranged to prevent the motor drive unit from operating to lower the covering material until an upper limit for the covering material is reset after a loss of power. According to yet another embodiment of the present invention, the motor drive unit further comprises a memory in the control unit for storing data related to the determined position, and the motorized window treatment comprises a supplemental power source for the control unit, whereby the battery-powered supply can be removed without loss of the position data.

According to another aspect of the present invention, the covering material may be engaged by a user to manually position the covering material at any position between the fully-open and fully-closed positions and the sensor arrangement provides said at least one sensor signal to the control unit so that the control unit can determine the position of the covering material when the covering material is manually adjusted.

According to another embodiment of the present invention, the control unit further comprises a microprocessor having a sleep mode during which the microprocessor uses reduced electrical power to conserve battery power. The motor produces an electromotive force when the window treatment is moved manually, such that the electromotive force is coupled to an input of the control unit to cause the microprocessor to change from the sleep mode to an active mode, whereby the control unit receives and processes the sensor signal to determine the position of the covering material when the covering material is manually adjusted.

In addition, a motorized window treatment system comprising a motorized window treatment and a wireless remote control is also described herein. The motorized window treatment has a motor drive unit including a wireless receiver for receiving wireless signals including commands for adjusting a covering material between a fully-open position and a fully-closed position. The wireless remote control transmits Manchester-encoded digital messages to the wireless receiver of the motor drive unit via the wireless signals. The Manchester-encoded digital messages have a plurality of consecutive bit times, where the logic low and high bits of the digital message being encoded in the transitions of the digital message during each bit time. The motor drive unit operates the wireless receiver in a sleep mode by disabling the wireless receiver and periodically enabling the wireless receiver for a sample time to determine if the wireless remote control is presently transmitting wireless signals. The motor drive unit enables the wireless receiver in order to receive a digital message transmitted by the remote control in response to detecting a transition during the sample time. The length of the sample time is approximately equal to the length of each bit time of the Manchester-encoded digital messages.

According to another embodiment of the present invention, a wireless digital signal receiver is designed to conserve battery power. The wireless digital signal receiver comprises a receiver circuit for detecting edge-encoded digital data signals that include bits (with each bit having a bit width) and a control circuit for turning on the receiver circuit for an on-time during which on-time the receiver circuit senses whether a digital data signal is present and turns off the receiver circuit for an off-time if a digital data signal is not present. The on-time is greater than the bit width of the digital data signals and the longest off-time between digital data signals so that it is ensured that if a digital data signal is present it will be detected. The digital data signals are transmitted by a transmitter circuit in a packet, the packet being repeated a plurality of times for a single data transmission.

According to another aspect of the present invention, a motorized window treatment comprises: (1) a covering material; (2) a drive shaft; (3) at least one lift cord rotatably received around the drive shaft and extending to a bottom end of the covering material, such that the lift cord provides a torque on the drive shaft; (4) a motor drive unit having a motor coupled to the drive shaft, such that the motor drive unit is operable to raise and lower the covering material by rotating the drive shaft; and (5) a constant-force spring assist assembly coupled to the drive shaft for providing a constant torque on the drive shaft in a direction opposite a direction of the torque provided on the drive shaft by the lift cord.

According to another embodiment of the present invention, a motorized window treatment comprises a covering material for a window, a drive shaft, at least one cord, a motor drive unit, and a spring assist unit coupled to the drive shaft. The covering material is moveable between a fully-closed and a fully-open position. The cord is rotatably wound around the drive shaft for raising and lowering the covering material when the drive shaft is rotated in first and second directions. The cord provides a torque on the drive shaft due to the weight of the covering material. The motor drive unit includes a motor for driving the drive shaft and a controller for controlling the direction of rotation of the motor and the speed of the motor. The spring assist unit provides a torque on the drive shaft opposite a torque provided by the at least one cord to raise the covering material to a position approximately midway between the fully-closed and fully-open position without substantial energy being provided by said motor. The spring assist unit assists the motor to raise the covering material above the midway position to the fully-open position, and acts to provide a torque on the drive shaft resisting downward motion of the covering material when the covering material is lowered from the fully-open position to the fully-closed position. The motor provides a torque on the drive shaft to wind up the spring assist unit when the covering material is lowered from the midway position to the fully-closed position.

According to yet another embodiment of the present invention, A motorized window treatment comprises: (1) a covering material; (2) a drive shaft; (3) at least one lift cord rotatably received around the drive shaft and extending to a bottom end of the covering material, such that the lift cord provides a torque on the drive shaft; (4) a motor drive unit having a motor coupled to the drive shaft, such that the motor drive unit is operable to raise and lower the covering material by rotating the drive shaft; (5) a first battery-powered supply for powering the motor drive unit; (6) a spring assist assembly coupled to the drive shaft for providing a torque on the drive shaft in a direction opposite a direction of the torque provided on the drive shaft by the lift cord; (7) a control unit for controlling the motor drive unit, the control unit having a memory for retaining position data related to the position of the covering material between the fully-open and fully closed positions; and (8) a second battery-powered supply for providing electrical power to the control unit independent of said first battery powered supply for said motor drive unit.

Other features and advantages of the present invention will become apparent from the following description of the invention that refers to the accompanying drawings.

BRIEF DESCRIPTION OF THE DRAWINGS

The invention will now be described in greater detail in the following detailed description with reference to the drawings in which:

FIG. 2A is a perspective view of the battery-powered motorized window treatment of FIG. 1 in a full-opened position;

FIG. 2B is a right side view of the battery-powered motorized window treatment of FIG. 1;

FIG. 3 is a front view of the battery-powered motorized window treatment of FIG. 1;

FIG. 4C is a left side view of a belt drive of the gear assembly of FIG. 4B;

FIG. 4D is a front cross-sectional view of the belt drive of the gear assembly of FIG. 4B;

FIG. 5A is a perspective view of the motorized window treatment of FIG. 1 as the motorized window treatment is being moved to a service position according to the first embodiment of the present invention;

FIG. 5B is a right side view of the motorized window treatment of FIG. 1 as the motorized window treatment is being moved to the service position according to the first embodiment of the present invention;

FIG. 6A is a perspective view of the motorized window treatment of FIG. 1 when the motorized window treatment is in the service position according to the first embodiment of the present invention;

FIG. 6B is a right side view of the motorized window treatment of FIG. 1 when the motorized window treatment is in the service position according to the first embodiment of the present invention;

FIG. 32A is a perspective view of a motorized window treatment having mounting brackets for rotating the motorized window treatment into a service position according to a third embodiment of the present invention;

FIG. 32B is a right side view of the motorized window treatment of FIG. 32A;

FIG. 33A is a perspective view of the motorized window treatment of FIG. 32A in the service position according to the third embodiment of the present invention;

FIG. 33B is a right side view of the motorized window treatment of FIG. 33A in the service position according to the third embodiment of the present invention;

FIG. 34A is an enlarged perspective view of one of the mounting brackets of the motorized window treatment of FIG. 32A in a locked position;

FIG. 34B is an enlarged perspective view of the mounting bracket of FIG. 34A in the service position;

DETAILED DESCRIPTION OF THE INVENTION

Figure 1:
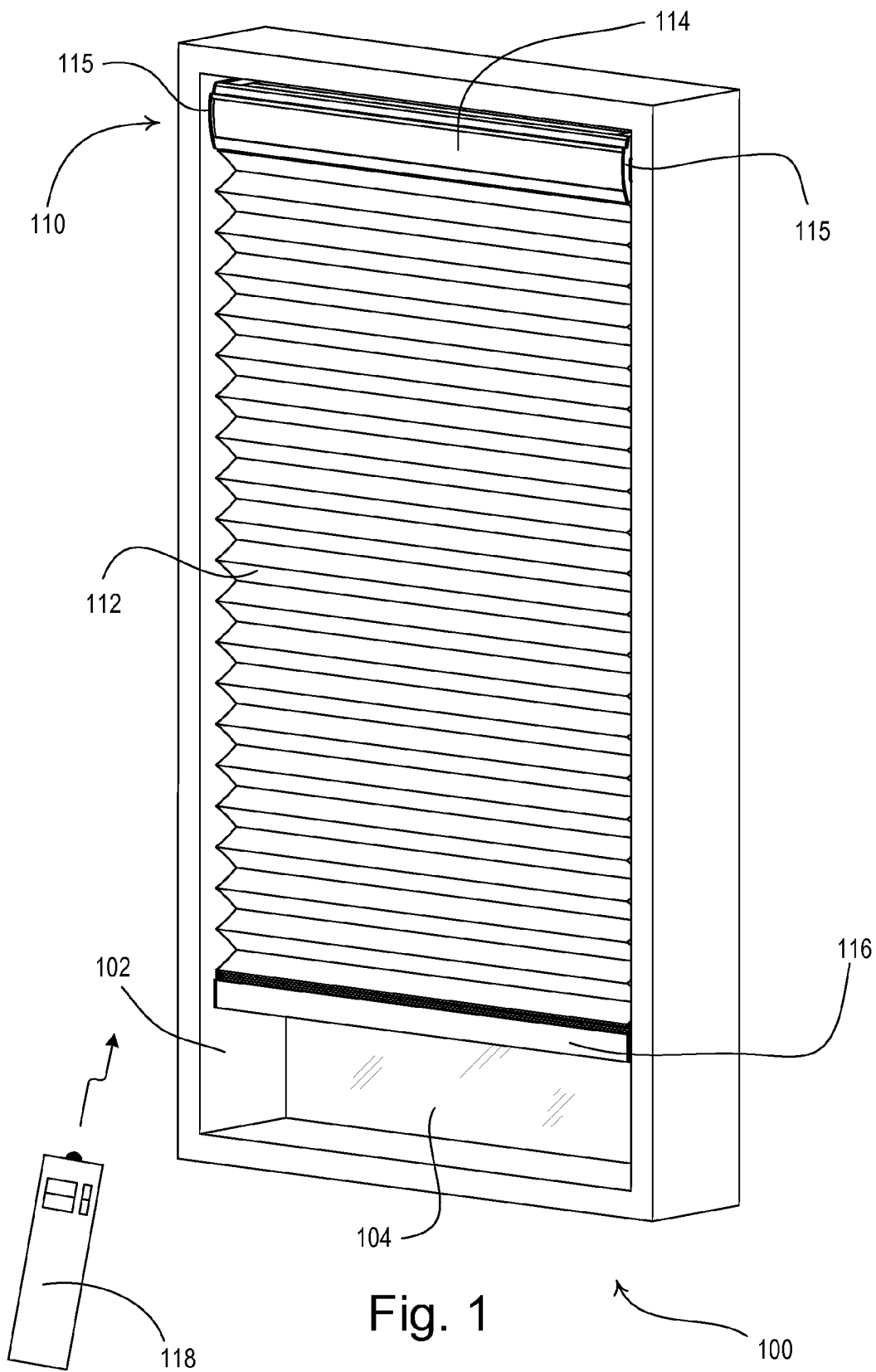
FIG. 1 is a perspective view of a motorized window treatment system having a battery-powered motorized window treatment and a remote control according to a first embodiment of the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a perspective view of a motorized window treatment system 100 having a battery-powered motorized window treatment 110 mounted in an opening 102, for example, in front of a window 104, according to a first embodiment of the present invention. The battery-powered motorized window treatment 110 comprises a covering material, for example, a cellular shade fabric 112 as shown in FIG. 1. The cellular shade fabric 112 has a top end connected to a headrail 114 and a bottom end connected to a weighting element 116. The headrail 114 extends between opposite ends that are connected to mounting plates 115. The mounting plates 115 may be mounted to the sides of the opening 102 as shown in FIG. 1, such that the cellular shade fabric 112 is able to hang in front of the window 104, and may be adjusted between a fully-open position $P_{FULLY-OPEN}$ and a fully-closed position $P_{FULLY-CLOSED}$ to control the amount of daylight entering a room or space. Alternatively, the mounting plates 115 of the battery-powered motorized window treatment 110 could be mounted externally to the opening 102 (e.g., above the opening) with the shade fabric 112 hanging in front of the opening and the window 104. In addition, the battery-powered motorized window treatment 110 could alternatively comprise other types of covering materials, such as, for example, a plurality of horizontally-extending slats (i.e., a Venetian or Persian blind system), pleated blinds, a roller shade fabric, or a Roman shade fabric. According to the first embodiment of the present invention, the motorized window treatment system 100 comprises an infrared (IR) remote control 118 for controlling the operation of the motorized window treatment 110.

FIG. 2A is a perspective view and FIG. 2B is a right side view of the battery-powered motorized window treatment 110 with the cellular shade fabric 112 in the fully-open position $P_{FULLY-OPEN}$. The motorized window treatment 110 comprises a motor drive unit 120 for raising and lowering the weighting element 116 and the cellular shade fabric 112 between the fully-open position $P_{FULLY-OPEN}$ and the fully-closed position $P_{FULLY-CLOSED}$. By controlling the amount of the window 104 covered by the cellular shade fabric 112, the motorized window treatment 110 is able to control the amount of daylight entering the room. The headrail 114 of the motorized window treatment 110 comprises an internal side 122 and an opposite external side 124, which faces the window 104 that the shade fabric 112 is covering. The motor drive unit 120 comprises an actuator 126, which is positioned adjacent the internal side 122 of the headrail 114 may may be actuated when a user is configuring the motorized window treatment 110. The actuator 126 may be made of, for example, a clear material, such that the actuator may operate as a light pipe to conduct illumination from inside the motor drive unit 120 to thus be provide feedback to the user of the motorized window treatment 110. In addition, the actuator 126 may also function as an IR-receiving lens for directing IR signals transmitted by the IR remote control 118 to an IR receiver 166 (FIG. 9) inside the motor drive unit 120. The motor drive unit 120 is operable to determine a target position $P_{TARGET}$ for the weighting element 116 in response to commands included in the IR signals received from the remote control 118 and to subsequently control a present position $P_{PRES}$ of the weighting element to the target position $P_{TARGET}$. As shown in FIG. 2A, a top side 128 of the headrail 114 is open, such that the motor drive unit 120 may be positioned inside the headrail and the actuator 126 may protrude slightly over the internal side 122 of the headrail.

FIG. 3 is a front view of the battery-powered motorized window treatment 110 with a front portion of the headrail 114 removed to show the motor drive unit 120, which is located in the center of the headrail. The motorized window treatment 110 comprises lift cords 130 that extend from the headrail 114 to the weighting element 116 for allowing the motor drive unit 120 to raise and lower the weighting element. The motor drive unit 120 includes an internal motor 150 (FIG. 4A) coupled to drive shafts 132 that extend from the motor on each side of the motor and are each coupled to a respective lift cord spool 134. The lift cords 130 are windingly received around the lift cord spools 134 and are fixedly attached to the weighting element 116, such that the motor drive unit 120 is operable to rotate the drive shafts 132 to raise and lower the weighting element. The motorized window treatment 110 further comprises two constant-force spring assist assemblies 135, which are each coupled to the drive shafts 132 adjacent to one of the two lift cord spools 134. Each of the lift cord spools 134 and the adjacent constant-force spring assist assembly 135 are housed in a respective lift cord spool enclosure 136 as shown in FIG. 3. Alternatively, the motorized window treatment 110 could comprise a single drive shaft that extends along the length of the headrail and is coupled to both of the lift cord spools 134 and the motor drive unit 120 could be located in the center of the headrail 114 in the space between the drive shaft and either the internal side 122 or the external side 124 of the headrail. Further, the motorized window treatment 110 could comprise a single drive and the motor drive unit 120 could alternatively be located at either end of the headrail 114.

Figure 4A:
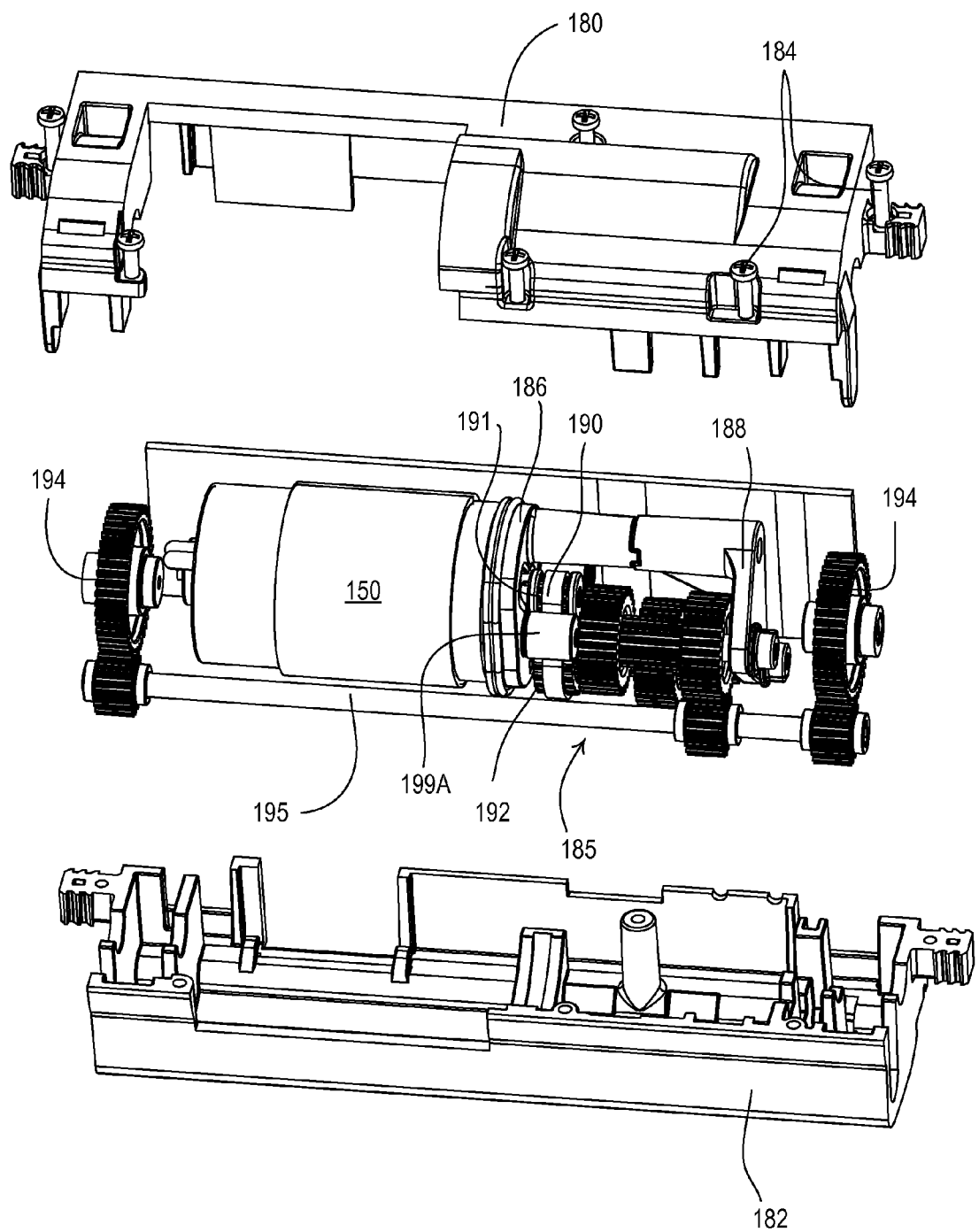
FIG. 4A is an exploded view of a motor drive unit of the battery-powered motorized window treatment of FIG. 1.

FIG. 4A is an exploded view of the motor drive unit 120. The motor drive unit 120 comprises two enclosure portions 180, 182 for housing the motor 150 and a gear assembly 185. The two enclosure portions 180, 182 are connected and held together by a plurality of screws 184. The gear assembly 190 is held together by two end portions 186, 188 and comprises a belt drive, and specifically, a belt 190 coupled between a first pulley 191 that is coupled to the output shaft of the motor 150 and a second pulley 192 that is coupled to the gears of the gear assembly. The motor drive unit 120 comprises output gears 194 that are located on both sides of the motor drive unit and are coupled to the drive shafts 132. The gear assembly 185 is coupled to the output gears 194 via a coupling member 195, such that the rotations of the output shaft of the motor 150 result in rotations of the drifts shafts 132.

Figure 4B:
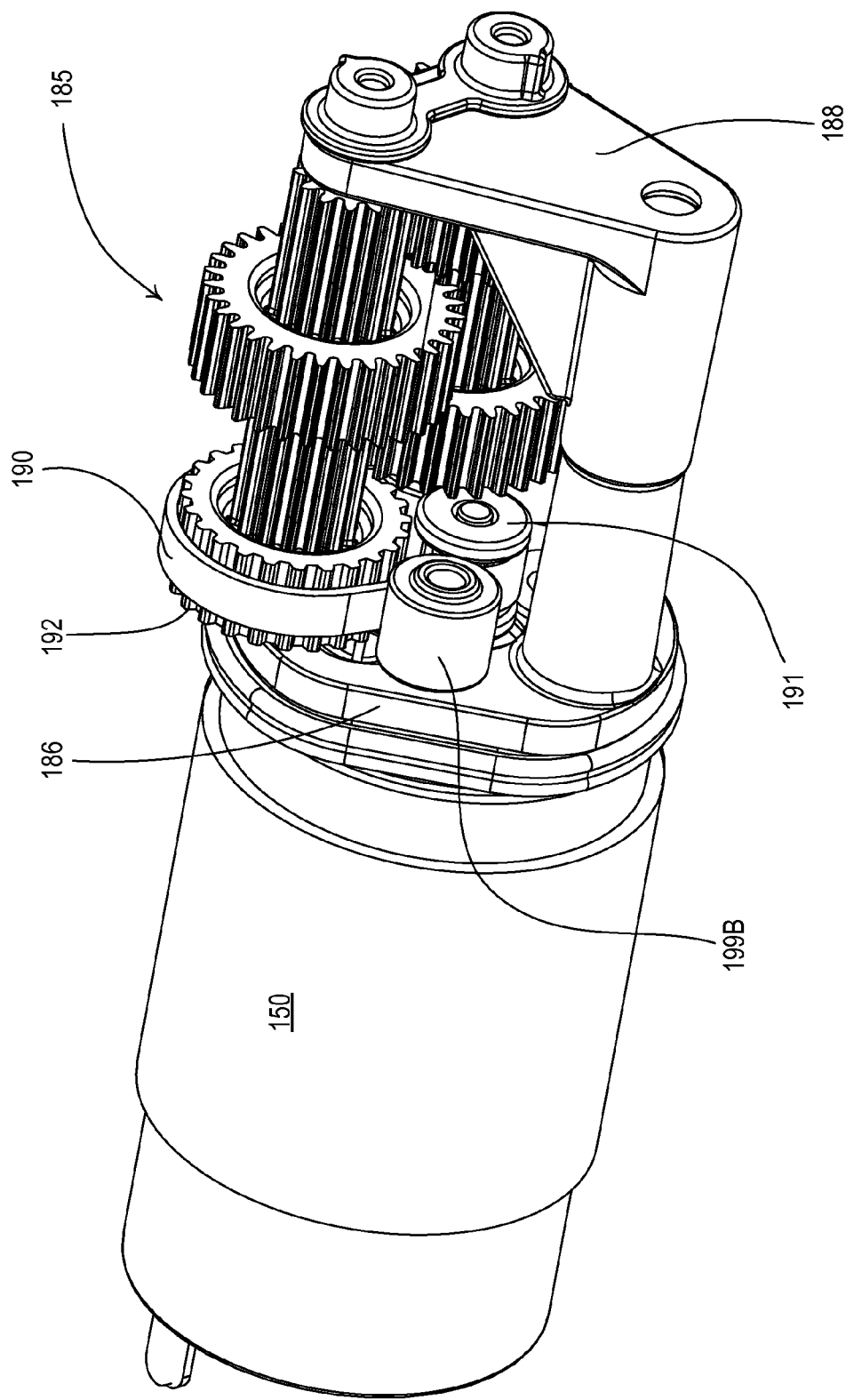
FIG. 4B is an enlarged perspective view of a motor and a gear assembly of the motor drive unit of FIG. 4A showing a belt drive of the motor in greater detail.

FIG. 4B is an enlarged perspective view of the motor 150 and the gear assembly 185 showing the belt drive in greater detail. For example, the belt 190 may comprise a flexible toothed belt having teeth 196 (FIG. 4D) that engage teeth 198 (FIG. 4D) of the first and second pulleys 191, 192. For example, the outside diameter of the first and second pulleys 191, 192 may be approximately 0.235 inch and 0.591 inch, respectively, resulting in a gear ratio of approximately 2:5. Since the second pulley 192 is coupled to the first pulley 191 via the flexible belt 190, noises generated by the rotations of the motor 150 are not coupled from the first pulley 191 to the second pulley 192. Accordingly, the total noise generated by the gear assembly 185 is reduced.

The gear assembly 185 further comprises a first roller 199A (FIG. 4A) and a second roller 199B (FIG. 4B) that are rotatably coupled to the end portion 186 that is located adjacent the motor 150. FIG. 4C is a left side view of the belt 190, the first and second pulleys 191, 192, and one of the rollers 199A. FIG. 4D is a front cross-sectional view of the belt 190, the first and second pulleys 191, 192, and the rollers 199A, 199B taken through the center of the belt 190 as shown in FIG. 4C. The belt 190 contacts the rollers 199A, 199B, which operate to hold the belt against the first and second pulleys 191, 192 and to ensure that the belt and the first pulley have an appropriate angular contact length $\theta_C$ (e.g., approximately 136°) as shown in FIG. 4D. For example, if the rollers 199A, 199B are not provided in the motor drive unit 120, the belt 190 may have an angular contact length $\theta_C$ with the first pulley 192 of approximately 30°. With the rollers 199A, 199B installed in the gear assembly 185, the belt 190 can have a larger diameter than if the rollers were not provided and still achieve the appropriate angular contact length $\theta_C$ between the belt and the first pulley 191. It was discovered that loosening the belt 190 and providing the rollers 199A, 199B led to a decreased current consumption in the motor 150 as compared to when the rollers were not provided, the belt was tighter, and the same angular contact length $\theta_C$ between the belt 190 and the first pulley 191 was achieved (i.e., approximately 136°). In addition, the diameters of the rollers 199A, 199B can be adjusted to change the angular contact length $\theta_C$.

The battery-powered motorized window treatment 110 also comprises a plurality of batteries 138 (e.g., four D-cell batteries), which are electrically coupled in series. The series-combination of the batteries 138 is coupled to the motor drive unit 120 for powering the motor drive unit. The batteries 138 are housed inside the headrail 114 and thus out of view of a user of the motorized window treatment 110. Specifically, the batteries 138 are mounted in two battery holders 139 located inside the headrail 114, such that there are two batteries in each battery holder as shown in FIG. 2A. Since the motor drive unit 120 is located in the center of the headrail 114 and the drive shafts 132 extend out of both sides of the motor drive unit to the lift cord spools 134, there is plenty of the room for the batteries 138 to be located adjacent the opposite sides of the headrail as shown in FIG. 3. According to the embodiments of the present invention, the batteries 138 provide the motorized window treatment 110 with a practical lifetime (e.g., approximately three years), and are typical "off-the-shelf" batteries that are easy and not expensive to replace. Alternatively, the motor drive unit 120 could comprise more batteries (e.g., six or eight) coupled in series or batteries of a different kind (e.g., AA batteries) coupled in series.

Figure 7:
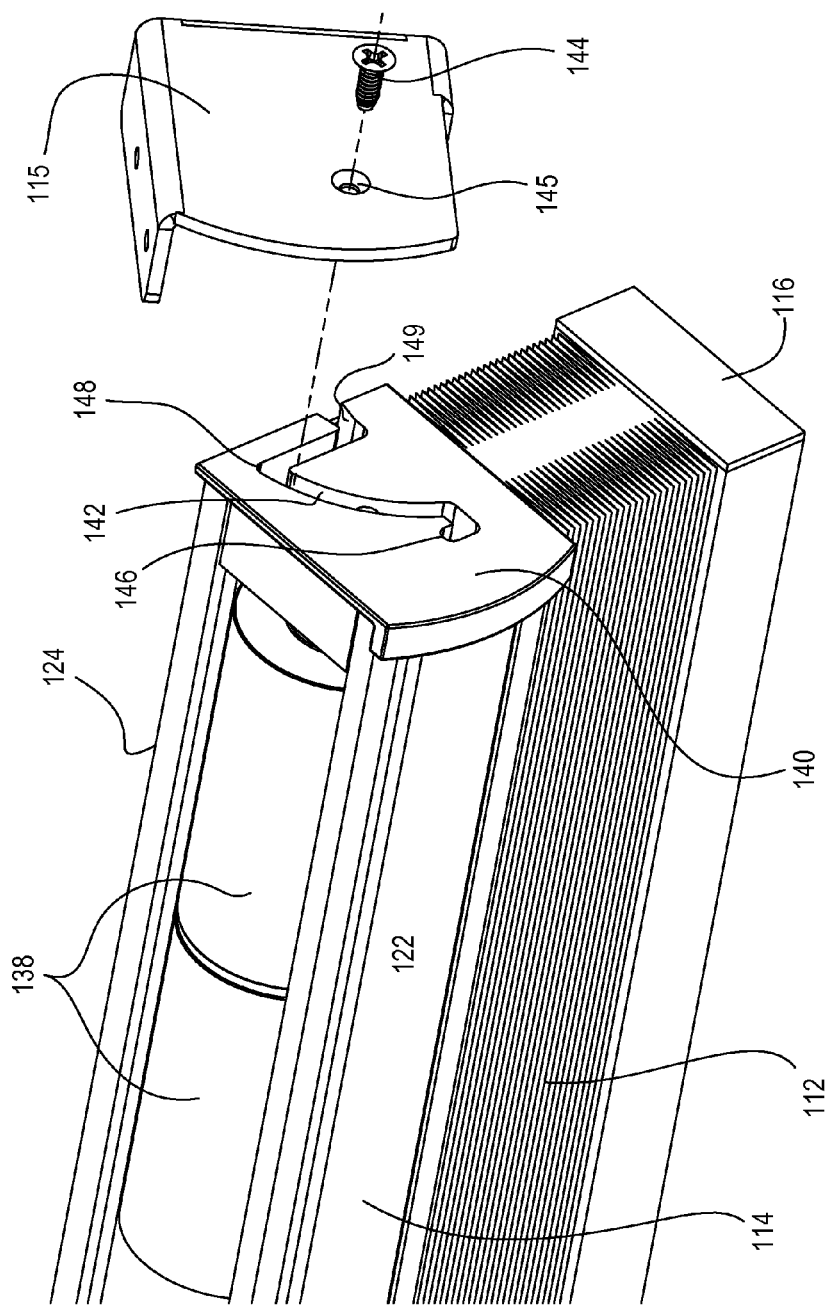
FIG. 7 is an enlarged perspective view of one end of the motorized window treatment of FIG. 1 showing how a screw is received in a channel of an endcap of the motorized window treatment.

To provide for easy access to the batteries 138 to allow the user to change the batteries when needed, the motorized window treatment 110 is operable to be adjusted to a service position. FIG. 5A is a perspective view and FIG. 5B is a right side view of the motorized window treatment 110 as the motorized window treatment is being moved to the service position according to the first embodiment of the present invention. FIG. 6A is a perspective view and FIG. 6B is a right side view of the motorized window treatment 110 when the motorized window treatment is in the service position according to the first embodiment of the present invention. The motorized window treatment 110 comprises two endcaps 140 located at each side of the headrail 114. The endcaps 140 each comprise a channel 142, which receives a screw 144 that extends through an opening 145 (FIG. 7) in the adjacent mounting bracket 115. FIG. 7 is an enlarged perspective view of one end of the motorized window treatment 110 showing how the screw 144 is received in the channel 142 of the endcap 140. When the motorized window treatment 110 is in a normal position (as shown in FIG. 3), each screw 144 rests in an end 146 of the respective channel 142, such that the headrail 114 is held in position between the mounting brackets 115 and the shade fabric 112 hangs vertically below the headrail.

When the batteries 138 need to be accessed, the headrail 114 may be lifted up by a user, such that the screws 144 are no longer positioned in the respective ends 146 and may travel through the channels 142 as shown in FIG. 5B. Each screw 142 may then come to rest in an elbow 148 of the respective channel 142 as shown in FIG. 6B, such that the motorized window treatment 110 is in the service position. When in the service position, the headrail 114 is operable to pivot about the screws 144 in the respective elbows 148 to allow the user to access the batteries 138 from the top of the headrail. To remove the headrail 114 from the mounting brackets 115, the user may lift the headrail 114 to move the screws 144 through the respective channels 142 and out of respective channel openings 149.

Accordingly, the headrail 114 is adapted to moved down and away from the window 104 and into the service position, so that the headrail may then be tilted to allow the user to access the batteries 138. Since the headrail 114 is moved horizontally away from the window 104 when in the service position, there is room between the headrail and the window in which the shade fabric 112 may be located when the top of the headrail 114 is rotated towards the user.

According to the first embodiment of the present invention, the spring assist assemblies 135 are coupled to the drive shafts 132 with one of the spring assist assemblies housed in each of the lift cord spool enclosures 136 as shown in FIG. 3. Each spring assist assembly 135 includes a constant-force spring (not shown) having a first end attached to the respective lift cord spool enclosure 136 (which is fixedly attached to the head rail 114) and a second end attached to the respective drive shaft 132. The spring assist assemblies 135 operate to provide a constant torque (e.g., approximately 0.44 Newtons) on the drive shafts 132 in the direction opposite the direction of the torque provided on the drive shafts by the lift cords 130. For example, the constant amount of torque provided by the spring assist assemblies 135 may be approximately equal to the torque provided on the drive shafts 132 by the lift cords 130 when the weighting element 116 is positioned half-way between the fully-open position $P_{FULLY-OPEN}$ and the fully-closed position $P_{FULLY-CLOSED}$ (i.e., due to the weight of the weighting element 116 and half of the cellular shade fabric 112). When wider cellular shade fabrics are used, additional lift cord spool enclosures 136 (each having a lift cord spool 134 and a spring assist assembly 135) can be coupled to the drive shafts 132 along the length of the headrail 114.

Figure 8A:
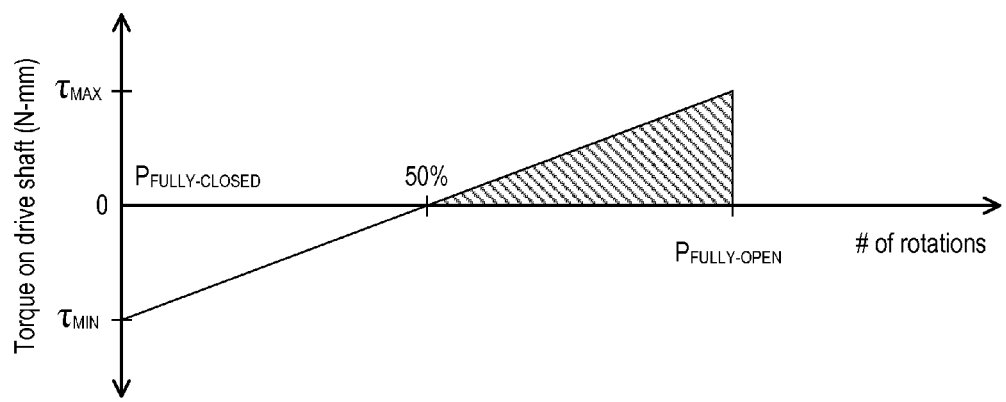
FIGS. 8A and 8B show example plots of the total torque on a drive shaft of the battery-powered motorized window treatment of FIG. 1 with respect to the number of rotations between a fully-closed position and a fully-open position.
Figure 8B:
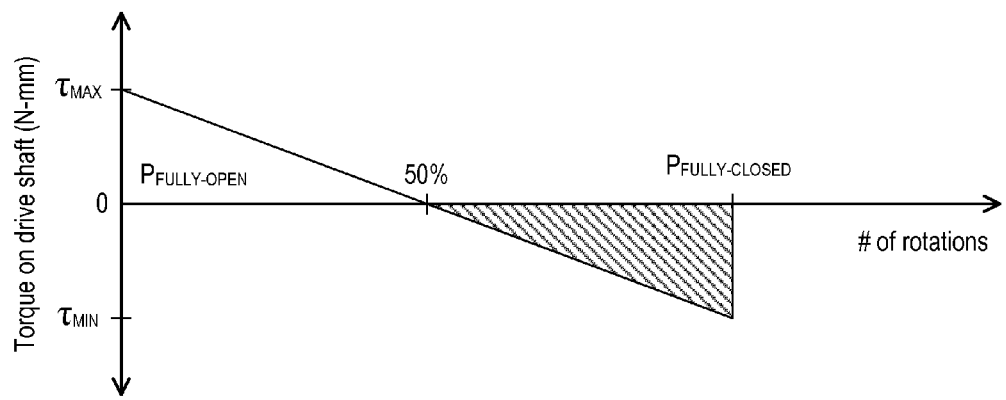

FIG. 8A is an example plot of the total torque on the drive shafts 132 with respect to the number of rotations between the fully-closed position $P_{FULLY-CLOSED}$ and the fully-open position $P_{FULLY-OPEN}$ while the motor drive unit 120 is raising the weighting element 116 from the fully-closed position $P_{FULLY-CLOSED}$ to the fully-open position $P_{FULLY-OPEN}$. FIG. 8B is an example plot of the total torque on the drive shafts 132 with respect to the number of rotations between the fully-closed position $P_{FULLY-CLOSED}$ and the fully-open position $P_{FULLY-OPEN}$ while the motor drive unit 120 is lowering the weighting element 116 from the fully-open position $P_{FULLY-OPEN}$ to the fully-closed position $P_{FULLY-CLOSED}$. For example, if the cellular shade fabric 112 weighs approximately 0.26 Newtons, the weighting element 116 weighs approximately 0.43 Newtons, and the cellular shade fabric 112 has a total height of approximately 1.35 meters, the torque on the drive shafts 132 may range from a minimum torque $\tau_{MIN}$ of approximately −1.68 N-mm to a maximum torque $\tau_{MAX}$ of approximately 1.80 N-mm.

With reference to FIG. 8A, when the weighting element 116 is in the fully-closed position $P_{FULLY-CLOSED}$, the least weight is on the lift cords 130 that wrap around the drive shafts 132 and lift the cellular shade fabric 112 of the window treatment 110. The motor 150 of the motor drive unit 120 may comprise, for example, a permanent magnet motor that has a cogging torque due to the magnets that provides a resistance to movement. Further, the motor drive unit 120 may also include a gear box that provides substantial reduction of the motor speed. The combination of the motor cogging torque and the gear reduction provides enough resistance on the drive shafts 132 to keep the cellular shade fabric 112 in any fixed position in front of the window 104 even when the total torque on the drive shafts is negative. This includes the fully-open position $P_{FULLY-OPEN}$ (when the weight is greatest and consequently highest torque is exerted by the lift cords 130) and the fully-closed position $P_{FULLY-CLOSED}$ (when the weight is least and the torque exerted by the lift cords is the lowest). Alternatively, a mechanically or electrically actuated brake could be used. However, appropriate considerations should be given to the power consumption when using a brake.

When the weighting element 116 is in the fully-open position $P_{FULLY-OPEN}$, the spring assist assemblies 135 provide a constant torque to raise the cellular shade fabric 112, opposed by the increasing torque provided by the weight of the cellular shade fabric as the weighting element 116 pushes against the cellular shade fabric that piles up on the weighting element 116. At a point approximately at the position at the middle of the fully-open position $P_{FULLY-OPEN}$ and the fully-closed position $P_{FULLY-CLOSED}$, the torque provided by the spring assist assembly 138 balances the torque provided by the lift cords 130 which is shown at the 50% position in FIG. 8A. During this period, the motor 150 is pulsed with a constant duty cycle and conducts only a small amount of current to ensure movement. Above the 50% position, the motor 150 conducts a greater amount of current and provides torque on the drive shafts 132 to raise the weighting element 116 to the fully-open position $P_{FULLY-OPEN}$. The motor cogging torque and gear reduction maintains the cellular shade fabric 112 of the window treatment 110 in the fully-open position $P_{FULLY-OPEN}$ against the weight of the fully-opened window treatment. The cellular shade fabric 112 of the window treatment 100 can of course be stopped at any position between the fully-open position $P_{FULLY-OPEN}$ and fully-closed position $P_{FULLY-CLOSED}$.

FIG. 8B shows the total torque on the drive shafts 132 when the motorized window treatment 110 in the process of being closed. Since maximum weight is on the lift cords 130 when the weighting element 116 is in the fully-open position $P_{FULLY-OPEN}$, the cellular shade fabric 112 and the weighting element will begin to fall of their own weights when the motor 150 is provided with an initial small pulse. The motor 150 is pulsed with a constant duty cycle during this period. At the midway position between the fully-open position $P_{FULLY-OPEN}$ and fully-closed position $P_{FULLY-CLOSED}$, the torque provided by the lift cords due to the weight of the cellular shade fabric 112 and the weighting element 116 counter balances the opposing force of the spring assist assemblies 135. At the midway position, the weight is no longer adequate to oppose the spring assist assemblies 135 and the motor 150 drives the weighting element 116 of the window treatment 110 to the fully-closed position $P_{FULLY-CLOSED}$ against the torque provided by the spring assist assemblies 135 to wind up the lift cords 130. The springs of the spring assist assemblies 135 are thus wound up to assist in later raising of the cellular shade fabric 112 of the window treatment 110.

In FIGS. 8A and 8B, the shaded regions represent the regions where energy is provided by the motor 150 to the system. The spring assist assemblies 135 thus provides for optimizing battery life by reducing the time that the motor 150 needs to be energized to raise and/or lower the cellular shade fabric 112 of the window treatment 110.

Alternatively, each spring assist assembly 135 could include a negative-gradient spring (not shown) coupled between the respective lift cord spool enclosure 136 and the respective drive shaft 132. Each negative-gradient spring provides a varying torque on the respective drive shaft 132 depending upon the position of the cellular shade fabric 112, for example, to provide more torque when the cellular shade fabric 112 is close to or at the fully-open position $P_{FULLY-OPEN}$ than when the cellular shade fabric is close to or at the fully-closed position $P_{FULLY-CLOSED}$. Similar to torque plots for the constant-force spring as shown in FIGS. 8A and 8B, the torque provided by the negative-gradient springs balances the torque provided by the lift cords 130 at a point approximately at the position at the middle of the fully-open position $P_{FULLY-OPEN}$ and the fully-closed position $P_{FULLY-CLOSED}$ (i.e., 50%). However, the shaded regions where energy is provided by the motor 150 to the system are smaller when negative-gradient springs are used.

Figure 9:
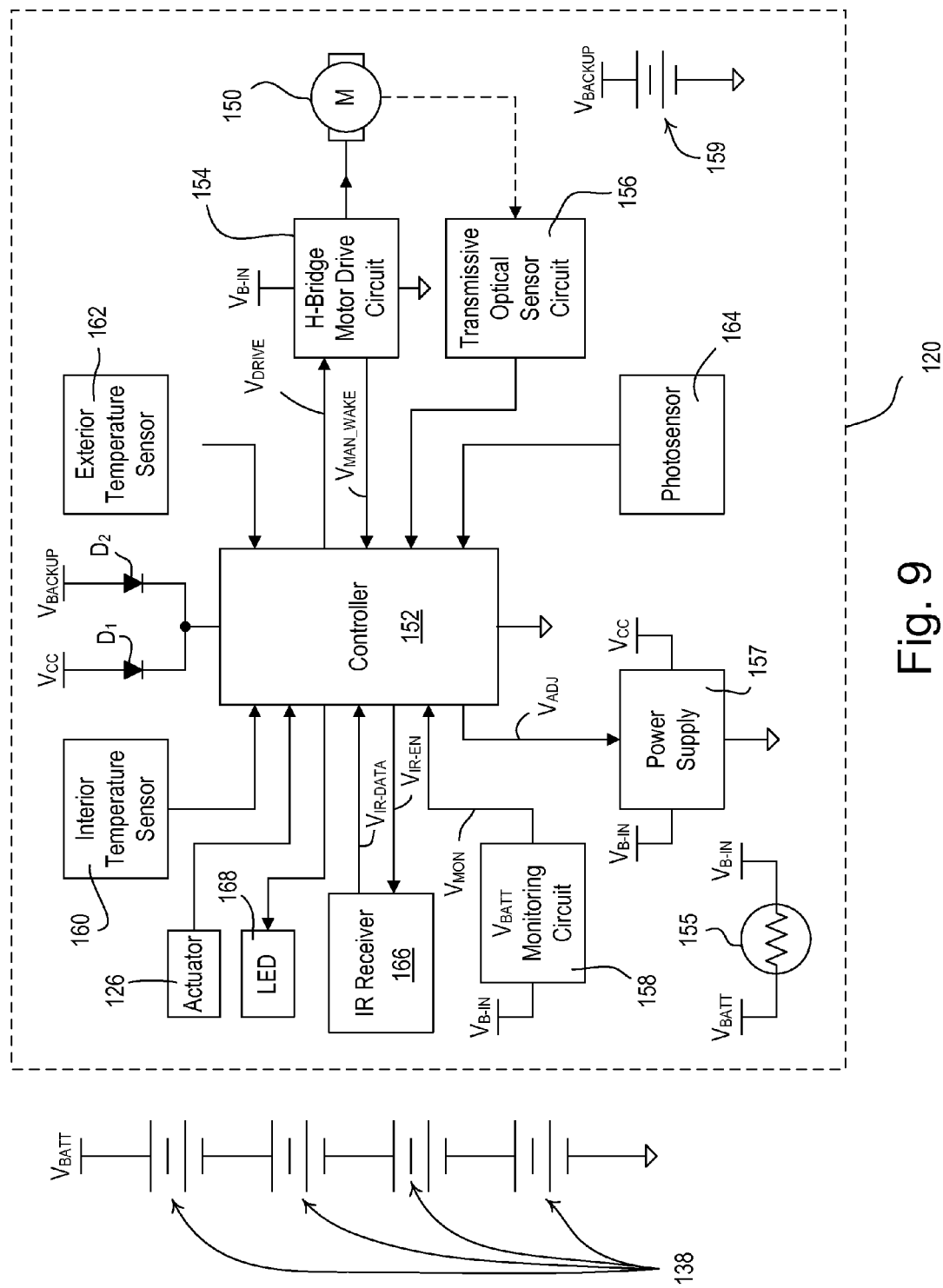
FIG. 9 is a simplified block diagram of a motor drive unit of the battery-powered motorized window treatment of FIG. 1.

FIG. 9 is a simplified block diagram of the motor drive unit 120 of the battery-powered motorized window treatment 110. The motor drive unit 120 comprises a controller 152 for controlling the operation of the motor 150, which may comprise, for example, a DC motor. The controller 152 may comprise, for example, a microprocessor, a programmable logic device (PLD), a microcontroller, an application specific integrated circuit (ASIC), a field-programmable gate array (FPGA), or any suitable processing device or control circuit. The controller 152 may be operable to operate in a sleep mode when the motor 150 is idle in order to preserve the life of the batteries 138.

The controller 152 is coupled to an H-bridge motor drive circuit 154 for driving the motor 150 via a set of drive signals $V_{DRIVE}$ to control the weighting element 116 and the cellular shade fabric 112 between the fully-open position $P_{FULLY-OPEN}$ and the fully-closed position $P_{FULLY-CLOSED}$. As previously mentioned, the motor drive unit 120 receives power from the series-coupled batteries 138, which provide a battery voltage $V_{BATT}$. For example, the batteries 138 may comprise D-cell batteries having rated voltages of approximately 1.5 volts, such that the battery voltage $V_{BATT}$ has a magnitude of approximately 6 volts. The battery voltage $V_{BATT}$ is electrically coupled to the circuitry of the motor drive unit 120 through a positive temperature coefficient (PTC) thermistor 155, which produces a battery input voltage $V_{B-IN}$ that is received by the H-bridge motor drive circuit 154 for driving the motor 150. The PTC thermistor 155 operates to limit the magnitude of the current drawn by the circuitry of the motor drive unit 120 from the batteries 138, and to protect the circuitry of the motor drive unit in the event of a voltage miswire at the battery terminals.

The controller 152 is operable to rotate the motor 150 at a constant rotational speed by controlling the H-bridge motor drive circuit 154 to supply a pulse-width modulated (PWM) drive signal having a constant frequency (e.g., approximately 20 kHz) and a substantially constant duty cycle (e.g., approximately 25-50%) to the motor. The controller 152 is able to change the rotational speed of the motor 150 by adjusting the duty cycle of the PWM signal applied to the motor and to change the direction of rotation of the motor by changing the polarity of the PWM drive signal applied to the motor. When first starting up the motor 150 to move the bottom bar 116 from a stopped position, the controller 152 is operable to adjust the duty cycle of the PWM signal to ramp up the current drawn from the batteries 138 by the H-bridge motor drive circuit 154 from zero amps until the motor 150 is rotating at the desired constant rotational speed over a ramp time period $T_{RAMP}$. The ramp time period $T_{RAMP}$ allows chemical reactions in the batteries 138 to stabilize before the motor 150 draws large amounts of current from the batteries. The batteries 138 may conduct high-magnitude pulses of current if the motor 150 is simply turned on at the constant rotational speed without the ramp time $T_{RAMP}$, i.e., before the chemical reactions in the batteries are allowed to stabilize.

Figure 10:
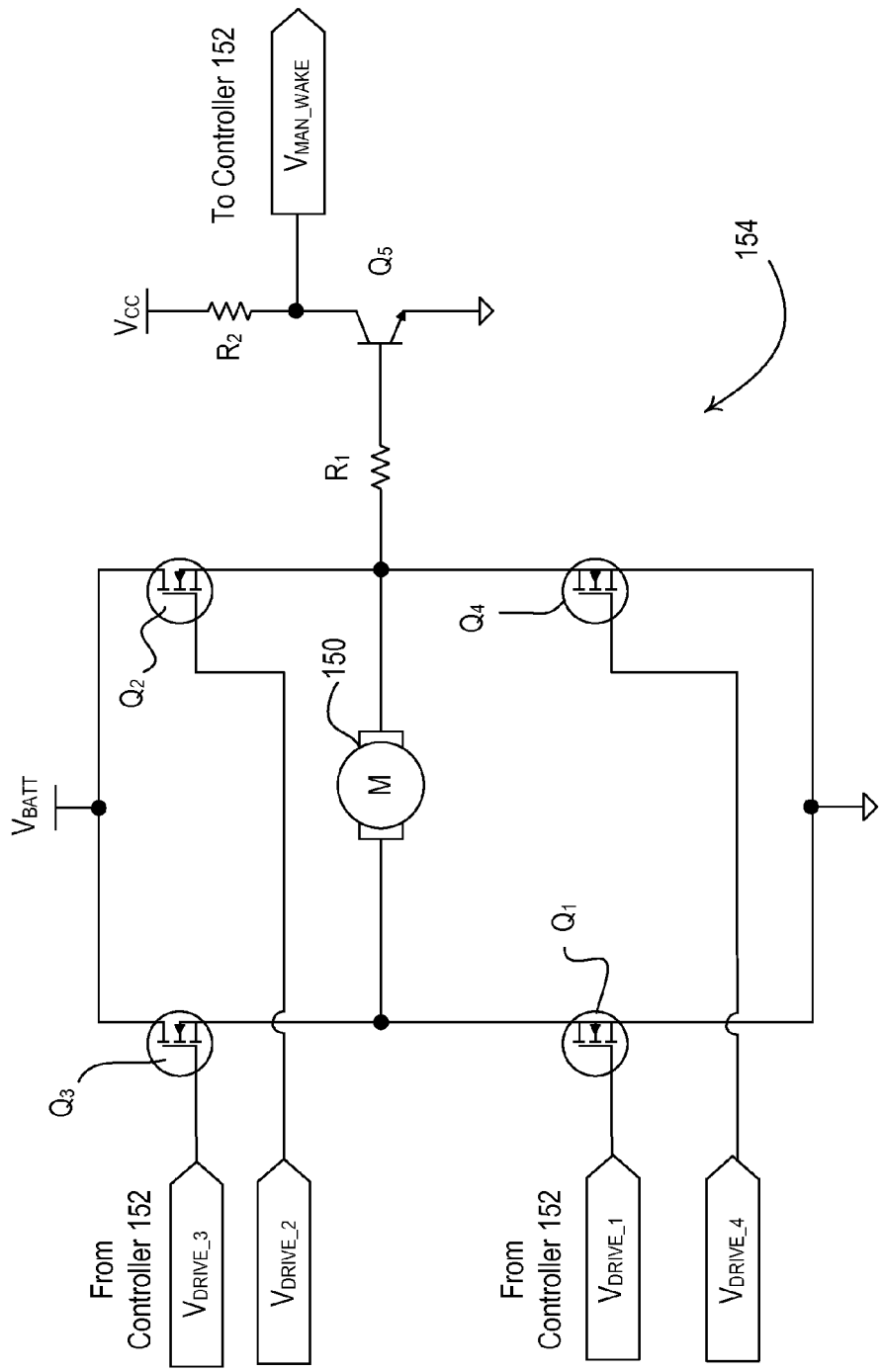
FIG. 10 is a simplified partial schematic diagram of an H-bridge motor drive circuit and a motor of the motor drive unit of FIG. 9.

FIG. 10 is a simplified schematic diagram of the H-bridge motor drive circuit 154. The H-bridge motor drive circuit 154 may comprise four transistors, such as, for example, four field effect transistors (FETs) $Q_1$, $Q_2$, $Q_3$, $Q_4$. Each FET $Q_1$-$Q_4$ may be driven by the controller 152 via four respective drives signals $V_{DRIVE\_1}$, $V_{DRIVE\_2}$, $V_{DRIVE\_3}$, $V_{DRIVE\_4}$. The FETs $Q_1$-$Q_4$ are coupled such that, when two of the FETs are conductive (e.g., FETs $Q_3$, $Q_4$), a positive DC voltage is applied to the motor 150 to cause the DC motor to rotate in a clockwise direction. When the other two FETs of the H-bridge circuit 154 are conductive (e.g., FETs $Q_1$, $Q_2$), a negative DC voltage is applied to the motor 150 to cause the motor to rotate in the reverse (i.e., counterclockwise) direction. To control the speed of the motor 150, the controller 152 drives at least one of FETs of the H-bridge circuit 154 with a PWM control signal. When the motor 150 is idle (i.e., at rest), the controller 152 drives only the FET $Q_1$ to be conductive and controls FETs $Q_2$, $Q_3$ and $Q_4$ to be non-conductive.

Referring back to FIG. 9, the controller 152 receives information regarding the rotational position and direction of rotation of the motor 150 from a rotational position sensor, such as, for example, a transmissive optical sensor circuit 156. The rotational position sensor may also comprise other suitable position sensors or sensor arrangements, such as, for example, Hall-effect, optical, or resistive sensors. The controller 152 is operable to determine a rotational position of the motor 150 in response to the transmissive optical sensor circuit 156, and to use the rotational position of the motor to determine a present position $P_{PRES}$ of the weighting element 116. The controller 152 may comprise an internal non-volatile memory (or alternatively, an external memory coupled to the controller) for storage of the present position $P_{PRES}$ of the shade fabric 112, the fully open position $P_{FULLY-OPEN}$, the fully closed position $P_{FULLY-CLOSED}$, and the number and type of the batteries 138.

Figure 11:
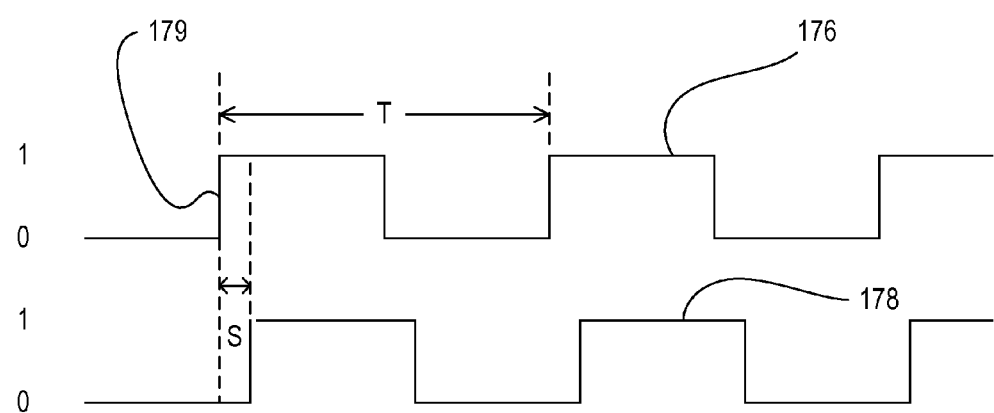
FIG. 11 is a diagram of a first output signal and a second output signal of a transmissive optical sensor circuit of FIG. 9.

FIG. 11 is a timing diagram of a first output signal 176 and a second output signal 178 of the transmissive optical sensor circuit 156. The output signals 176, 178 are provided to the controller 152 as a train of pulses. The frequency, and thus the period T, of the pulses of the output signals 176, 178 is a function of the rotational speed of the motor output shaft 172. The relative spacing S between the pulses of the first and second output signals 176, 178 is a function of rotational direction. When the motor 150 is rotating in a clockwise direction of the output shaft 172, the second output signal 178 lags behind the first output signal 176 by the relative spacing S. When the motor 150 is rotating in the opposite direction, the second output signal 178 leads the first output signal 176 by the relative spacing S.

The controller 152 stores the present position $P_{PRES}$ of the weighting element 116 in the memory as a number of optical sensors edges between the present position $P_{PRES}$ of the weighting element and the fully-open position $P_{FULLY-OPEN}$. An optical sensor edge is, for example, the low-to-high transition 179 of the first output signal 176 as shown in FIG. 11. The operation of the H-bridge motor drive circuit 154 and the use of sensor devices to track the direction and speed of the motor drive unit 120 is described in greater detail in commonly-assigned U.S. Pat. No. 5,848,634, issued Dec. 15, 1998, entitled MOTORIZED WINDOW SHADE SYSTEM, and commonly-assigned U.S. Pat. No. 6,497,267, issued Dec. 24, 2002, entitled MOTORIZED WINDOW SHADE WITH ULTRAQUIET MOTOR DRIVE AND ESD PROTECTION, the entire disclosures of which are herein incorporated by reference.

Referring back to FIG. 10, the H-bridge motor drive circuit 154 is operable to provide a manual movement wake-up signal $V_{MAN\_WAKE}$ to the controller 152. In the event that the cellular shade fabric 112 is moved manually, the motor 150 can be back-driven and provide the manual movement wake-up signal $V_{MAN\_WAKE}$ to the controller 152. The manual movement wake-up signal $V_{MAN\_WAKE}$ indicates that the cellular shade fabric 112 is being moved manually (i.e., pulled by a user), and the signal can cause the controller 152 to wake up (i.e., become fully energized) in the event that the controller is sleeping (i.e., operating in a low power mode). Thus, the controller 152 can continue to monitor the output of the transmissive optical sensor circuit 156. As shown in FIG. 10, one terminal of the motor 150 is coupled to the base of an NPN bipolar junction transistor $Q_5$ via a resistor $R_1$. The collector of the transistor $Q_5$ is coupled to the supply voltage $V_{CC}$ via a resistor $R_2$. The manual movement wake-up signal $V_{MAN\_WAKE}$ is generated at the junction of the collector of the transistor $Q_5$ and the resistor $R_2$, which is coupled to the controller 152. When the motor 150 is rotated in response to a manual action, a back electromagnetic force (EMF) is generated across the motor 150 and the transistor $Q_5$ becomes conductive, thus driving the manual movement wake-up signal $V_{MAN\_WAKE}$ low. The controller 152 may be operable to wake-up automatically in response to detecting such a high-to-low transition on one of its input ports.

Once the controller 152 wakes up in response to the manual movement wake-up signal $V_{MAN\_WAKE}$, the controller 152 monitors the output of the transmissive optical sensor circuit 156 to track the position of the motor 150 by executing a transmissive optical sensor edge procedure 200, which will be discussed in greater detail below with reference to FIG. 12. In addition, the controller 152 may further wake-up periodically (e.g., once each second) to execute the transmissive optical sensor edge procedure 400 to determine whether the cellular shade fabric 112 is moving or has moved as a result of a manual adjustment. Further, the back EMF generated across the motor 150 when the cellular shade fabric 112 is manually moved may be used to charge an energy storage device (such as a bus supply capacitor or ultra-capacitor) or a separate power supply for powering the controller 152, such that the controller is operable to keep track of the position of the cellular shade fabric when the batteries 138 are depleted. In addition, the back EMF generated across the motor 150 when the cellular shade fabric 112 is manually moved can also be used to charge a bus supply capacitor or ultra-capacitor that stores a charge for maintaining data stored in the memory of the controller 152.

Figure 12:
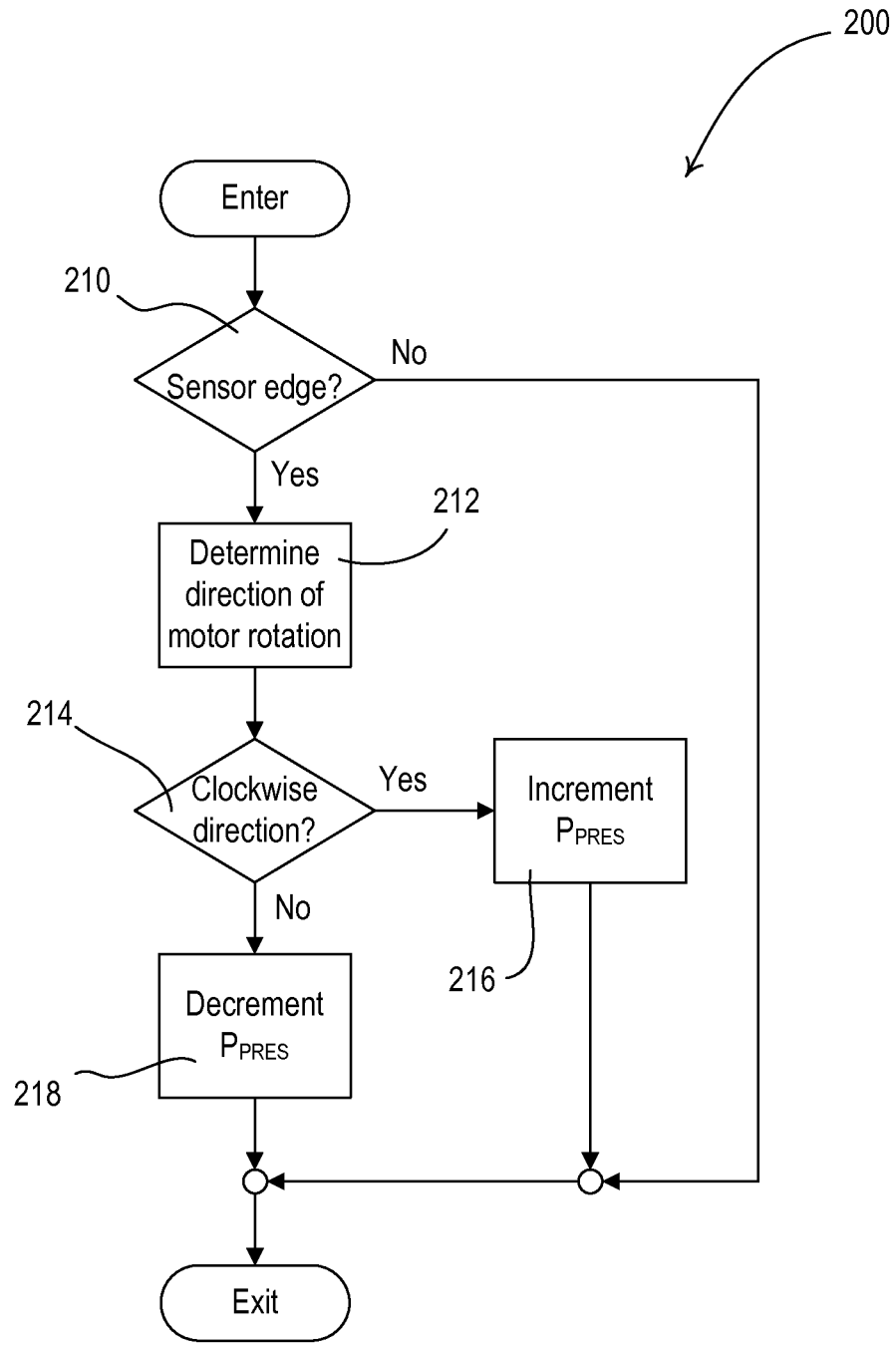
FIG. 12 is a simplified flowchart of a transmissive optical sensor edge procedure executed periodically by the controller of the motor drive unit of FIG. 9.

FIG. 12 is a simplified flowchart of the transmissive optical sensor edge procedure 200 executed periodically by the controller 152, e.g., every 10 msec, to determine the rotational position and direction of the motor. In addition, the transmissive optical sensor edge procedure 200 may be executed by the controller 152 in response to receiving the manual movement wake-up signal $V_{MAN\_WAKE}$. If the controller 152 has not received a transmissive optical sensor edge at step 210, the transmissive optical sensor edge procedure 200 simply exits. However, if the controller 152 has received a transmissive optical sensor edge from the transmissive optical sensor circuit 156 at step 210, the controller determines the direction of rotation of the motor 150 by comparing the consecutive edges of the first and second output signals 176, 178 at step 212. If the motor 150 is rotating in the clockwise direction at step 214, the controller 152 increments the present position $P_{PRES}$ (i.e., in terms of transmissive optical sensor edges) by one at step 216. If the motor 150 is rotating in the counter-clockwise direction at step 214, the controller 152 decrements the present position $P_{PRES}$ by one at step 218. After the present position $P_{PRES}$ is incremented or decremented at steps 216 and 218, respectively, the transmissive optical sensor edge procedure 200 exits.

A user of the window treatment system 100 is able to adjust the position of the weighting element 116 and the cellular shade fabric 112 by using the remote control 118 to transmit commands to the motor drive unit 120 via the IR signals. Referring back to FIG. 9, the IR receiver 166 receives the IR signals and provides an IR data control signal $V_{IR-DATA}$ to the controller 152, such that the controller is operable to receive the commands from the remote control 118. The controller 152 is operable to put the IR receiver 166 to sleep (i.e., disable the IR receiver) and to periodically wake the IR receiver up (i.e., enable the IR receiver) via an IR enable control signal $V_{IR-EN}$, as will be described in greater detail below. An example of an IR control system is described in greater detail in U.S. Pat. No. 6,545,434, issued Apr. 8, 2003, entitled MULTI-SCENE PRESET LIGHTING CONTROLLER, the entire disclosure of which is hereby incorporated by reference.

If the limits (i.e., the fully open position $P_{FULLY-OPEN}$ and the fully closed position $P_{FULLY-CLOSED}$) stored in the memory are incorrect, the controller 152 may attempt to drive the motor 150 to move the bottom bar 116 beyond a position that is mechanically allowable. If the movement of the bottom bar 116 is stopped by mechanical constraints before the controller 150 stops driving the motor 150, the motor 150 will drawn a large slug of current from the batteries 138 before the controller 150 notices that the bottom bar 116 has stopped moving and stops driving the motor 150. The PTC thermistor 155 limits the magnitude of the current drawn from the batteries 138 if the fully open position $P_{FULLY-OPEN}$ and the fully closed position $P_{FULLY-CLOSED}$ stored in the memory are incorrect. For example, the energy used to raise the bottom bar 116 from the fully closed position $P_{FULLY-CLOSED}$ to the fully open position $P_{FULLY-OPEN}$ may be approximately 78 Joules when the limits are set correctly resulting in a lifetime of the batteries of approximately 3 years (assuming that the cellular shade fabric 112 is moved twice a day). When the limits are set incorrectly and the PTC thermistor 155 limits the magnitude of the current drawn from the batteries 138, the energy used to raise the bottom bar 116 from the fully closed position $P_{FULLY-CLOSED}$ to the fully open position $P_{FULLY-OPEN}$ may be approximately 83 Joules resulting in a lifetime of the batteries of approximately 2.9 years. However, if the PTC thermistor 155 is not included in the motor drive unit 120 and the limits are set incorrectly, the energy used to raise the bottom bar 116 from the fully closed position $P_{FULLY-CLOSED}$ to the fully open position $P_{FULLY-OPEN}$ may be approximately 103 Joules resulting in a lifetime of the batteries 138 of approximately 2.5 years.

The motor drive unit 120 further comprises a power supply 157 (e.g., a linear regulator or a low quiescent current switching mode supply) that receives the battery input voltage $V_{B-IN}$ and generates a DC supply voltage $V_{CC}$ for powering the controller 152 and other low-voltage circuitry of the motor drive unit. The controller 152 is coupled to the power supply 157 and generates a voltage adjustment control signal $V_{ADJ}$ for adjusting the magnitude of the DC supply voltage $V_{CC}$ between a first nominal magnitude (e.g., approximately 2.7 volts) and a second increased magnitude (e.g., approximately 3.3 volts). The power supply 157 may comprise, for example, an adjustable linear regulator (or a switching mode supply) having one or more feedback resistors that are switched in and out of the circuit by the controller 152 to adjust the magnitude of the DC supply voltage $V_{CC}$. The controller 152 may adjust the magnitude of the DC supply voltage $V_{CC}$ to the second increased magnitude while the controller is driving the FETs $Q_1$-$Q_4$ of the motor drive circuit 154 to rotate the motor 150 (since the controller may require an increased supply voltage to drive the gates of the FETs). The controller 152 adjusts the magnitude of the DC supply voltage $V_{CC}$ to the first nominal magnitude when the controller is not controlling the motor drive circuit 154 to rotate the motor 150 (e.g., when the controller is in the sleep mode). The magnitude of the idle currents drawn by the controller 152, the IR receiver 166, and other low-voltage circuitry of the motor drive unit 120 may be significantly smaller when these circuits are powered by the first nominal magnitude of the DC supply voltage $V_{CC}$.

The motor drive unit 120 further comprises a battery monitoring circuit 158 that receives the battery input voltage $V_{B-IN}$ and provides a battery-monitor control signal $V_{MON}$ representative of the magnitude of the battery voltage $V_{BATT}$ to the controller 152. The battery monitoring circuit 158 may comprise for example a resistive voltage divider circuit (not shown) coupled in series between the battery input voltage $V_{B-IN}$ and circuit common, such that the battery-monitor control signal $V_{MON}$ is simply a scaled version of the battery voltage $V_{BATT}$. The controller 152 may include an analog-to-digital converter (ADC) for receiving and measuring the magnitude of the battery-monitor control signal $V_{MON}$ to thus determine the magnitude of the battery voltage $V_{BATT}$. The battery monitoring circuit 158 may further comprise a controllable switch, e.g., a NPN bipolar junction transistor (not shown), coupled in series with the resistive divider. The controller 152 may be operable to render the controllable switch conductive, such that the battery-monitor control signal $V_{MON}$ is representative of the magnitude of the battery voltage $V_{BATT}$, and to render the controllable switch non-conductive, such that the resistive divider does not conduct current and energy is conserved in the batteries 138.

According to an aspect of the present invention, the controller 152 is operable to determine that the magnitude of the battery voltage $V_{BATT}$ is getting low in response to the battery-monitor control signal $V_{MON}$ received from the battery monitoring circuit 158. Specifically, the controller 152 is operable to operate in a low-battery mode when the magnitude of the battery voltage $V_{BATT}$ drops below a first predetermined battery-voltage threshold $V_{B-TH1}$ (e.g., approximately 1.0 volts per D-cell battery). The controller 152 may be operable to recall the number of batteries 138 from memory for determining the value of the first predetermined battery-voltage threshold $V_{B-TH1}$. The controller 152 may control the motor drive circuit 154 so that the motor 150 is operated at a reduced speed (e.g., at half speed) to reduce the instantaneous power requirements on the batteries 138 when the controller 152 is operating in the low-battery mode. This would serve as an indication to a consumer that the battery voltage $V_{BATT}$ is low and the batteries 138 need to be changed.

When the magnitude of the battery voltage $V_{BATT}$ drops below a second predetermined battery-voltage threshold $V_{B-TH2}$ (less than the first predetermined battery-voltage threshold $V_{B-TH1}$, e.g., approximately 0.9 V per battery) while operating in the low-battery mode, the controller 152 may shut down electrical loads in the motor drive unit 120 (e.g., by disabling the IR receiver 166 and other low-voltage circuitry of the motor drive unit) and prevent movements of the cellular shade fabric 112 except to allow for at least one additional movement of the cellular shade fabric to the fully-open position $P_{FULLY-OPEN}$. Having the cellular shade fabric 112 at the fully-open position $P_{FULLY-OPEN}$ allows for easy replacement of the batteries. The second predetermined battery-voltage threshold $V_{B-TH2}$ may be sized to provide enough reserve energy in the batteries 138 to allow for the at least one additional movement of the cellular shade fabric 112 and the weighting element 116 to the fully-open position $P_{FULLY-OPEN}$.

When the magnitude of the battery voltage $V_{BATT}$ drops below a third predetermined battery-voltage threshold $V_{B-TH3}$ (less than the second predetermined battery-voltage threshold $V_{B-TH2}$, e.g., approximately 0.8 V per battery), the controller 152 may be operable to shut itself down (e.g., to hibernate) such that the circuitry of the motor drive unit 120 draws a minimal amount of current from the batteries 138 in order to protect against any potential leakage of the batteries.

Referring back to FIG. 9, the motor drive unit 120 comprises an alternate (or supplemental) power source, such as a backup battery 159 (e.g., a long-lasting battery), which generates a backup supply voltage $V_{BACKUP}$ (e.g., approximately 3.0 volts) for powering the controller 152. The DC supply voltage $V_{CC}$ generated by the power supply 157 is coupled to the controller 152 via a first diode $D_1$, and the backup supply voltage $V_{BACKUP}$ is coupled to the controller via a second diode $D_2$. The alternate power source provides the controller 152 with power when the batteries 138 are removed for replacement, or otherwise depleted, such that the position data relating to the position of the window treatment that is stored in the memory of the controller 152 is maintained. Alternatively, a large bus capacitor or an ultra-capacitor can be coupled to the controller 152 (rather than the backup battery 159), so that even when the batteries 138 are removed for replacement, an adequate charge will remain in the bus capacitor or ultra capacitor to maintain adequate voltage to keep the controller 152 charged for the period of time necessary to replace batteries 138 and thereby prevent loss of stored data in the memory of the controller. In addition, the back EMF generated across the motor 150 when the cellular shade fabric 112 is manually moved can also be used to charge the large bus capacitor or ultra-capacitor for maintaining data stored in the memory of the controller 152.

These embodiments allow the motor drive unit 120 to keep track of the position of the weighting element 116 of the window treatment 110 even when the batteries 138 are removed and the window treatment is manually operated (i.e., pulled). In such embodiments, the controller 152 continues to receive signals from transmissive optical sensor circuit 156, even when the batteries 138 are removed. Because it remains powered, the controller 152 will continue to calculate the position of the window treatment 110 when manually adjusted. It should be pointed out that the window treatment 110 of the present invention allows a user at any time to manually adjust the position of the window treatment, and that the position of the window treatment is always calculated both when the window treatment is moved by the motor or manually.

Another feature of the invention is that the controller 152 is preferably arranged to prevent the motor drive circuit 154 from operating to lower the cellular shade fabric 112 until an upper limit for the fabric is reset after a loss of power, e.g., if the batteries 138 are depleted. Thus, the motor drive unit 120 will not lower from the current raised position in the event of power loss. The user will be required to raise the cellular shade fabric 112 to the fully-open position before being able to lower the shade fabric.

As shown in FIG. 9, the motor drive unit 120 comprises an internal temperature sensor 160 that is located adjacent the internal side 122 of the headrail 114 (i.e., a room-side temperature sensor), and a external temperature sensor 162 that is located adjacent the external side 124 of the headrail (i.e., a window-side temperature sensor). The room-side temperature sensor 160 is operable to measure an interior temperature $T_{INT}$ inside the room in which the motorized window treatment 110 is installed, while the external temperature sensor 162 is operable to measure an exterior temperature $T_{EXT}$ between the headrail 114 and the window 104. The motor drive unit 120 further comprises a photosensor 164, which is located adjacent the external side 124 of the headrail 114, and is directed to measure the amount of sunlight that may be shining on the window 104. Alternatively, the exterior (window-side) temperature sensor 162 may be implemented as a sensor label (external to the headrail 114 of the battery powered motorized window treatment 110) that is operable to be affixed to an inside surface of a window. The sensor label may be coupled to the motor drive unit 120 through low voltage wiring (not shown).

The controller 152 receives inputs from the internal temperature sensor 160, the external temperature sensor 162, and the photosensor 164. The controller 152 may operate in an eco-mode to control the position of the weighting element 116 and the cellular shade fabric 112 in response to the internal temperature sensor 160, the external temperature sensor 162, and the photosensor 164, so as to provide energy savings. When operating in the eco-mode, the controller 152 adjusts the amount of the window 104 covered by the cellular shade fabric 112 to attempt to save energy, for example, by reducing the amount of electrical energy consumed by other control systems in the building in which the motorized window treatment 110 is installed. For example, the controller 152 may adjust the present position $P_{PRES}$ of the weighting element 116 to control the amount of daylight entering the room in which the motorized window treatment 110 is installed, such that lighting loads in the room may be turned off or dimmed to thus save energy. In addition, the controller 152 may adjust the present position $P_{PRES}$ of the weighting element 116 to control the heat flow through the window 104 in order to lighten the load on a heating and/or cooling system, e.g., a heating, air-conditioning, and ventilation (HVAC) system, in the building in which the motorized window treatment 110 is installed.

The controller 152 is coupled to the actuator 126 for receiving user inputs in response to actuations of the actuator 126. The controller 152 is further coupled to a light-emitting diode (LED) 168 for illumination the actuator 126 to thus provide feedback, for example, during configuration of the motorized window treatment 110 or if the battery voltage $V_{BATT}$ is low.

Figure 13A:
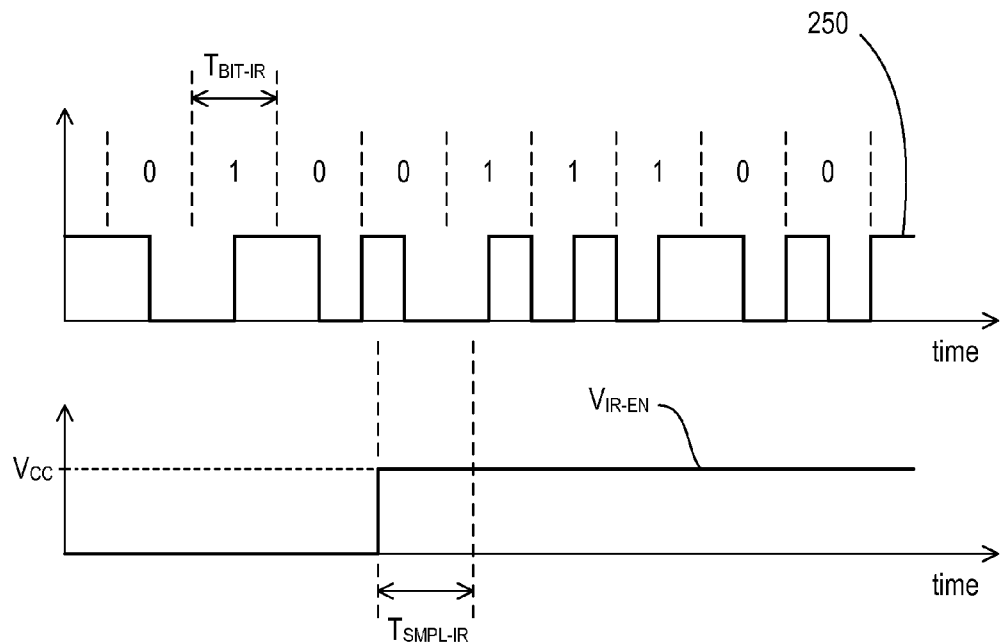
FIGS. 13A and 13B show examples of a Manchester-encoded digital message transmitted by the remote control of FIG. 1, and an infrared enable control signal of the motor drive unit of FIG. 9.

The IR remote control 118 is operable to transmit a predetermined number of packets (i.e., digital messages), for example, approximately six packets, to the motor drive unit 120 via the IR signals in response to an actuation of an actuator of the remote control. Each of the digital messages transmitted by the remote control 118 is encoded using Manchester encoding. FIG. 13A shows an example of a Manchester-encoded digital message 250 transmitted by the remote control 118. With Manchester encoding, the bits of the digital message 250, i.e., either a logic low (or zero) bit or a logic high (or one) bit, are encoded in the transitions (i.e., the edges) of the message. Specifically, the remote control 118 generates a "low-to-high" transition to transmit a logic high bit, and generates a "high-to-low" transition to transmit a logic low bit. The Manchester-encoded digital message 250 is split up into a plurality of bit time periods $T_{BIT-IR}$ (e.g., approximately 900 μsec) during which a "high-to-low" transition or a "low-to-high" transition will occur to thus transmit a logic low bit or a logic high bit respectively.

As previously mentioned, the controller 152 generates the IR enable control signal $V_{IR-EN}$ for enabling and disabling the IR receiver 166. When the IR remote control 118 is not presently transmitting IR signals to the IR receiver 166, the controller 152 operates the IR receiver in a sleep mode to conserve battery power. In the sleep mode, the IR receiver 166 is disabled for most of the time and is periodically enabled for short periods of time to determine if the IR remote control 118 has begun transmitting IR signals. FIG. 13A shows an example of the IR enable control signal $V_{IR-EN}$ generated by the controller 152 during the sleep mode. The controller 152 periodically enables the IR receiver 166 for a sample time period $T_{SMPL-IR}$ (e.g., approximately 3.2 msec) to determine if the IR remote control 118 is presently transmitting IR signals. After enabling the IR receiver 116 waits for a warm-up time period $T_{W-UP}$ (e.g. approximately 2.5 msec) for the IR receiver to reach its maximum sensitivity before attempting to detect a signal indicating the presence of IR signals. If the controller 152 does not detect a signal from the IR receiver 166 indicating the presence of IR signals during the sample time period $T_{SMPL-IR}$, the controller once again disables the IR receiver. However, if the controller 152 detects a signal from the IR receiver 166 indicating that the remote control 118 is presently transmitting IR signals, the controller keeps the IR receiver 166 enabled such that the controller is able to receive the Manchester-encoded digital message 250.

Figure 13B:
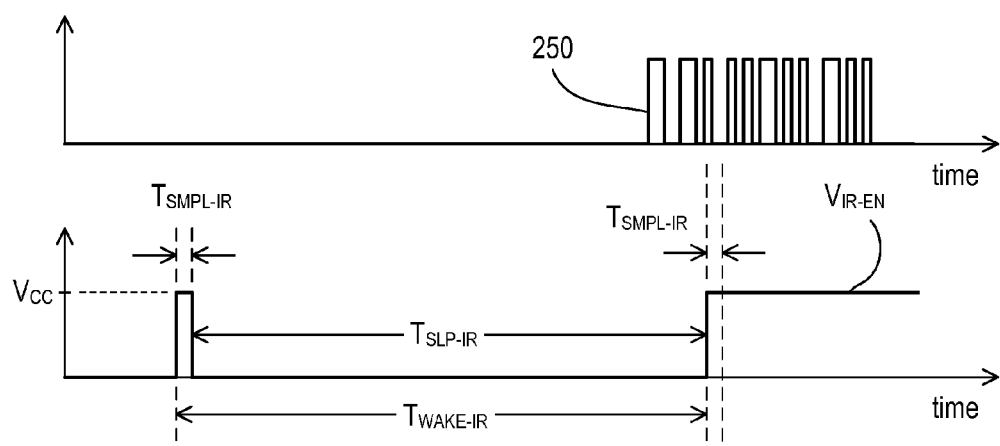

Since the IR remote control 118 transmits the digital messages using Manchester encoding, there is guaranteed to be at least one "low-to-high" or "high-to-low" transition during each bit time period $T_{BIT-IR}$ of the Manchester-encoded digital message 250 when the IR remote control 118 is transmitting IR signals to the IR receiver 166. Therefore, the sample time period $T_{SMPL-IR}$ of the IR enable control signal $V_{IR-EN}$ during the sleep mode can be sized to be as small as the bit time period $T_{BIT-IR}$ of the Manchester-encoded digital message 250 (i.e., approximately 900 μsec). FIG. 13B shows examples of the Manchester-encoded digital message 250 and the IR enable control signal $V_{IR-EN}$ on a different time scale. The controller 152 wakes the IR receiver 166 up at a wakeup period $T_{WAKE-IR}$ (e.g., approximately 145.7 msec) such that there is a sleep time period $T_{SLP-IR}$ (e.g., approximately 140 msec) between each sample time period $T_{SAMPLE}$. Accordingly, the controller 152 is operable to enable the IR receiver 166 using a duty cycle of approximately 3.9% during the sleep mode.

Figure 14:
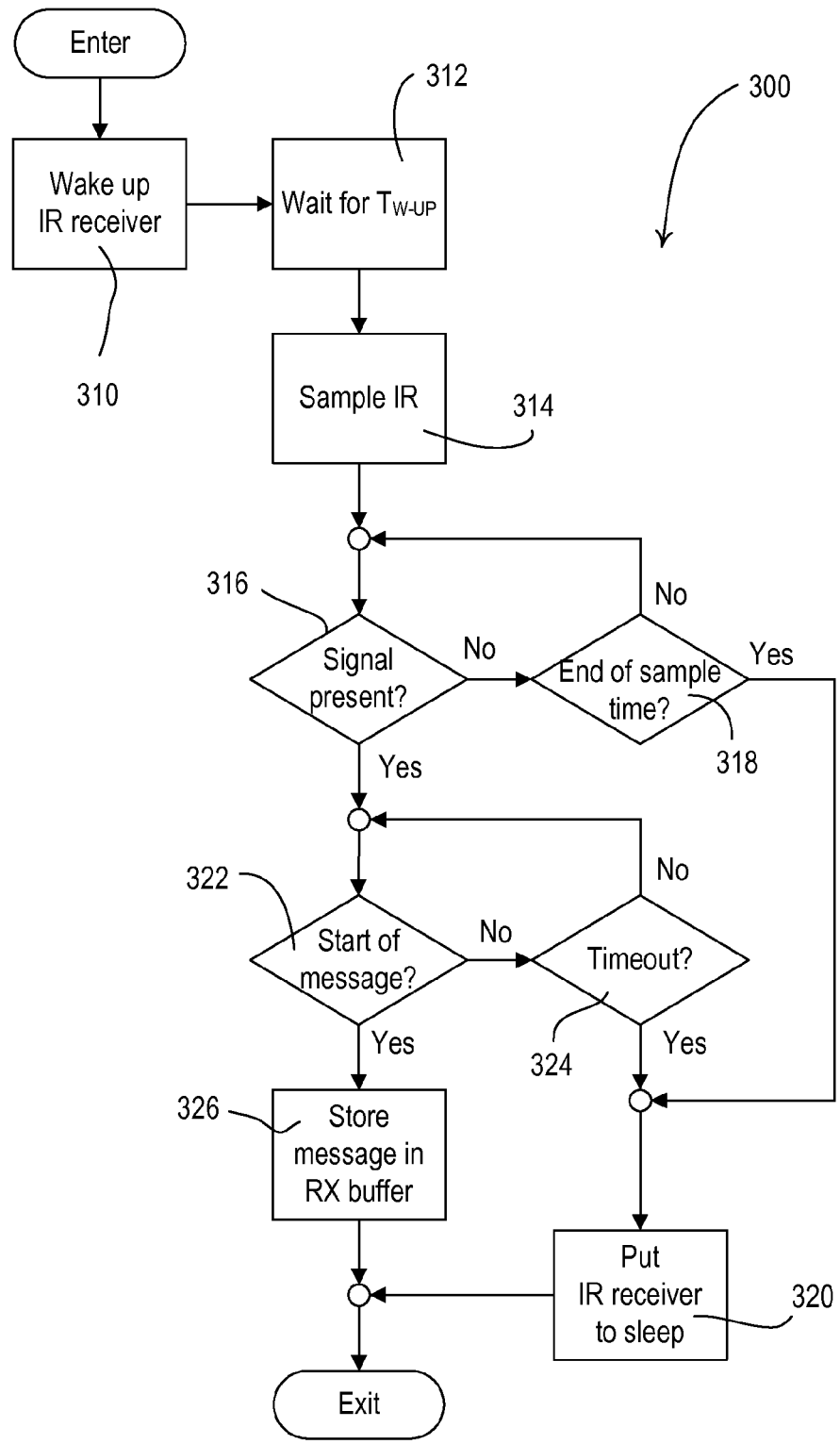
FIG. 14 is a simplified flowchart of an infrared (IR) signal receiving procedure executed periodically by a controller of the motor drive unit of FIG. 9.

FIG. 14 is a simplified flowchart of an IR signal receiving procedure 300 executed periodically by the controller 152 (e.g., approximately every 145.7 msec). The controller 152 first wakes up the IR receiver 166 at step 310 by driving the IR enable control signal $V_{IR-EN}$ high (i.e., to approximately the supply voltage $V_{CC}$), then waits for the warm-up time period $T_{W-UP}$ (i.e., approximately 2.5 msec) for the IR receiver to reach its maximum sensitivity at step 312, and then samples the IR energy at step 314. If the controller 152 does not detect an indication that an IR signal is present at step 316 before the end of the sample time $T_{SMPL-IR}$ at step 318, the controller 152 simply puts the IR receiver 166 back to sleep at step 320 by controlling the IR enable control signal $V_{IR-EN}$ low (i.e., to approximately circuit common), and the IR signal receiving procedure 300 exits. However, if the controller 152 detects an indication that the remote control 118 is presently transmitting IR signals at step 316, the controller 152 then waits for beginning of the start of a digital message transmitted by the remote control at step 322. If the controller 152 receives the start of a message at step 322 before a timeout expires at step 324, the controller 152 stores the received message in a receive (RX) buffer at step 326. If the controller 152 does not receive the start of a message at step 322 before the timeout expires at step 324, the controller puts the IR receiver 166 to sleep at step 320, before the IR signal receiving procedure 300 exits.

Figure 15:
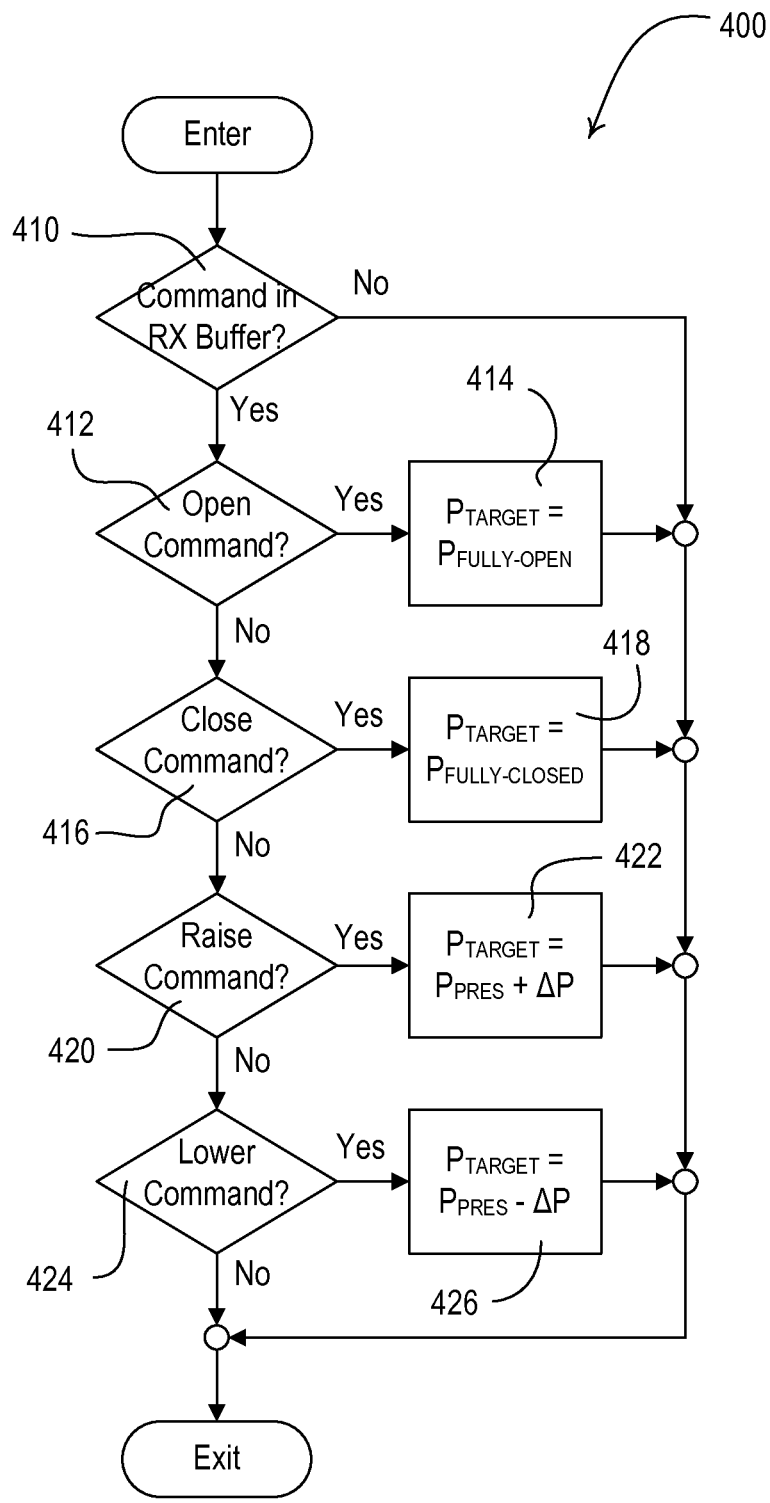
FIG. 15 is a simplified flowchart of a command procedure executed periodically by the controller of the motor drive unit of FIG. 9.

FIG. 15 is a simplified flowchart of a command procedure 400 executed periodically by the controller 152. If there is not a command in the RX buffer at step 410, the command procedure 400 simply exits. However, if there is an open command in the RX buffer at step 412, the controller 152 sets the target position $P_{TARGET}$ equal to the fully-open position $P_{FULLY-OPEN}$ at step 414, before the command procedure 400 exits. If the received command is a close command at step 416, the controller 152 sets the target position $P_{TARGET}$ equal to the fully-closed position $P_{FULLY-CLOSED}$ at step 418 and the command procedure 400 exits. If the received command is a raise command at step 420 or a lower command at step 424, the controller 152 respectively increases the target position $P_{TARGET}$ by a predetermined increment ΔP at step 422 or decreases the target position $P_{TARGET}$ by the predetermined increment ΔP at step 426, before the command procedure 400 exits.

Figure 16:
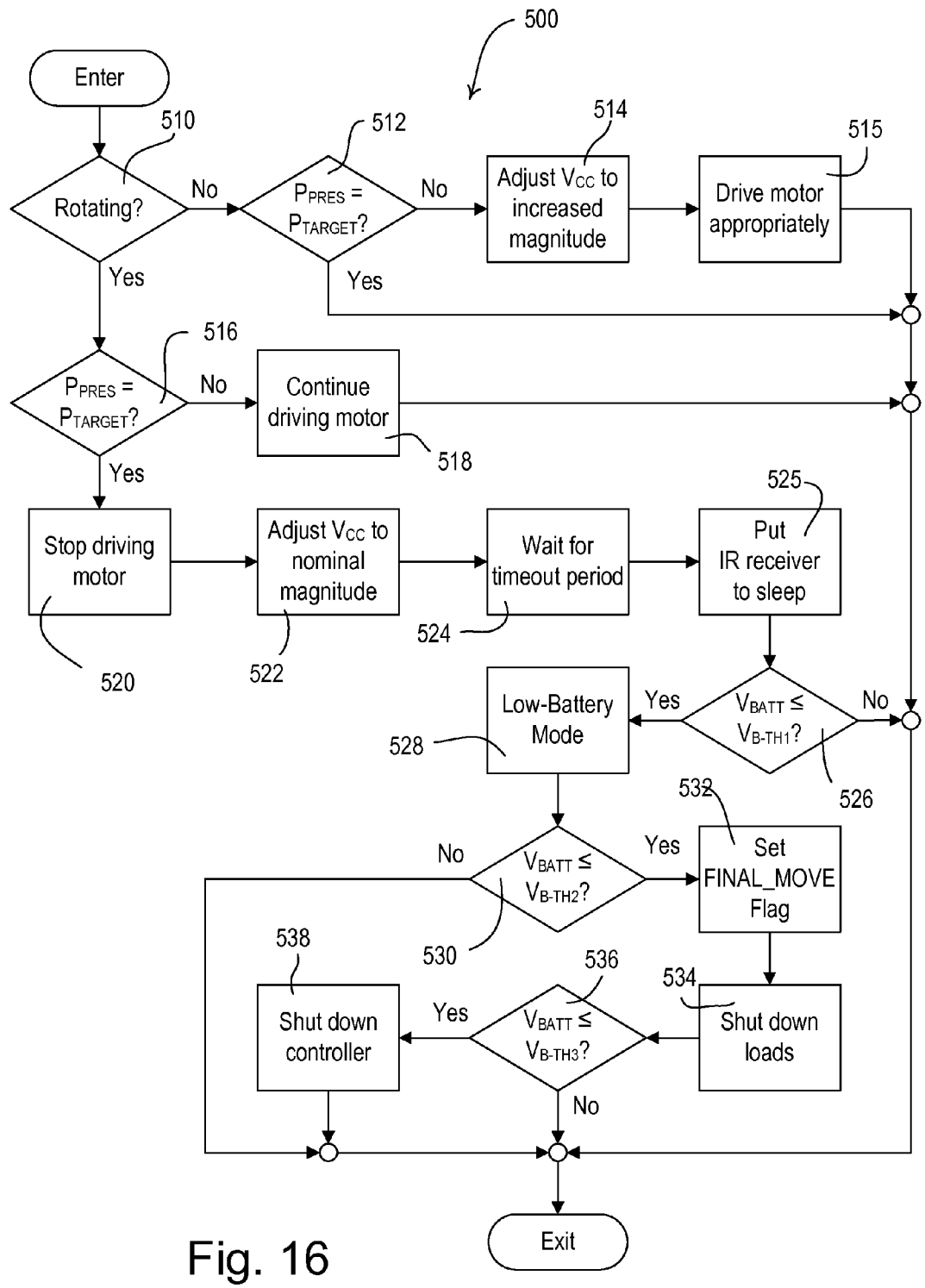
FIG. 16 is a simplified flowchart of a motor control procedure executed periodically by the controller of the motor drive unit of FIG. 9.

FIG. 16 is a simplified flowchart of a motor control procedure 500 executed periodically by the controller 152 (e.g., every two msec). If the motor 150 is not presently rotating at step 510 and the present position $P_{PRES}$ is equal to the target position $P_{TARGET}$ at step 512, the motor control procedure 500 simply exits without controlling the motor. However, if the motor 150 is not presently rotating at step 510 and the present position $P_{PRES}$ is not equal to the target position $P_{TARGET}$ at step 512, the controller 152 controls the voltage adjustment control signal $V_{ADJ}$ to adjust the magnitude of the DC supply voltage $V_{CC}$ to the increased magnitude (i.e., approximately 3.3 volts) at step 514. The controller 152 then begins to control the H-bridge drive circuit 154 to drive the motor 150 appropriately at step 515, so as to move the weighting element 116 towards the target position $P_{TARGET}$.

If the motor 150 is presently rotating at step 510, but the present position $P_{PRES}$ is not yet equal to the target position $P_{TARGET}$ at step 516, the controller 512 continues to drive the motor 150 appropriately at step 518 and the motor control procedure 500 exits. If the motor 150 is presently rotating at step 510 and the present position $P_{PRES}$ is now equal to the target position $P_{TARGET}$ at step 516, the controller 152 stops driving the motor at step 520 and controls the voltage adjustment control signal $V_{ADJ}$ to adjust the magnitude of the DC supply voltage $V_{CC}$ to the nominal magnitude (i.e., approximately 2.7 volts) at step 522. The controller 152 then waits for a timeout period (e.g., approximately 200 msec) at step 524, and puts the IR receiver 166 back to sleep at step 525.

As previously mentioned, the controller 152 operates in a low-battery mode when the magnitude of the battery voltage $V_{BATT}$ is getting low. Specifically, if the magnitude of the battery voltage $V_{BATT}$ has dropped below the first battery-voltage threshold $V_{B-TH1}$ at step 526, the controller 152 begins at step 528 to operate in the low-battery mode during which the controller 152 will operate the motor at a reduced speed (i.e., at half speed). If the magnitude of the battery voltage $V_{BATT}$ is less than or equal to the second battery-voltage threshold $V_{B-TH2}$ at step 530, the controller 152 allows for one last movement of the cellular shade fabric 112 and the weighting element 116 to the fully-open position $P_{FULLY-OPEN}$ by setting a FINAL_MOVE flag in memory at step 532. At step 534, the controller 152 shuts down all unnecessary loads of the motor drive unit 120 (e.g., the external temperature sensor 162, the photosensor 164, the internal temperature sensor 160, and the IR receiver 166) and prevents the motor 150 from moving the cellular shade fabric 112 and the weighting element 116 except for one last movement to the fully-open position $P_{FULLY-OPEN}$. If the magnitude of the battery voltage $V_{BATT}$ is less than or equal to the third battery-voltage threshold $V_{B-TH3}$ at step 536, the controller 152 shuts itself down at step 538 such that no other circuits in the motor drive unit 120 consume any power to thus protect against any potential leakage of the batteries 138. Otherwise, the motor control procedure 500 exits.

According to an alternate embodiment of the present invention, the controller 152 is operable to monitor the magnitude of the battery voltage $V_{BATT}$ while the controller is driving the H-bridge drive circuit 154 to rotate the motor 150. Since the batteries 138 are each characterized by an equivalent series resistance (ESR), the magnitude of the battery voltage $V_{BATT}$ will be the lowest magnitude when the motor 150 is rotating and drawing a maximum amount of current (i.e., a peak current) from the batteries. According to the alternate embodiment, the controller 152 only compares the magnitude of the battery voltage $V_{BATT}$ to a single battery-voltage threshold $V_{B-TH}$ (e.g., approximately 0.8 volt per battery). When the magnitude of the battery voltage $V_{BATT}$ drops below the battery-voltage threshold $V_{B-TH}$ for the first time while the controller 152 is driving the motor 150 (i.e., when the controller is operating in a normal mode of operation), the controller then begins operating in a first low-battery mode during which the controller rotates the motor at a reduced speed (e.g., at half speed). Accordingly, the motor 150 will draw less current from the batteries 138 in the first low-battery mode and the magnitude of the battery voltage $V_{BATT}$ will recover, i.e., increase back up above the battery-voltage threshold $V_{B-TH}$.

When the magnitude of the battery voltage $V_{BATT}$ drops below the battery-voltage threshold $V_{B-TH}$ again, i.e., while the controller 152 is driving the motor 150 in the first low-battery mode, the controller begins operating in a second low-battery mode during which the controller 152 stops driving the motor 150 and simply blinks the LED 168 (and thus the actuator 126) to provide feedback to the user that the battery voltage $V_{BATT}$ is low. Once again, the battery voltage $V_{BATT}$ will recover and rise above the battery-voltage threshold $V_{B-TH}$. When the magnitude of the battery voltage $V_{BATT}$ drops below the battery-voltage threshold $V_{B-TH}$ while in the second low-battery mode, the controller 152 enters a third low battery mode in which the controller hibernates (e.g., shuts down), such that the circuitry of the motor drive unit 120 draws a minimal amount of current from the batteries 138 and the batteries are protected against potential leakage.

Because the controller 152 is monitoring the magnitude of the battery voltage $V_{BATT}$ while the H-Bridge drive circuit 154 is driving the motor 150 with the PWM signal at the constant frequency (i.e., approximately 20 kHz), a low-pass filter circuit is coupled between the output of the battery monitoring circuit 158 and the controller 152 according to the alternate embodiment to thus smooth out the 20-kHz ripple on the battery voltage $V_{BATT}$. In addition, the controller 152 may be operable to sample the filtered battery-monitor control signal $V_{MON}$ at a sampling period (e.g., approximately 3 μsec) to collect a predetermined number of samples (e.g., approximately 16 samples) and then average the predetermined number of samples to generate a battery voltage sample that may be compared to the battery-voltage threshold $V_{B-TH}$.

Figure 17:
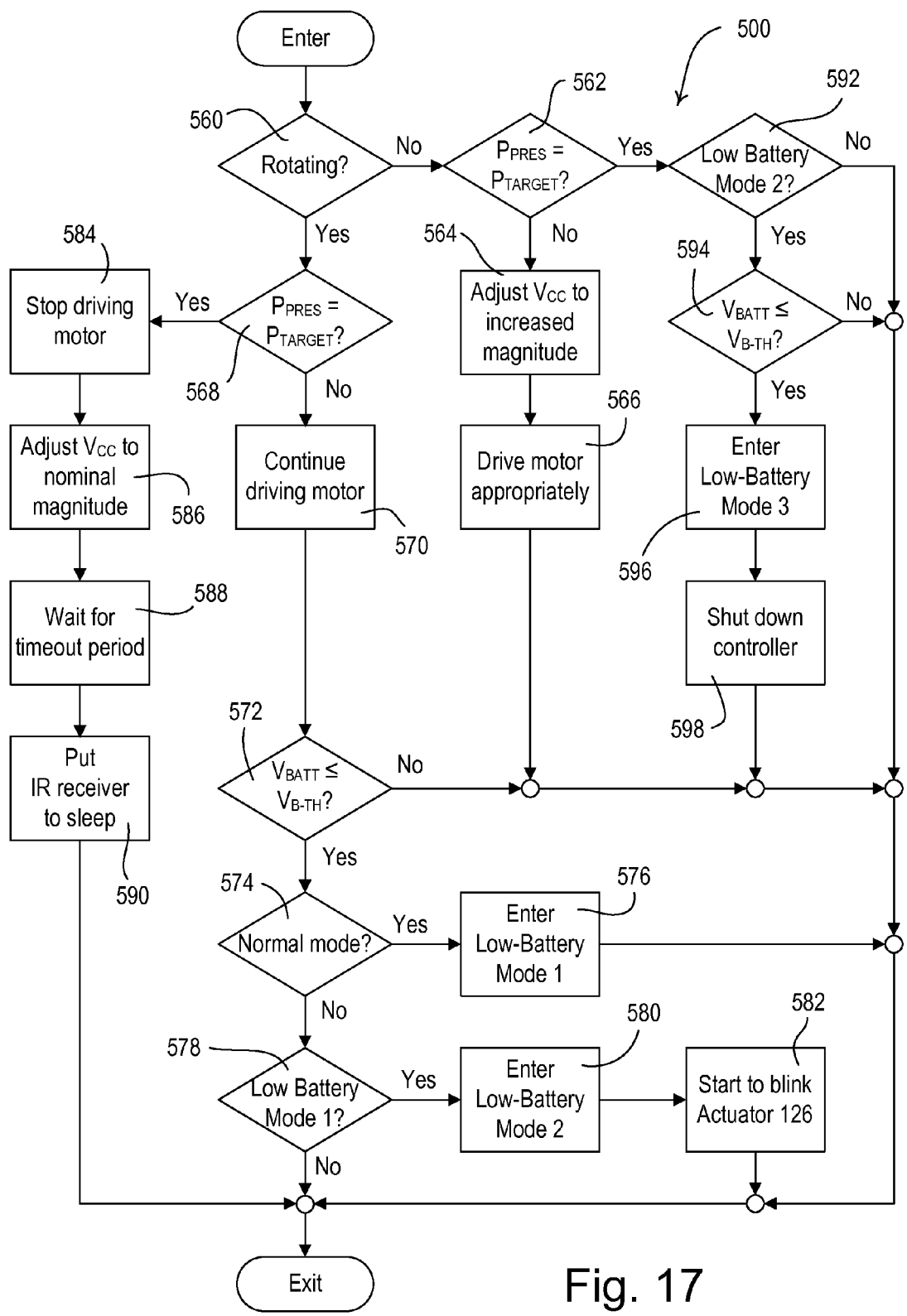
FIG. 17 is a simplified flowchart of a motor control procedure executed periodically by the controller of the motor drive unit.

FIG. 17 is a simplified flowchart of a motor control procedure 550 executed periodically by the controller 152 (e.g., every two msec) according to the alternate embodiment of the present invention. If the motor 150 is not presently rotating at step 560 and the present position $P_{PRES}$ is not equal to the target position $P_{TARGET}$ at step 562, the controller 152 controls the voltage adjustment control signal $V_{ADJ}$ to adjust the magnitude of the DC supply voltage $V_{CC}$ to the increased magnitude at step 564. The controller 152 then drives the motor 150 appropriately at step 566 to move the weighting element 116 towards the target position $P_{TARGET}$ and the motor control procedure 500 exits.

If the motor 150 is presently rotating at step 560, but the present position $P_{PRES}$ is not yet equal to the target position $P_{TARGET}$ at step 568, the controller 512 continues to drive the motor 150 appropriately at step 570. The controller 152 then compares the magnitude of the battery voltage $V_{BATT}$ (i.e., the generated battery voltage sample) to the battery-voltage threshold $V_{B-TH}$ at step 572. If the magnitude of the battery voltage $V_{BATT}$ is less than or equal to the battery-voltage threshold $V_{B-TH}$ at step 572 and the controller 152 is operating in the normal mode at step 574, the controller begins operating in the first low-battery mode at step 576 during which the controller operates the motor 150 at a reduced speed (i.e., at half speed). If the controller 152 is not operating in the normal mode at step 574, but is operating in the first low-battery mode at step 578, the controller begins operating in the second low-battery mode at step 580 during which the controller stops driving the motor 150. The controller 152 then begins to blink the LED 168 and the actuator 126 to provide feedback that the battery voltage $V_{BATT}$ is low at step 582, and the motor control procedure 500 exits.

When the present position $P_{PRES}$ becomes equal to the target position $P_{TARGET}$ at step 568, the controller 152 stops driving the motor at step 584 and controls the voltage adjustment control signal $V_{ADJ}$ to adjust the magnitude of the DC supply voltage $V_{CC}$ to the nominal magnitude at step 586. The controller 152 then waits for a timeout period (e.g., approximately 200 msec) at step 588, and puts the IR receiver 166 to sleep at step 590. If the motor 150 is not presently rotating at step 560 and the present position $P_{PRES}$ is equal to the target position $P_{TARGET}$ at step 562, the controller 152 monitors the magnitude of the battery voltage $V_{BATT}$ when the controller is operating in the second low-battery mode at step 592. If the magnitude of the battery voltage $V_{BATT}$ is less than or equal to the battery-voltage threshold $V_{B-TH}$ at step 594 when the controller is operating in the second low-battery mode at step 592, the controller 152 begins to operate in the third low-battery mode at step 596 and shuts down (i.e., hibernates) at step 598, such that the circuitry of the motor drive unit 120 draws a minimal amount of current from the batteries 138 and the batteries are protected against potential leakage. While the controller 152 checks the to see if the magnitude of the battery voltage $V_{BATT}$ is less than or equal to the battery-voltage threshold $V_{B-TH}$ every time that the motor control procedure 550 is executed (e.g., every two msec) when the controller is operating in the second low-battery mode, the controller 152 could alternatively monitor the magnitude of the battery voltage $V_{BATT}$ in the second low-battery mode as part of a separate procedure that may be executed less often, for example, every hour.

Figure 18A:
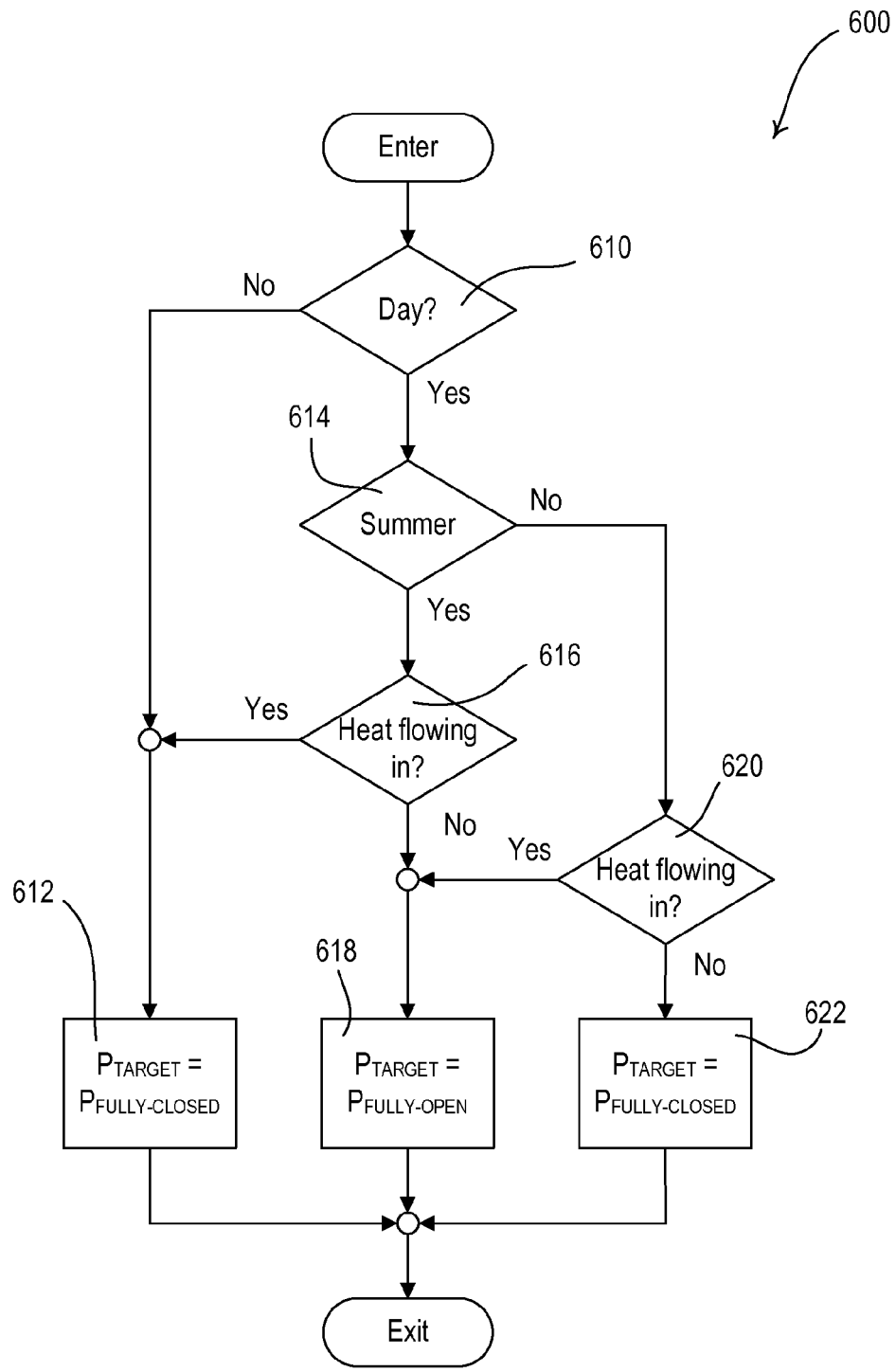
FIG. 18A is a simplified flowchart of an eco-mode procedure executed periodically by the controller of the motor drive unit of FIG. 9.

FIG. 18A is a simplified flowchart of an eco-mode procedure 600 executed periodically by the controller 152 when the controller is operating in the eco-mode. For example, the controller 152 may be operable to enter the eco-mode in response to command received from the IR remote control 118. When executing the eco-mode procedure 600, the controller 152 first determines if the present time of day is daytime or nighttime at step 610 using the photosensor 164, which faces the window 104 in front of which the motorized window treatment 110 is installed. For example, if the light intensity measured by the photosensor 164 is less than a nighttime intensity threshold, the controller 152 may determine that the present time of day is nighttime. The nighttime intensity threshold may be predetermined and stored in the memory of the controller 152. Alternatively, the controller 152 may be operable to modify the nighttime intensity threshold by measuring the minimum light intensities measured by the photosensor 164 over a period of time, and updating the nighttime intensity threshold based upon these measurements. If the controller 152 determines that the present time of day is night at step 610, the controller sets the target position $P_{TARGET}$ equal to the fully-closed position $P_{FULLY-CLOSED}$ at step 612 and the eco-mode procedure 600 exits.

If the controller 152 determines that the present time is daytime at step 610, the controller 512 then determines the present time of year at step 614, for example, by determining if the present time of year is summer or winter. The controller 152 may be operable to determine the length of daylight (e.g., the time each day that the light intensity measured by the photosensor 164 exceeds the nighttime intensity threshold) and to compare the determined length of daylight to data representing typical day lengths, e.g., data from the American Society of Heating, Refrigerating and Air Conditioning Engineers (ASHRAE).

The controller 152 is further able to determine at step 616 if heat is flowing through the window 104 into the room or out of the room by comparing the exterior temperature $T_{EXT}$ measured by the external temperature sensor 162 to the interior temperature $T_{INT}$ measured by the room-side temperature sensor 160. For example, if the exterior temperature $T_{EXT}$ is greater than the interior temperature $T_{INT}$, the controller 152 may determine that heat is flowing into the room through the window 104. If the exterior temperature $T_{EXT}$ is less than the interior temperature $T_{INT}$, the controller 152 may determine that heat is flowing out of the window 104.

If the present time of year is summer at step 614 and heat is flowing into the room through the window 104 at step 616, the controller 152 sets the target position $P_{TARGET}$ equal to the fully-closed position $P_{FULLY-CLOSED}$ at step 612 to close the motorized window treatment 110 and prevent the sunlight from heating the room. If the present time of year is summer at step 614 and heat is flowing out of the window 104 at step 616, the controller 152 sets the target position $P_{TARGET}$ equal to the fully-open position $P_{FULLY-OPEN}$ at step 618 to open the motorized window treatment 110 to take advantage of the daylight, such that the lighting loads in the room may be turned off or dimmed. If the present time of year is winter at step 614 and heat is flowing into the room through the window 104 at step 620, the controller 152 opens the motorized window treatment 110 at step 618 to allow the sunlight to heat the room. If the present time of year is winter at step 614 and heat is flowing out of the window 104 at step 620, the controller 152 closes the motorized window treatment 110 at step 622 to insulate the room and prevent heat from flowing out the room.

Figure 18B:
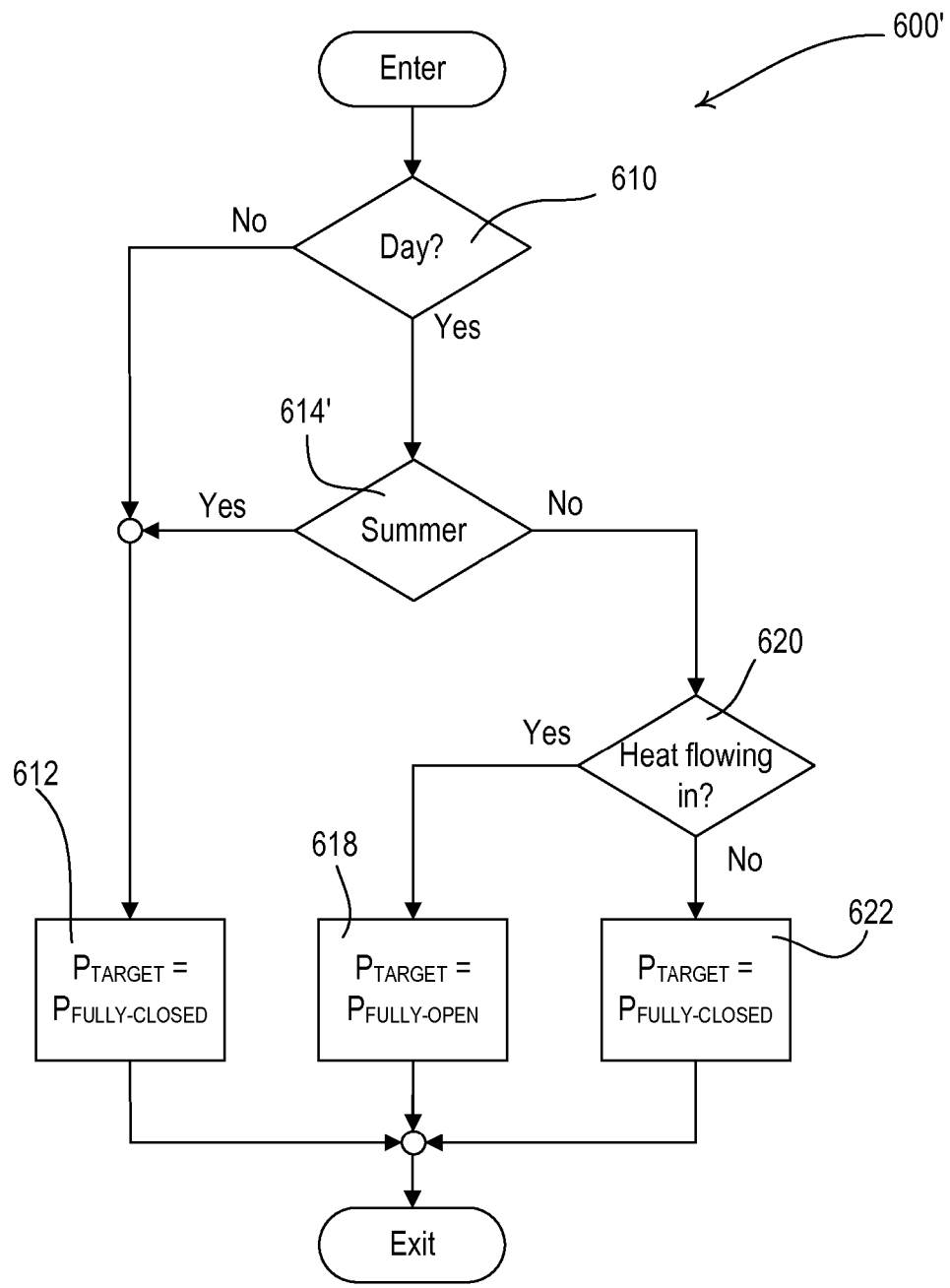
FIG. 18B is a simplified flowchart of an alternative eco-mode procedure executed periodically by the controller of the motor drive unit of FIG. 9.

FIG. 18B is a simplified flowchart of an eco-mode procedure 600' according to an alternate embodiment executed periodically by the controller 152 when the controller is operating in the eco-mode. Many of the steps of the eco-mode procedure 600' are similar to those of eco-mode procedure 600. However, if the controller 152 determines that the present time is daytime at step 610, then the controller determines if the present time of year is summer at step 614'. If the controller 152 determines that the present time of year is summer, then the controller simply sets the target position $P_{TARGET}$ equal to the fully-closed position $P_{FULLY-CLOSED}$ at step 612 to close the motorized window treatment 110 and prevent the sunlight from heating the room, before the eco-mode procedure 600' exits. Otherwise, the controller 152 executes steps 618-622 as described above with respect to eco-mode procedure 600, before the eco-mode procedure 600' exits.

Alternatively, the motor drive unit 120 may not comprise the internal temperature sensor 160, but could simply assume that the internal temperature $T_{INT}$ inside the room is a predetermined room temperature (e.g., approximately 22° C.).

Figure 19:
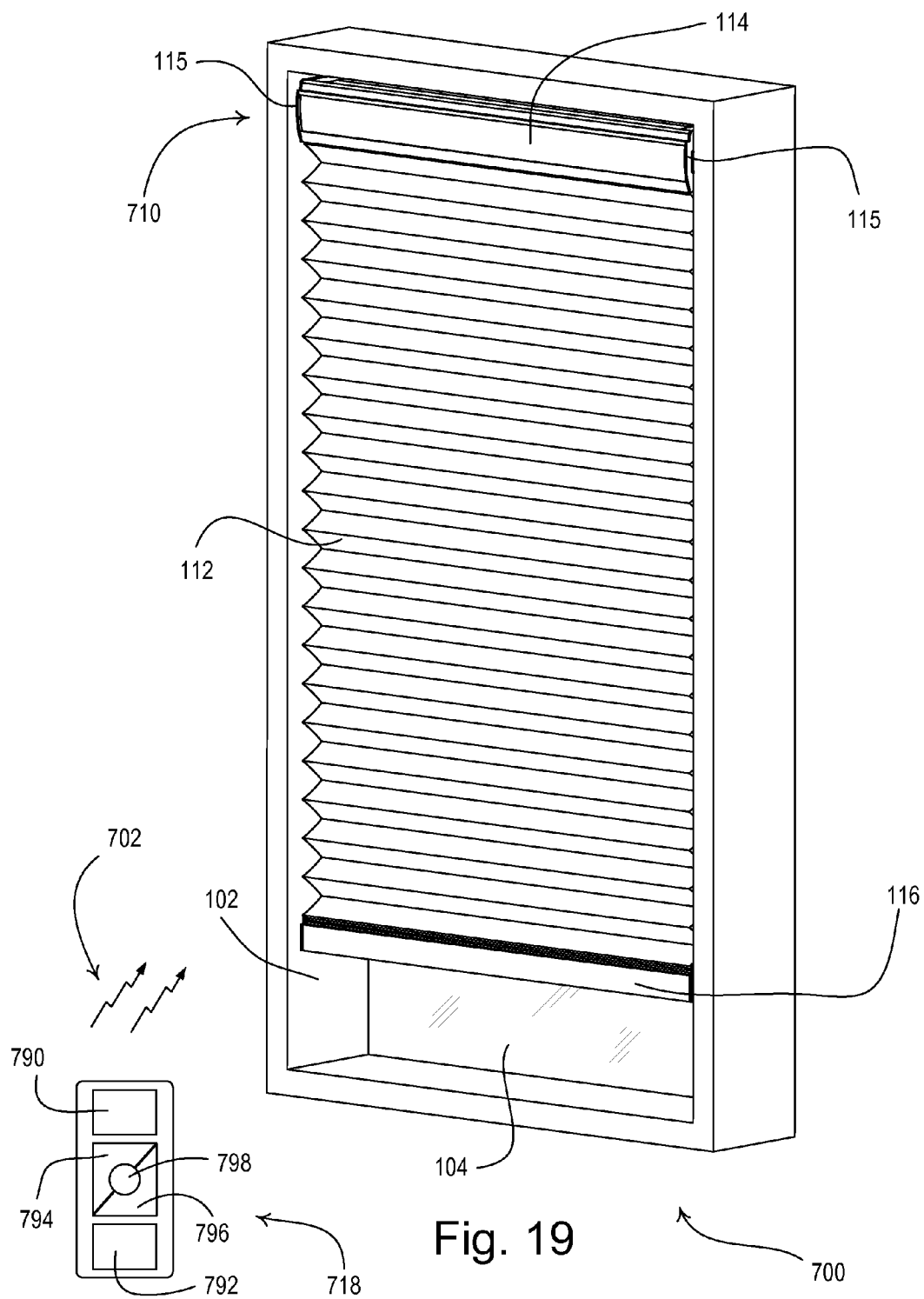
FIG. 19 is a perspective view of a motorized window treatment system having a battery-powered motorized window treatment that is operable to receive RF signals from an RF remote control according to a second embodiment of the present invention.

The IR receiver 166 could alternatively comprise a radio-frequency (RF) receiver or transceiver for receiving RF signals transmitted by an RF remote control. FIG. 19 is a perspective view of a motorized window treatment system 700 having a battery-powered motorized window treatment 710 and an RF remote control 718 for transmitting RF signals 706 to the motorized window treatment using, for example, a frequency-shift keying (FSK) modulation technique, to thus for control the operation of the motorized window treatment. Specifically, the RF remote control 718 is operable to transmit digital messages including commands to control the motorized window treatment 710 in response to actuations of a plurality of buttons, e.g., an open button 790, a close button 792, a raise button 794, a lower button 796, and a preset button 798. The motorized window treatment 710 controls the cellular shade fabric 112 to the fully-open position $P_{FULLY-OPEN}$ and the fully-closed position $P_{FULLY-CLOSED}$ in response to actuations of the open button 790 and the close button 792 of the remote control 718, respectively. The motorized window treatment 710 raises and lowers the cellular shade fabric 112 in response to actuations of the raise button 794 and the lower button 796, respectively. The motorized window treatment 710 controls the cellular shade fabric 112 to a preset position $P_{PRESET}$ in response to actuations of the preset button 798.

Figure 20:
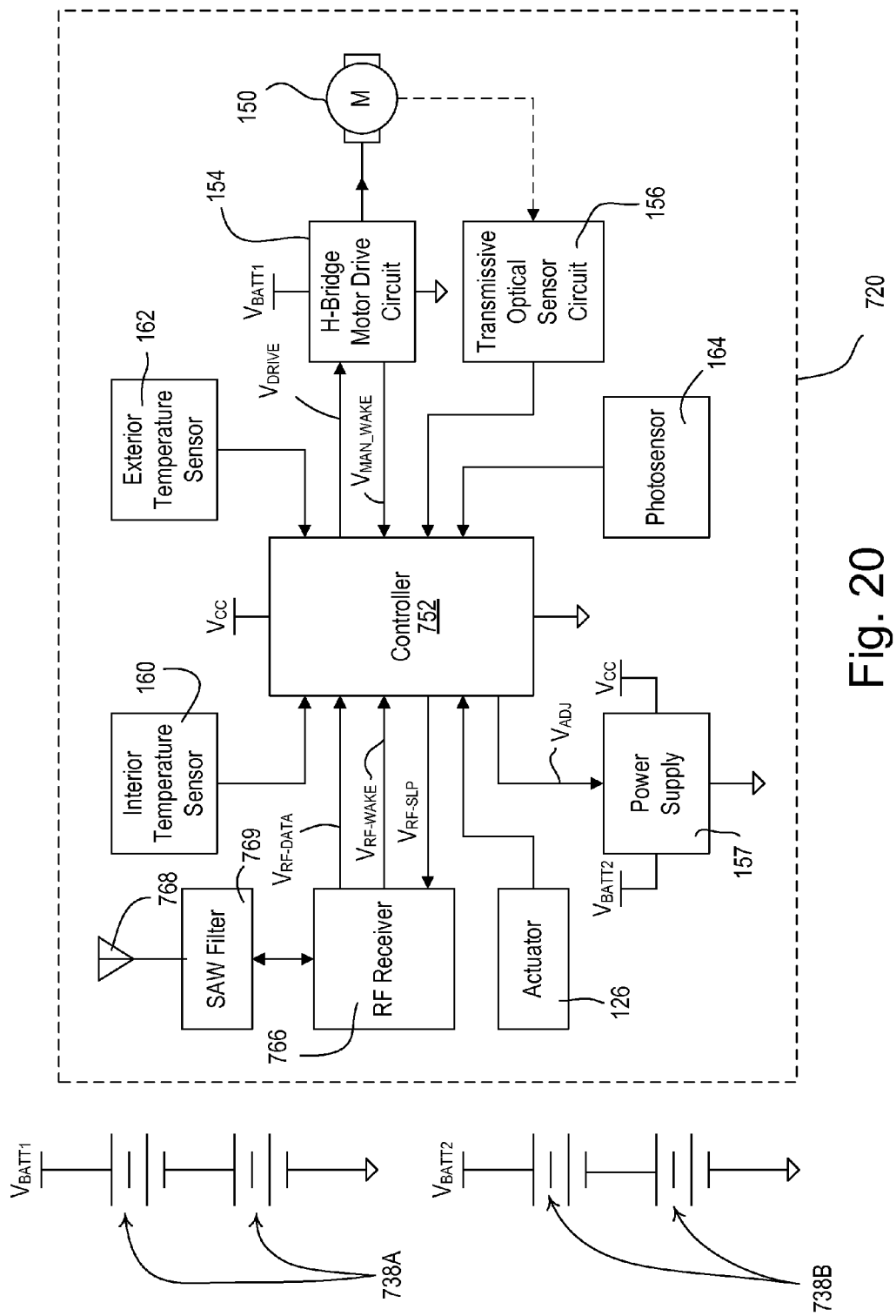
FIG. 20 is a simplified block diagram of a motor drive unit of the battery-powered motorized window treatment of FIG. 19.

FIG. 20 is a simplified block diagram of a motor drive unit 720 of the battery-powered motorized window treatment 710 of the second embodiment. The motor drive unit 720 of the second embodiment is substantially similar to the motor drive unit 120 of the first embodiment. However, the motor drive unit 720 comprises an RF receiver 766 coupled to an antenna 768 (e.g., a wire antenna) for receiving the RF signals 706. The antenna 768 is coupled to the RF receiver 766 via a surface acoustic wave (SAW) filter 769 (e.g., part number B3580 as manufactured by Epcos AG), which acts to filter RF noise as will be described in greater detail below. The RF receiver 766 is operable to provide an RF data control signal $V_{RF-DATA}$ representative of the received RF signals 706 to a controller 752, such that the controller is operable to control the H-bridge motor drive circuit 154 in response to the received signals.

Figure 21A:
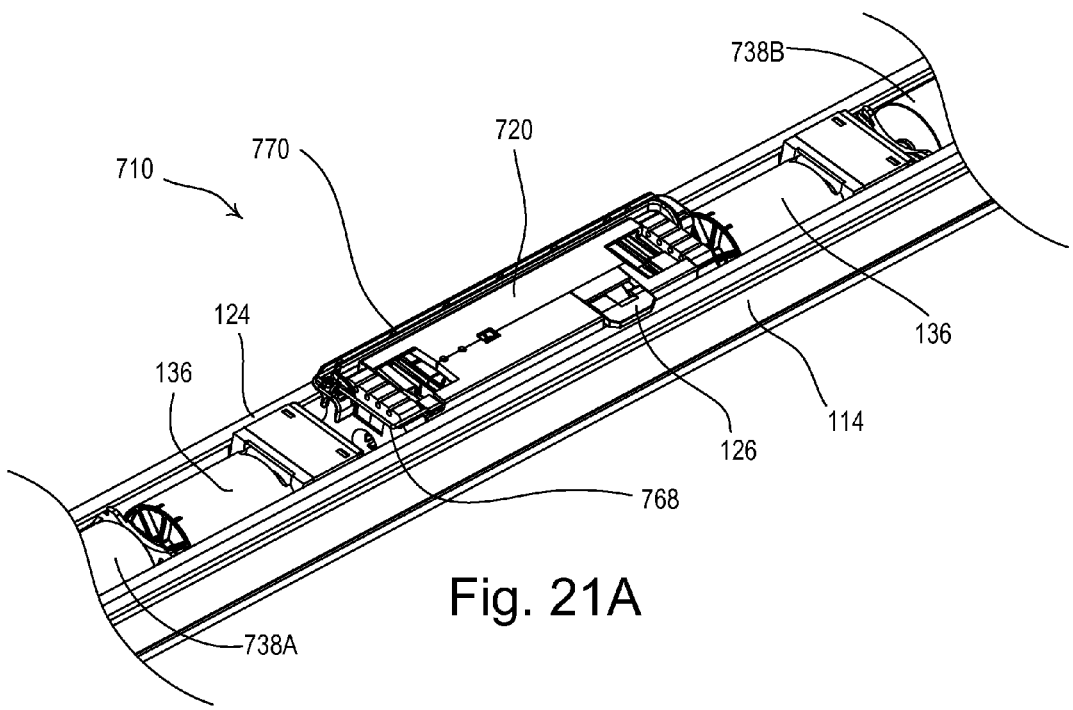
FIGS. 21A and 21B are partial perspective views of the motor drive unit and a headrail of the motorized window treatment of FIG. 19.
Figure 21B:
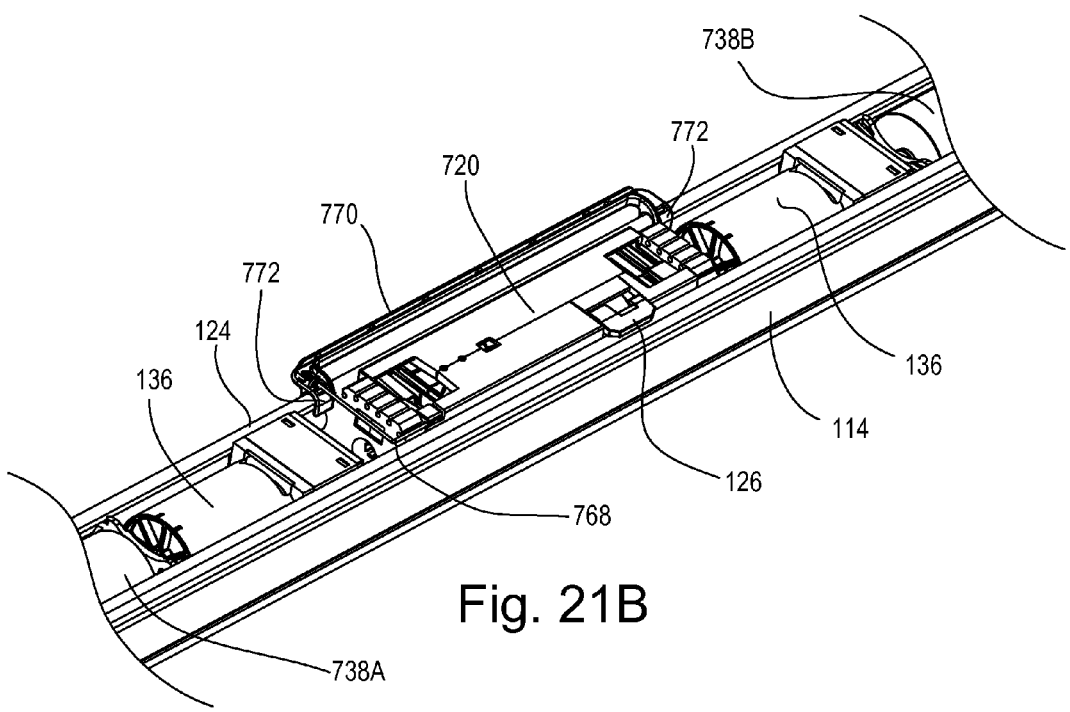

FIGS. 21A and 21B are partial perspective views of the motor drive unit 720 and the headrail 114 of the motorized window treatment 710 of the second embodiment. The antenna 768 is adapted to extend from the motor drive unit 720 and is received in an elongated antenna wire carrier 770. As shown in FIG. 21A, the antenna wire carrier 770 may be located in a first position immediately adjacent the motor drive unit 720 above the external side 124 of the headrail 114. The antenna wire carrier 770 may be removed from the first position and re-located into a second position in which the antenna 768 is slightly offset (e.g., by a distance of approximately 0.4 inch) from the motor drive unit 720 as shown in FIG. 21B. The antenna wire carrier 770 comprises clips 772 that are adapted to snap onto the top edge of the external side 124 of the headrail 114 in the second position. The antenna wire carrier 770 provides a mechanical means for adjusting the RF sensitivity of the RF receiver 766 and thus the power consumed by the RF receiver 766. When the antenna wire carrier 770 is located in the second position (as shown in FIG. 21B), the RF receiver 766 has an increased RF sensitivity (e.g., by approximately 3 dB), and is thus operable to receive more RF signals 706 than if the antenna wire carrier was located in the first position (as shown in FIG. 21A). However, the increased RF sensitivity means that the RF receiver 766 will consume more power. Therefore, the antenna wire carrier 770 may be moved to the first position in which the RF receiver 766 has a reduced RF sensitivity, but consumes less power.

Referring back to FIG. 20, the motor drive unit 720 comprises four batteries with two batteries 738A coupled in series to generate a first battery voltage $V_{BATT1}$ and two other batteries 738B coupled in series to generate a second battery voltage $V_{BATT2}$. The first battery voltage $V_{BATT1}$ is provided to the motor drive circuit 154 for driving the motor 150, while the second battery voltage $V_{BATT2}$ is provided to the power supply 157. If the power supply 157 comprises a linear regulator, the power supply of the motor drive unit 720 of the second embodiment will dissipate less power and will be more efficient than in the motor drive unit 120 of the first embodiment since the magnitude of the second battery voltage $V_{BATT2}$ is less than the battery voltage $V_{BATT}$ generated by the series combination of the four batteries 138 of the first embodiment. The motor drive unit 720 could also comprise one or more battery monitoring circuits (not shown), such as the battery monitoring circuit 158 of the first embodiment, for monitoring the first and second battery voltages $V_{BATT1}$, $V_{BATT2}$. The motor drive unit 720 could also at least one PTC thermistor coupled in series with, for example, the batteries 738A for the H-Bridge motor drive circuit 154. In addition, the motor drive unit 720 could also comprise an alternate power source (such as the backup battery 150 of the first embodiment) for powering the controller 752 when the batteries 738B are removed. Alternatively, the four batteries 738A, 738B of the motor drive unit 720 could all be coupled in series to generate a single battery voltage $V_{BATT}$ as in the first embodiment.

According to the second embodiment of the present invention, the motorized window treatment 710 and the RF remote control 718 may be easily programmed, such that the motorized window treatment 710 is responsive to actuations of the buttons 790-798 of the remote control 718. First, the user may associate the remote control 718 with the motorized window treatment 710 by actuating the actuator 126 on the motor drive unit 720 and then pressing and holding, for example, the close button 792 on the remote control for a predetermined amount of time (e.g., approximately five seconds). After the remote control 718 is associated with the motorized window treatment 710, the motorized window treatment is responsive to the RF signals 706 transmitted by the remote control. The user may program the preset position $P_{PRESET}$ of the motorized window treatment 710 by actuating the raise and lower buttons 794, 796 of the remote control 718 to adjust the position of the weighting element 116 to the desired preset position, and then pressing and holding the preset button 798 for the predetermined amount of time.

The user may also use the remote control 718 to program the upper and lower limits (i.e., the fully-open position $P_{FULLY-OPEN}$ and the fully-closed position $P_{FULLY-CLOSED}$) of the motorized window treatments 710. To enter a limit programming mode, the user actuates the actuator 126 on the motor drive unit 720, and then simultaneously presses and holds the open button 790 and the raise button 794 of the remote control 718 for the predetermined amount of time (i.e., approximately five seconds). To program the lower limit, the user actuates the raise and lower buttons 794, 796 of the remote control 718 to adjust the position of the weighting element 116 to the desired fully-closed position $P_{FULLY-CLOSED}$, and then presses the close button 792 for the predetermined amount of time. To program the upper limit, the user actuates the raise and lower buttons 794, 796 of the remote control to adjust the position of the weighting element 116 to the desired fully-open position $P_{FULLY-OPEN}$, and then presses the open button 794 for the predetermined amount of time. The user can then press and hold the open button 790 and the raise button 794 of the remote control 718 for the predetermined amount of time to exit the limit programming mode.

The RF receiver 766 and the controller 752 are both able to operate in a sleep mode (i.e., low-power mode) to conserve battery power. During the sleep mode, the RF receiver 766 is operable to wake-up periodically to sample (e.g., listen for) any RF signals 706 as will be described in greater detail below. In the event that the RF receiver 766 does detect the presence of any RF signals 706, the RF receiver is operable to wake up the controller 752 via an RF wake up signal $V_{RF\_WAKE}$, such that the controller can begin processing the received RF signal. In particular, the RF receiver 766 wakes up the controller 752 in response to detecting any RF energy within a particular frequency band. Each time that the controller 752 wakes up in response to the RF wake up signal $V_{RF\_WAKE}$, additional power is consumed by the controller (since the controller is fully powered when awake). This additional power consumption reduces the life of the batteries 738B, and as a result, it is optimal that the RF receiver 766 only wake the controller 752 when necessary.

Figure 22A:
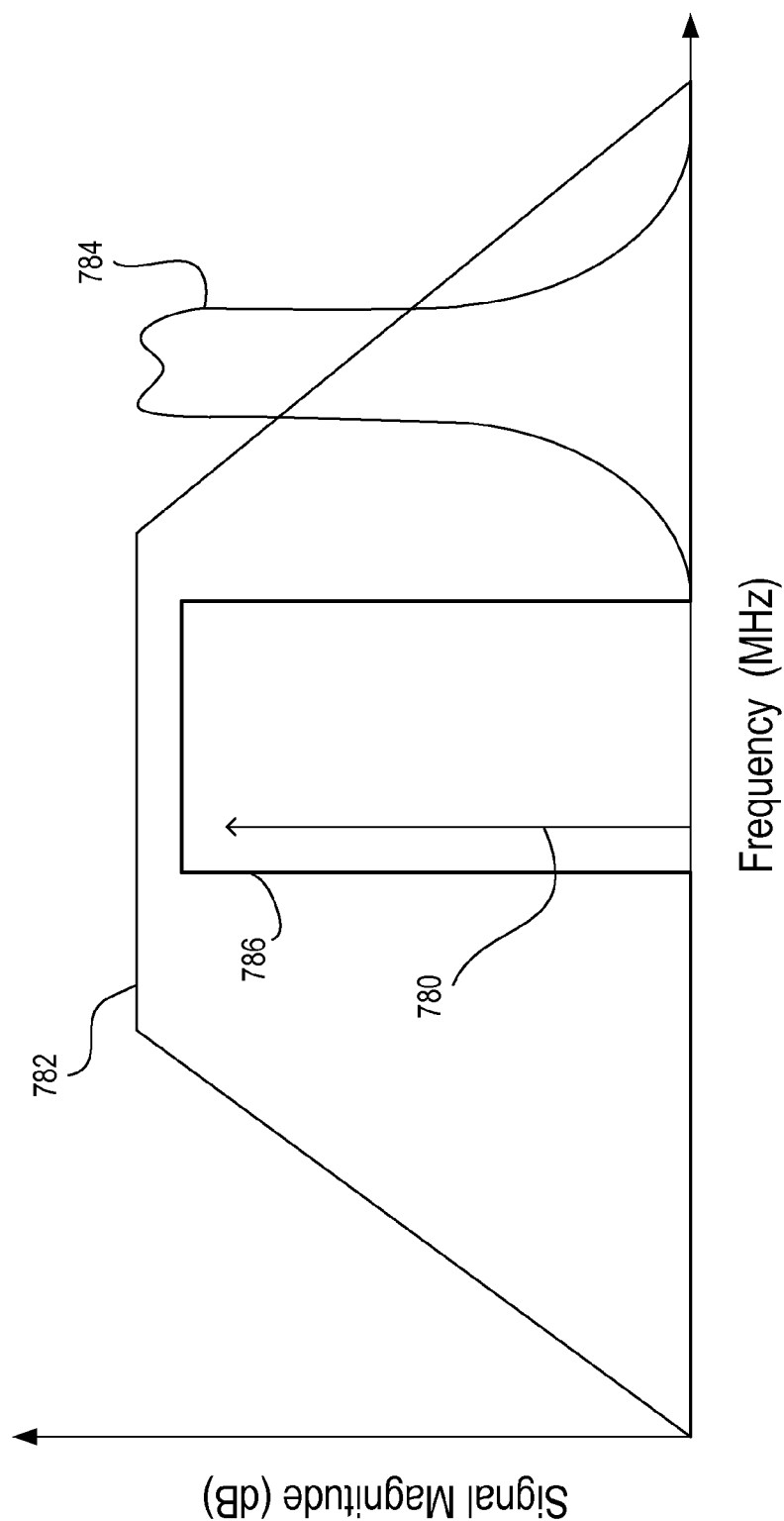
FIG. 22A is simplified frequency response of an RF filter of the battery-powered motorized window treatment of FIG. 19.

FIG. 22A shows an example of a simplified frequency response of the SAW filter 769. Frequency 780 illustrates an example frequency of the RF signals 706. A frequency response 782 illustrates the response of only the antenna 768 and the RF receiver 766 (i.e., the response without the SAW filter 769). As shown in FIG. 22A, the frequency response 782 spans a wide range of frequencies (e.g., up to an 80 MHz band). As a result, the RF receiver 766 may be responsive to an interference event 784. In particular, the RF receiver 766 (without the presence of the SAW filter 769) will detect the presence of the interference event 784, and as a result, will cause the controller 752 to wake up via the RF wake up signal $V_{RF\_WAKE}$. As the controller 752 begins to process the interference event 784, the controller will appropriately disregard this interference event as it will recognize that it is not an RF signal 706. However as mentioned above, the controller 752 consumes additional power to process the interference event 784, and this negatively impacts the life of the batteries 738B. FIG. 22A also illustrates a SAW frequency response 786 which spans a much narrower band of frequencies than frequency response 782. In particular, the SAW frequency response 786 does not encompass the interference event 784. As a result, the SAW filter 769 filters interference events (e.g., such as interference event 784), and this allows the controller 752 to not wake up unnecessarily, thus further conserving the life of the batteries 738B.

Figure 22B:
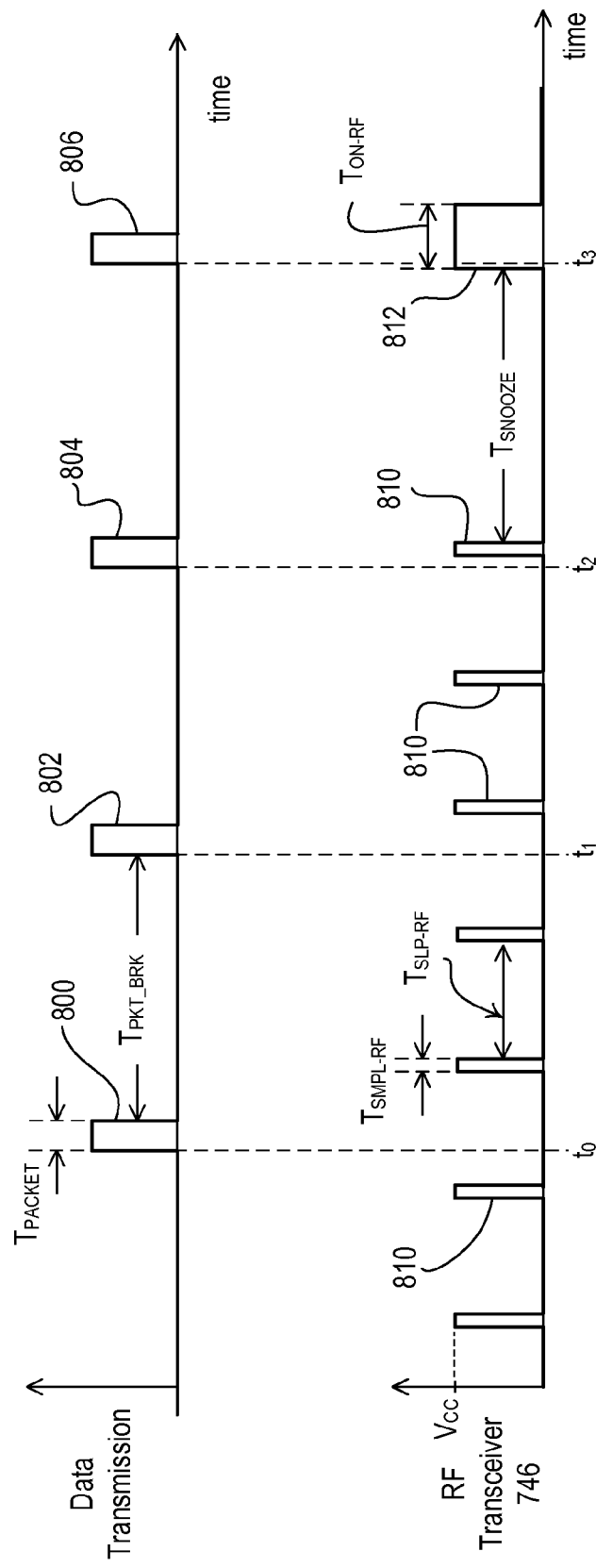
FIG. 22B is a simplified timing diagram of an RF data transmission event and a sampling event of the battery-powered motorized window treatment of FIG. 19.

FIG. 22B is a simplified timing diagram of a data transmission event transmitted by the RF remote control 718 to the motorized window treatment 710 and a sampling event of the RF receiver 766 of the motor drive unit 720. The remote control 718 transmits packets of data (e.g., the control information) via the RF signals 706 with each packet having a packet time period $T_{PACKET}$ (e.g, approximately 5 msec). Each packet of data is typically transmitted multiple times (e.g., up to twelve times) during a given data transmission event. Between each packet of data, there is a packet break time period $T_{PKT\_BRK}$ (e.g., approximately 70 ms), such that the remote control transmits digital messages at a transmission rate of approximately 13.3 packets per second. The RF receiver 766 of the motor drive unit 720 is operable to wake up and listen for any RF signals 706 during an RF sampling time period $T_{SMPL-RF}$. If no RF signals 706 are detected during the RF sample time period $T_{SMPL-RF}$, then the RF receiver 766 goes to sleep for an RF sleep time period $T_{SLP-RF}$, such that the RF receiver samples the RF data at a sampling period $T_{SAMPLE}$. Alternatively, the break time period $T_{PKT\_BRK}$ could not be a fixed value, but could be a varying or random time between each of the transmitted packets.

The RF sample time period $T_{SMPL-RF}$ and the RF sleep time period $T_{SLP-RF}$ of the RF receiver 766 are sized appropriately to ensure that the RF sample time period $T_{SMPL-RF}$ coincides with at least one packet of a predetermined number of consecutive packets of a data transmission event. As a result, the RF sleep time period $T_{SLP-RF}$ of the RF receiver 766 can be much longer than the packet time period $T_{PACKET}$. In addition, the RF sample time period $T_{SMPL-RF}$ can be significantly shorter than the packet time period $T_{PACKET}$. Accordingly, the RF receiver 766 is operable to sleep for longer periods of time than prior art RF receivers, thus extending the lifetime of the batteries 738B of the motor drive unit 720. For example, the RF sample time period $T_{SMPL-RF}$ and the RF sleep time period $T_{SLP-RF}$ may be sized to be approximately 0.1 msec and 17.8 msec, respectively, to ensure that the RF sample time period $T_{SMPL-RF}$ coincides with at least one packet of five consecutive packets of a data transmission event.

Four packets 800, 802, 804, and 806 of a data transmission event are shown in FIG. 22B. At time $t_0$, the remote control 718 begins to transmit the first packet 800 via the RF signals 706. The first packet 800 is not received by the RF receiver 766 because the packet is transmitted during the RF sleep time period $T_{SLP-RF}$ (i.e., while the RF receiver is sleeping). In other words, the transmission of packet 800 does not coincide with an RF sampling event 810 of the RF receiver. Similarly, the second packet 802 transmitted at time $t_1$ is not received by the RF receiver 766 because the packet is transmitted during the RF sleep time $T_{SLP-RF}$ and does not coincide with one of the RF sampling events 810 of the RF receiver 766.

At time $t_2$, the third packet 804 is transmitted and is detected by the RF receiver 766, such that the RF receiver wakes up the controller 752. Since the controller 752 wakes up in the middle of the transmission of the third packet 804 (i.e., has missed the beginning of the transmission of the third packet), the controller is unable to properly process the data contained within the third packet. However, the controller 752 is operable to process the third packet 804 sufficiently to determine that a fourth packet 806 will be transmitted after the packet break time $t_{PKT\_BRK}$. Accordingly, the controller 752 and the RF receiver 766 are operable to enter the sleep mode for a snooze time period $T_{SNOOZE}$, which may be approximately equal to or slightly less than the packet break time period $T_{PKT\_BRK}$. As shown in FIG. 22B, the snooze time period $T_{SNOOZE}$ expires just before time $t_3$, when the fourth packet 806 is transmitted. In other words, the duration of the snooze time period $T_{SNOOZE}$ is short enough to ensure that the RF receiver 766 is awake in time to receive the complete transmission of the fourth packet 806.

When the snooze time period $T_{SNOOZE}$ expires, the RF receiver 766 and the controller 752 wake up, and the RF transceiver begins to listen to RF signals 706 for at least the RF sample time period $T_{SMPL-RF}$. Because the RF receiver 766 and the controller 752 are awake at time $t_3$ when the remote control 718 begins to transmit the fourth packet 806, the receiver is able to receive the entire packet. The receiver 766 remains on for an RF on time period $T_{ON-RF}$ and is operable to receive the entire packet 806 during an RF receiving event 812, such that the controller 752 is able to properly process the packet 806 of data. Thus, because the RF receiver 766 and the controller 752 go back to sleep during the snooze time period $T_{SNOOZE}$ and do not stay awake and fully powered while waiting for the next packet to be transmitted), the life of the batteries 738B is further conserved.

Figure 23:
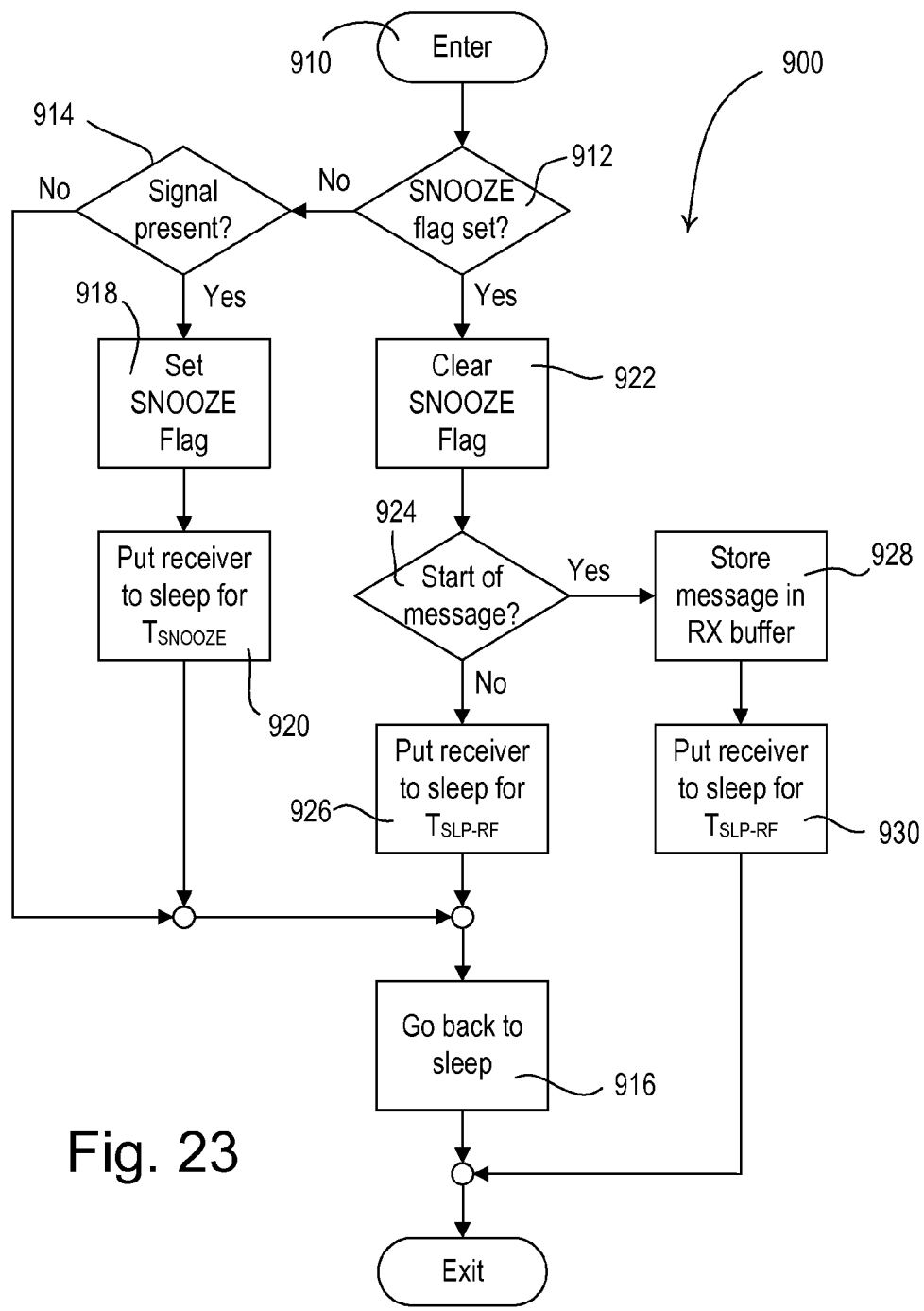
FIG. 23 is a simplified flowchart of an RF signal receiving procedure executed by a controller of the motor drive unit of the battery-powered motorized window treatment of FIG. 19.

FIG. 23 is a simplified flowchart of an RF signal receiving procedure 900 executed by the controller 752 after being awakened in response to the RF wake up signal $V_{RF\_WAKE}$ at step 910. The controller 752 uses a SNOOZE flag to keep track of when the RF receiver 766 has been put to sleep for the snooze time period $T_{SNOOZE}$. If the SNOOZE flag is not set at step 912 (i.e., the RF receiver 766 has not been put to sleep for the snooze time period $T_{SNOOZE}$) and the controller 752 does not detect an indication that an RF signal is present at step 914, the controller 752 simply goes back to sleep at step 916 and the RF signal receiving procedure 900 exits. However, if the controller 752 detects an RF signal at step 914, the controller sets the SNOOZE flag at step 918, and puts the RF receiver to sleep for the snooze time period $T_{SNOOZE}$ at step 920. The controller 752 then goes back to sleep at step 916, before the RF signal receiving procedure 900 exits.

If the SNOOZE flag is set at step 912 (i.e., the RF receiver 766 has been put to sleep for the snooze time period $T_{SNOOZE}$), the controller 752 first clears the SNOOZE flag at step 922 and then gets ready to receive a digital message. If the RF receiver 766 is not receiving the start of a digital message at step 924, the controller 752 puts the RF receiver to sleep for the RF sleep time period $T_{SLP-RF}$ at step 926 and goes back to sleep at step 916, before the RF signal receiving procedure 900 exits. However, if the RF receiver 766 is receiving the start of a digital message at step 924, the controller 752 stores the received message in a receive (RX) buffer at step 928 and puts the RF receiver to sleep for the RF sleep time period $T_{SLP-RF}$ at step 930. The RF signal receiving procedure 900 exits without the controller 752 being put back to sleep. The controller 752 will go back to sleep after processing the received digital message.

Figure 24:
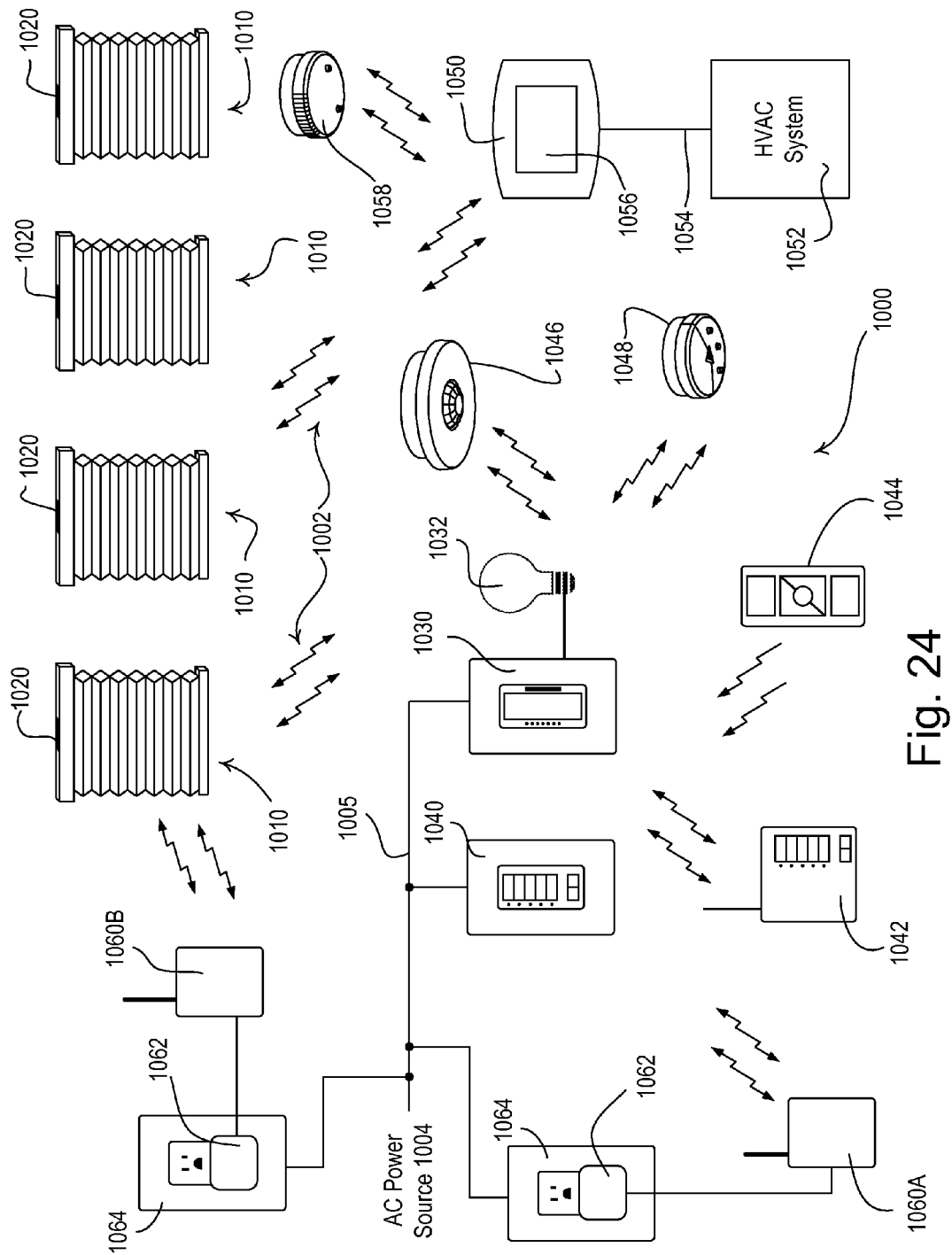
FIG. 24 is a simplified diagram of a radio-frequency load control system including multiple motorized window treatments according to a third embodiment of the present invention.

FIG. 24 is a simplified diagram of a radio frequency (RF) load control system 1000 having multiple battery-powered motorized window treatments 1010 according to a third embodiment of the present invention. The battery-powered motorized window treatments 1010 of the third embodiment each have a very similar structure as the battery-powered motorized window treatment 710 of the second embodiment (as shown in FIG. 20). However, each of the motorized window treatments 1010 of the third embodiment comprises a motor drive unit 1020 having an RF transceiver (not shown) rather than the RF receiver 766, such that the motorized window treatments are operable to both transmit and receive RF signals 1002. The control devices of the load control system 1000 are operable to transmit packets using a packet time period $T_{PACKET}$ (e.g., approximately 5 msec) and a packet break time period $T_{PKT\_BRK}$ (e.g., approximately 70 msec) as in the second embodiment.

As in the second embodiment, each motorized window treatment 1010 is operable to enable the RF transceiver at a sampling period $T_{SAMPLE}$ (e.g., approximately 17.8 msec) to detect if an RF signal 1002 is presently being transmitted. Each motorized window treatment 1010 is operable put the RF transceiver to sleep for an RF sleep time period $T_{SLP-RF}$ that is much longer than the packet time period $T_{PACKET}$ (e.g., approximately 17.3 msec) and to enable an RF transceiver for the RF sample time period $T_{SMPL-RF}$ that is much shorter than the packet time period $T_{PACKET}$ (e.g., approximately 5 msec) so as to conserve battery power. The motorized window treatments 1010 execute an RF signal receiving procedure similar to the RF signal receiving procedure 900 of the second embodiment as shown in FIG. 23. However, the motorized window treatments 1010 of the third embodiment do not put the RF transceiver to sleep for the snooze time period $T_{SNOOZE}$ after detecting an RF signal during the RF sample time period $T_{SMPL-RF}$. Rather, the motorized window treatments 1010 of the third embodiment simply remain on after detecting an RF signal during the RF sample time period $T_{SMPL-RF}$.

As shown in FIG. 24, the load control system 1000 also comprises a lighting control device, e.g., a wall-mountable dimmer switch 1030, which is coupled to an alternating-current (AC) power source 1004 via a line voltage wiring 1005. The dimmer switch 1030 is operable to adjust the amount of power delivered to a lighting load 1032 to control the lighting intensity of the lighting load. The dimmer switch 1030 is operable to transmit and receive digital messages via the RF signals 1002 and is operable to adjust the lighting intensity of the lighting load 1032 in response to the digital messages received via the RF signals. The dimmer switch 1030 enables its RF transceiver at a sampling period $T_{SAMPLE}$ (e.g., approximately 17.8 msec) using, for example, a duty cycle of approximately 50%, such that the dimmer switch 1030 enables the RF transceiver for an RF sample time period $T_{SMPL-RF}$ (e.g., approximately 8.9 msec), and puts the RF transceiver to sleep for an RF sleep time period $T_{SMPL-RF}$ (e.g., approximately 8.9 msec). Accordingly, the RF sleep time period $T_{SLP-RF}$ used by the dimmer switch 1030 is longer than the packet time period $T_{PACKET}$ so as to reduce the total power consumed by the dimmer switch 1030.

The load control system 1000 further comprises a wall-mounted button keypad 1040 and a battery-powered tabletop button keypad 1042. The wall-mounted button keypad 1040 is powered from the AC power source 1004 via the line voltage wiring 1005, and the tabletop button keypad 1042 is a battery-powered device. Both of the keypads 1040, 1042 transmit digital messages to the dimmer switch 1030 via the RF signals 1002 in order to provide for remote control of the lighting load 1032. In addition, each of the keypads 1040, 1042 is operable to receive digital status messages via the RF signals 1002 from the dimmer switch 1030 in order to display the status (i.e., on/off state and/or intensity level) of the lighting load 1032. The load control system 1000 further comprises a battery-powered remote control 1044 which is operable to transmit digital messages to the dimmer switch 1030 via the RF signals 1002 in order to provide for remote control of the lighting load 1032. The wall-mounted button keypad 1040, the tabletop button keypad 1042, and the remote control 1044 are also operable to adjust the present position $P_{PRES}$ of the battery-powered motorized window treatments 1010 by transmitting digital messages via the RF signals 1002. In addition, the battery-powered motorized window treatments 1010 may be operable to transmit status information to the wall-mounted keypad 1040 and tabletop button keypad 1042.

The load control system 1000 further comprises a battery-powered wireless occupancy sensor 1046 for detecting an occupancy condition (i.e., the presence of an occupant) or a vacancy condition (i.e., the absence of an occupant) in the space in which the occupancy sensor is mounted. The occupancy sensor 1046 is operable to wirelessly transmit digital messages via the RF signals 1002 to the dimmer switch 1030 in response to detecting the occupancy condition or the vacancy condition in the space. For example, in response to detecting an occupancy condition in the space, the occupancy sensor 1046 may transmit a digital message to the dimmer switch 1030 to cause the dimmer switch to turn on the lighting load 1032, and in response to detecting a vacancy condition in the space, transmit a digital message to the dimmer switch to cause the dimmer switch to turn off the lighting load. Alternatively, the occupancy sensor 1046 could be implemented as a vacancy sensor, such that the dimmer switch 1030 would only operate to turn off the lighting load 1032 in response to receiving the vacant commands from the vacancy sensor. Examples of RF load control systems having occupancy and vacancy sensors are described in greater detail in commonly-assigned U.S. Pat. No. 7,940,167, issued May 10, 2011, entitled BATTERY-POWERED OCCUPANCY SENSOR; U.S. Pat. No. 8,009,042, issued Aug. 30, 2011, entitled RADIO-FREQUENCY LIGHTING CONTROL SYSTEM WITH OCCUPANCY SENSING; and U.S. patent application Ser. No. 12/371,027, filed Feb. 13, 2009, entitled METHOD AND APPARATUS FOR CONFIGURING A WIRELESS SENSOR; the entire disclosures of which are hereby incorporated by reference.

The load control system 1000 further comprises a battery-powered daylight sensor 1048 for measuring an ambient light intensity in the space in which the daylight sensor in mounted. The daylight sensor 1048 wirelessly transmits digital messages via the RF signals 1002 to the dimmer switch 1030. For example, the daylight sensor 1048 may transmit a digital message to the dimmer switch 1030 to cause the dimmer switches to increase the intensities of the lighting load 1032 if the ambient light intensity detected by the daylight sensor 1048 is less than a setpoint light intensity, and to decrease the intensities of the lighting load if the ambient light intensity is greater than the setpoint light intensity. The packet break time period $T_{PKT\_BRK}$ of the packets transmitted by the daylight sensor 648 may be variable, for example, as a function of the measured light intensity. The battery-powered motorized window treatments 1010 may be operable to receive digital messages from the occupancy sensor 1046 and the daylight sensor 1048 via the RF signals 1002 and to adjust the present position of the window treatments. Examples of RF load control systems having daylight sensors are described in greater detail in commonly-assigned U.S. patent application Ser. No. 12/727,956, filed Mar. 19, 2010, entitled WIRELESS BATTERY-POWERED DAYLIGHT SENSOR, and U.S. patent application Ser. No. 12/727,923, filed Mar. 19, 2010, entitled METHOD OF CALIBRATING A DAYLIGHT SENSOR, the entire disclosures of which are hereby incorporated by reference.

The load control system 1000 further comprises a battery-powered temperature control device 1050 (e.g., a thermostat) that is operable to control a heating and/or cooling system, e.g., a heating, ventilation, and air conditioning (HVAC) system 1052. The temperature control device 1050 may be coupled to the HVAC system 1052 via an HVAC communication link 1054, e.g., a digital communication link (such as an RS-485 link, an Ethernet link, or a BACnet® link), or alternatively via a wireless communication link (such as an RF communication link). The temperature control device 1050 may comprise an internal temperature sensor for determining a present temperature in the space in which the temperature control device is located. The temperature control device 1050 transmits appropriate digital messages to the HVAC system 1052 to control the present temperature in the building towards a setpoint temperature. Alternatively, the HVAC communication link 1054 could comprise a more traditional analog control link for simply turning the HVAC system 1052 on and off. The temperature control device 1050 comprises a user interface, e.g., a touch screen 1056, for displaying the present temperature and the setpoint temperature, and for receiving user inputs for adjusting the setpoint temperature. The temperature control device 1050 is operable to receive RF signals 1002 from a wireless temperature sensor 1056 for determining the present temperature in the space, for example, at a location away from the temperature control device 1050. In addition, the motor drive units 1020 of each of the motorized window treatments 1010 may be operable to transmit the temperature measurements from the internal and/or external temperature sensors 160, 162 to the temperature control device 1050.

Each of the battery-powered devices of the load control system 1000 (i.e., the tabletop button keypad 1042, the remote control 1044, the occupancy sensor 1046, the daylight sensor 1048, and the temperature control device 1050) is operable to enable their respective RF transceivers at a sampling period $T_{SAMPLE}$ (e.g., approximately 17.8 msec) to detect if an RF signal 1002 is presently being transmitted as described above for the motorized window treatments 1010. Each of these battery-powered devices is operable put its RF transceiver to sleep for an RF sleep time period $T_{SLP-RF}$ that is much longer than the packet time period $T_{PACKET}$ (e.g., approximately 5 msec) and to enable the RF transceiver for the RF sample time period $T_{SMPL-RF}$ that is much shorter than the packet time period $T_{PACKET}$ (e.g., approximately 17.3 msec) so as to conserve battery power.

The load control system 1000 further comprises signal repeaters 1060A, 1060B, which are operable to retransmit any received digital messages to ensure that all of the control devices of the load control system receive all of the RF signals 1002. The load control system 1000 may comprise, for example, one to five signal repeaters depending upon the physical size of the system. Each of the control devices, (e.g., the motorized window treatments 1010, the dimmer switch 1030, the tabletop button keypad 1042, the wall-mounted button keypad 1040, the occupancy sensor 1046, the daylight sensor 1048, and the temperature control device 1050) of the load control system 1000 are located within the communication range of at least one of the signal repeaters 1060A, 1060B. The signal repeaters 1060A, 1060B are powered by the AC power source 1004 via power supplies 1062 plugged into electrical outlets 1064.

According to the third embodiment of the present invention, one of the signal repeaters (e.g., signal repeater 1060A) operates as a "main" repeater (i.e., a main controller) to facilitate the operation of the load control system 1000. The main repeater 1060A has a database, which defines the operation of the load control system, stored in memory. For example, the main repeater 1060A is operable to determine which of the lighting load 1032 is energized and to use the database to control any visual indicators of the dimmer switch 1030 and the keypads 1042, 1040 accordingly to provide the appropriate feedback to the user of the load control system 1000. In addition, the control devices of the load control system may be operable to transmit status information to the signal repeaters 1060A, 1060B. For example, the motor drive unit 1020 of each of the motorized window treatments 1010 may be operable to transmit a digital message representative of the magnitude of the respective battery voltage to the signal repeaters 1060A, 1060B, a digital message including a low-battery indication to the signal repeaters when operating in the low-battery mode, or a digital message including a representation of the present position $P_{PRES}$ of the motorized window treatment.

As mentioned above, the load control system 1000 may comprise one to five signal repeaters depending upon the physical size of the system. The control devices of the load control system 1000 are each operable to adjust the RF sampling period $T_{SAMPLE}$ in response to the total number $N_{RPTR}$ of signal repeaters within the load control system 1000. Specifically, each control device is operable to adjust the RF sleep time period $T_{SLP-RF}$, while keeping the RF sampling time period $T_{SMPL-RF}$ constant. The control devices adjust the respective sampling periods because packets of data may be transmitted differently via the RF signals 1002 depending on the number of repeaters in the load control system 1000. In particular, the packet break time period $T_{PKT\_BRK}$ of the data transmissions may vary in response to the number of repeaters to ensure that the signal repeaters in the load control system 1000 have sufficient time to propagate a given packet. Because the packet break time period $T_{PKT\_BRK}$ is a factor in appropriately sizing the RF sleep time period $T_{RF\_SLEEP}$ of each of the control devices to ensure that an RF sampling event coincides with a packet transmission as discussed above with respect to FIG. 22B, the RF sleep time period $T_{RF\_SLEEP}$ also varies accordingly if the packet break time period $T_{PKT\_BRK}$ of a transmitted packet varies.

Figure 25:
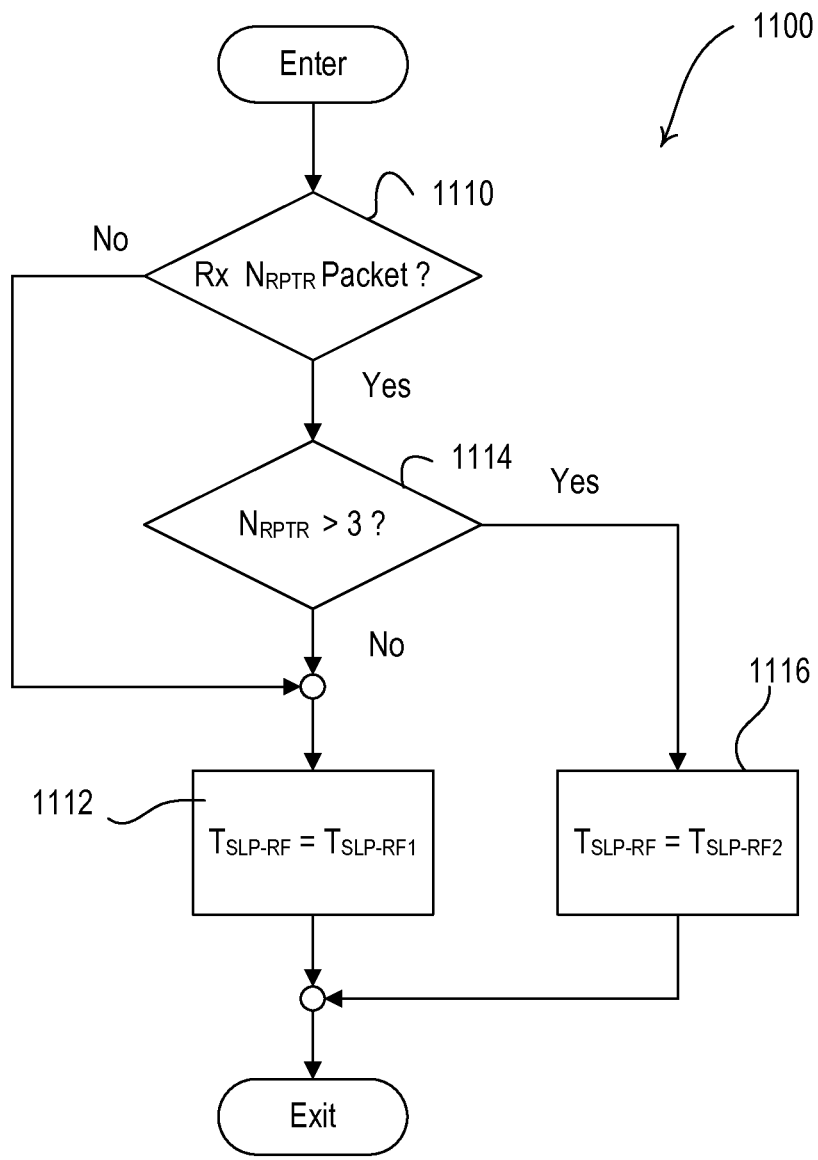
FIG. 25 is a simplified flowchart of an RF sampling rate selection procedure executed by a controller of one of the battery-powered motorized window treatments of FIG. 24.

FIG. 25 is a simplified flowchart of an RF sampling rate selection procedure 1100 that may be executed by any of control devices of the load control system 1000, e.g., the motor drive unit 1020. Typically, this sampling rate procedure 1100 may be executed during a configuration of the motor drive unit 1012. In the event that there is at least one signal repeater (e.g., signal repeater 1060A) in the load control system 1000, that signal repeater will send a message to the motor drive unit 1020 to inform the motor drive unit of the total number of repeaters $N_{RPTR}$ in the load control system. At step 1110, the motor drive unit 1020 determines whether it has received a packet containing the number of repeaters $N_{RPTR}$. In the event that the motor drive unit 1020 has not received such a packet, then the motor drive unit assumes that it is operating in a load control system that contains no signal repeaters. As a result, the motor drive unit 1020 uses a first RF sleep time period value $T_{SLP-RF1}$ (e.g., approximately 17.8 msec) as the RF sleep time period $T_{SLP-RF}$ at step 1112 before the RF sampling rate selection procedure 1100 exits.

If the motor drive unit 1020 has received a packet containing the number of repeaters $N_{RPTR}$, the motor drive unit determines whether the number of repeaters $N_{RPTR}$ is greater than three at step 1114. If the number of repeaters $N_{RPTR}$ is not greater than three at step 1114, the motor drive unit 1020 uses the first RF sleep time period value $T_{SLP-RF1}$ (i.e., approximately 17.8 msec) as the RF sleep time period $T_{SLP-RF}$ at step 1112 before the sampling rate selection procedure 1100 exits. If the number of repeaters $N_{RPTR}$ is greater than three at step 1114, the motor drive unit 1020 uses a second RF sleep time period value $T_{SLP-RF2}$ (e.g., approximately 16.3 msec) as the RF sleep time period $T_{SLP-RF}$ at step 1116 before the RF sampling rate selection procedure 1100 exits. The RF sampling rate selection procedure 1100 ensures that the motor drive unit 1020 adjusts its RF sampling rate $T_{SAMPLE}$ in response to the number of repeaters in the load control system 1000 to optimize reliability, response time, and battery life. The other battery-powered devices of the load control system 1000 (i.e., the tabletop button keypad 1042, the remote control 1044, the occupancy sensor 1046, the daylight sensor 1048, and the temperature control device 1050) may also execute the RF sampling rate selection procedure 1100.

Figure 26:
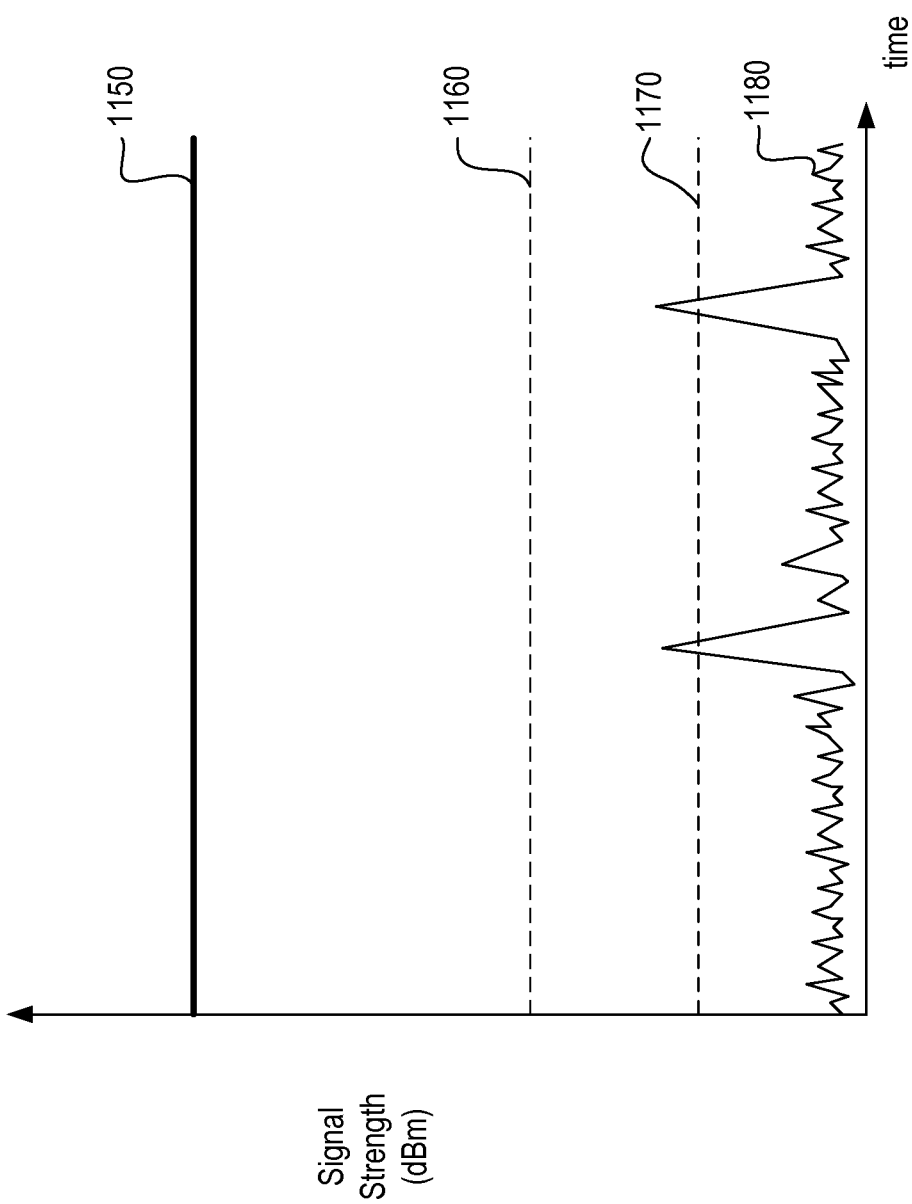
FIG. 26 is a simplified graph illustrating various signal strength thresholds of one of the battery-powered motorized window treatments of FIG. 24.

The RF transceivers of the control devices of the load control system 1000 are characterized by a signal strength threshold which is used to detect the transmitted RF signals 1002. Particularly, the RF transceiver of each of the control devices of the load control system 1000 is characterized by an adjustable signal strength threshold. FIG. 26 is a simplified graph illustrating various signal strength thresholds of, for example, the RF transceiver of one of the motor drive units 1020. In particular, FIG. 26 illustrates two signal strength thresholds of the RF transceiver: a first threshold 1160 (i.e., an extended battery threshold) and a second threshold 1170 (i.e., an extended range threshold) having a lower magnitude than the first threshold. The first and second thresholds 1160, 1170 reside between a noise floor 1180 and a signal strength 1150 of the nearest signal repeater (e.g., one of the signal repeaters 1060A, 1060B). While FIG. 26 is described with reference to the motorized window treatments 1020, the other battery-powered devices of the load control system 1000 (i.e., the tabletop button keypad 1042, the remote control 1044, the occupancy sensor 1046, the daylight sensor 1048, and the temperature control device 1050) may also have RF transceivers having adjustable signal strength thresholds.

During a configuration or set-up procedure of each of the motor drive units 1020, a user may be operable to select the signal strength of the RF transceiver as having either the first threshold 1160 or the second threshold 1170. When using the second threshold 1170 to detect RF signals 1002, the RF transceiver is operable to detect RF signals of a lower signal strength which can improve the range performance of the RF transceiver (i.e., the RF transceiver can detect RF signals sent from control devices that are located farther away). However, the second threshold 1170 may cause the RF transceiver to be more sensitive to noise events as the noise floor 1080 may occasionally exceed the second threshold. Each time the RF transceiver receives any RF energy (RF signals 1002, RF noise, etc.) that exceeds the second threshold 1170 during the RF sampling time period $T_{SMPL-RF}$, the RF transceiver wakes up the controller of the motor drive unit 1020, such that the controller then consumes additional power which ultimately reduces the life of the batteries of the motor drive unit. When the RF transceiver uses the first threshold 1160 to detect RF signals 1002, the RF transceiver is less likely to detect RF signals having a lower signal strength, but is less susceptible to noise events. Because the RF transceiver only responds to RF energy (RF signals 1002, RF noise, etc) that exceeds the first threshold 1160, the RF transceiver does not wake up the controller as frequently as when the second threshold 1170 is used. As a result, the life of the batteries can be further extended when the RF transceiver uses the first threshold 1160.

The first and second thresholds 1160, 1170 may be predetermined values. For example, the first threshold 1160 may have a value of approximately −90 dBm and the second threshold 1170 may have a value of approximately −97 dBm. Alternatively, the value of the adjustable threshold of the RF transceiver could be determined automatically during the configuration procedure of the motor drive unit 1020. For example, the RF transceiver may be operable to detect an average magnitude of the noise floor 1180 and may also be able to detect a magnitude of the signal strength 1150 of the nearest signal repeater 1060A, 1060B, and then provide these magnitudes to the controller of the motor drive unit. The controller may then calculate an optimal value of a threshold for the RF transceiver that will preserve battery life and provide appropriate range performance. For example, the controller may halve the sum of the magnitude of the noise floor 1180 and the magnitude of the signal strength 1150 of the nearest signal repeater to calculate the value of the threshold for the RF transceiver. In addition, in the event that the calculated threshold value of the RF transceiver is too close (e.g., within ~5 dBm) to the noise floor 1180, the load control system 1000 may be operable to prompt a user, e.g., through a programming interface (not shown), to add another signal repeater to the system. By adding another signal repeater to the system, the magnitude of the signal strength of the nearest signal repeater may increase, thus increasing the calculated threshold of the RF transceiver. As a result, the battery life of each of the motor drive units 1020 may be further extended.

During the configuration process of the load control system 1000, the motor drive units 1020 are each assigned to a particular frequency channel such that each motor drive can receive RF signals 1002 transmitted on that frequency channel. During normal operation, the motor drive units 1020 will each detect any packet of information that is transmitted on the respective assigned frequency channel— even if that packet does not contain data that is addressed to the motor drive unit. As soon as the RF transceiver of each motor drive unit 1020 begins to detect a packet transmitted on the assigned frequency channel, the RF transceiver will wake up the controller of the motor drive unit as previously described. The controller will then process the packet to determine whether it must adjust the present position $P_{PRES}$ of the motorized window treatment 1010. In the event that the packet is not addressed to the motor drive unit 1020 (e.g., the packet contains information only for a dimmer switch 1030), the controller will take no further action and will go back to sleep. However, because the controller woke up to process the packet, the controller consumed power unnecessarily, and negatively impacted the life of the batteries of the motor drive unit 1020.

Because the load control system 1000 comprises many devices that are operable to send and/or receive RF signals 1002, there can be a very large number of packets regularly transmitted within the system. Many of these packets may not be addressed to the motor drive units 1020, and as a result, need not be processed by the controller of each of the motor drive units. According to an aspect of the present invention, the battery-power motorized window treatments 1010 may be configured to only listen to RF signals 1002 transmitted on an alternate channel distinct from the channels used by the other devices of the load control system 1000.

Figure 27:
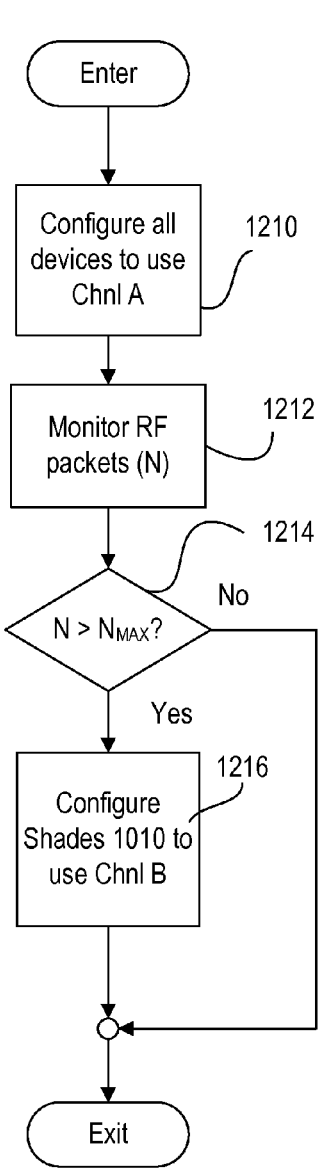
FIG. 27 is a simplified flowchart of an RF monitoring procedure performed by a signal repeater of the load control system of FIG. 24.

FIG. 27 is a simplified flowchart of an RF monitoring procedure 1200 performed by a main repeater (e.g., the signal repeater 1060A) of the load control system 1000. At step 1210, the main repeater 1060A configures all of the control devices of the load control system 1000 to use a given frequency channel (e.g., frequency channel A). At step 1212, the main repeater 1060A is operable to monitor a number N of RF packets transmitted within a given time frame during normal operation. At step 1214, the main repeater 1060A compares the number N of RF packets to a predetermined maximum number $N_{MAX}$ to determine whether the load control system 1000 has a high amount of traffic on frequency channel A. If the number N of RF packets is greater than the predetermined maximum number $N_{MAX}$ at step 1214, the main repeater 1060A configures all of the battery-powered motorized window treatments 1010 to listen only to an alternate frequency channel (e.g., frequency channel B). Otherwise, the main repeater 1060A simply exits the RF monitoring procedure 1200 without changing the channel configuration of the battery-powered motorized window treatments 1010. Alternatively, the main repeater 1060A could simply configure all battery-powered motorized window treatments 1010 to use the alternate frequency channel (i.e., frequency channel B) in lieu of executing the RF monitoring procedure 1200.

Figure 28:
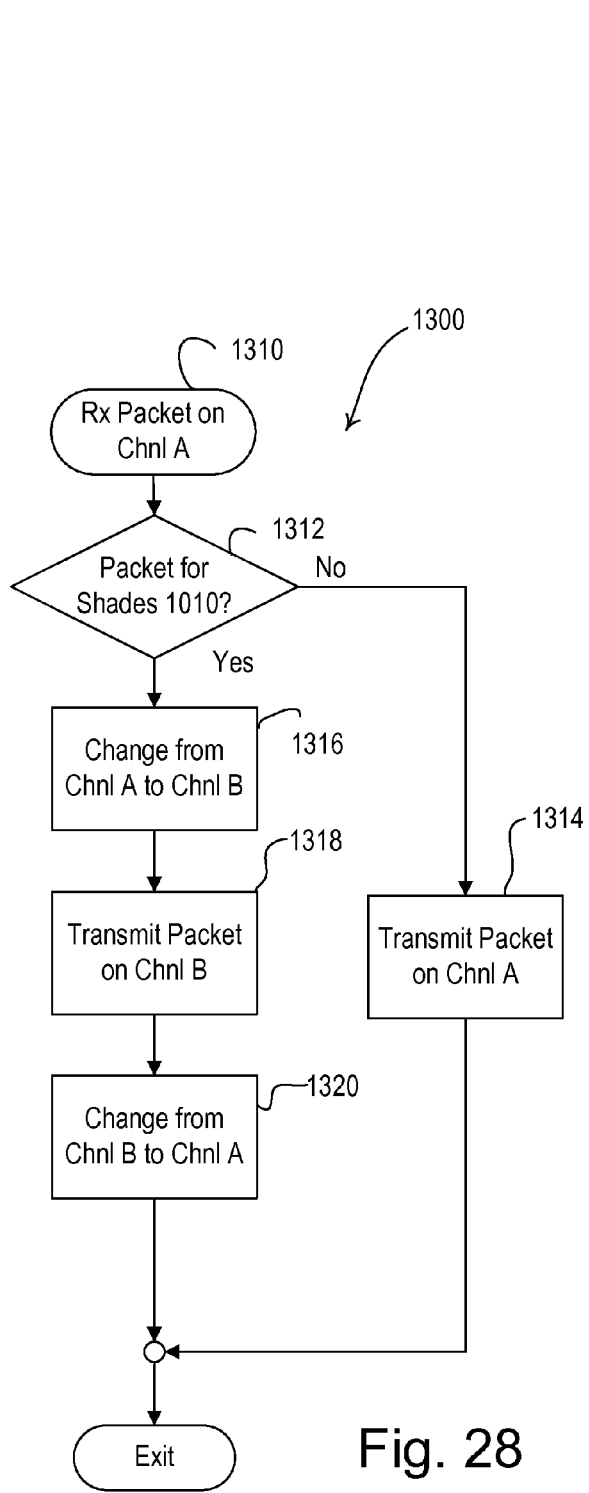
FIG. 28 is a simplified flowchart of an RF signal receiving procedure performed by a signal repeater of the load control system of FIG. 24.

FIG. 28 is a simplified flowchart of an RF signal receiving procedure 1300 performed by the signal repeaters (e.g., the signal repeater 1060A) of the load control system 1000 during normal operation when an alternate frequency is in use. At step 1310, the signal repeater 1060A receives a packet transmitted on frequency channel A. At step 1312, the signal repeater 1060A determines whether the received packet is addressed to at least one of the battery-powered motorized window treatments 1010. If the packet is not addressed to any of the battery-powered motorized window treatments 1010 (e.g., the packet is addressed to the dimmer switch 1030), then the repeater 1060A simply retransmits the packet on channel A at step 1314 before the RF signal receiving procedure 1300 exits. However, if the signal repeater 1060A determines that the received packet is addressed to at least one of the battery-powered motorized window treatments 1010, the signal repeater changes its frequency channel from channel A to channel B at step 1316 and transmits the received packet on frequency channel B to the battery-powered motorized window treatments 1010 at step 1318. Finally, the signal repeater 1060A changes its frequency channel from channel B back to channel A at step 1320 and the RF signal receiving procedure 1320 exits.

Figure 29:
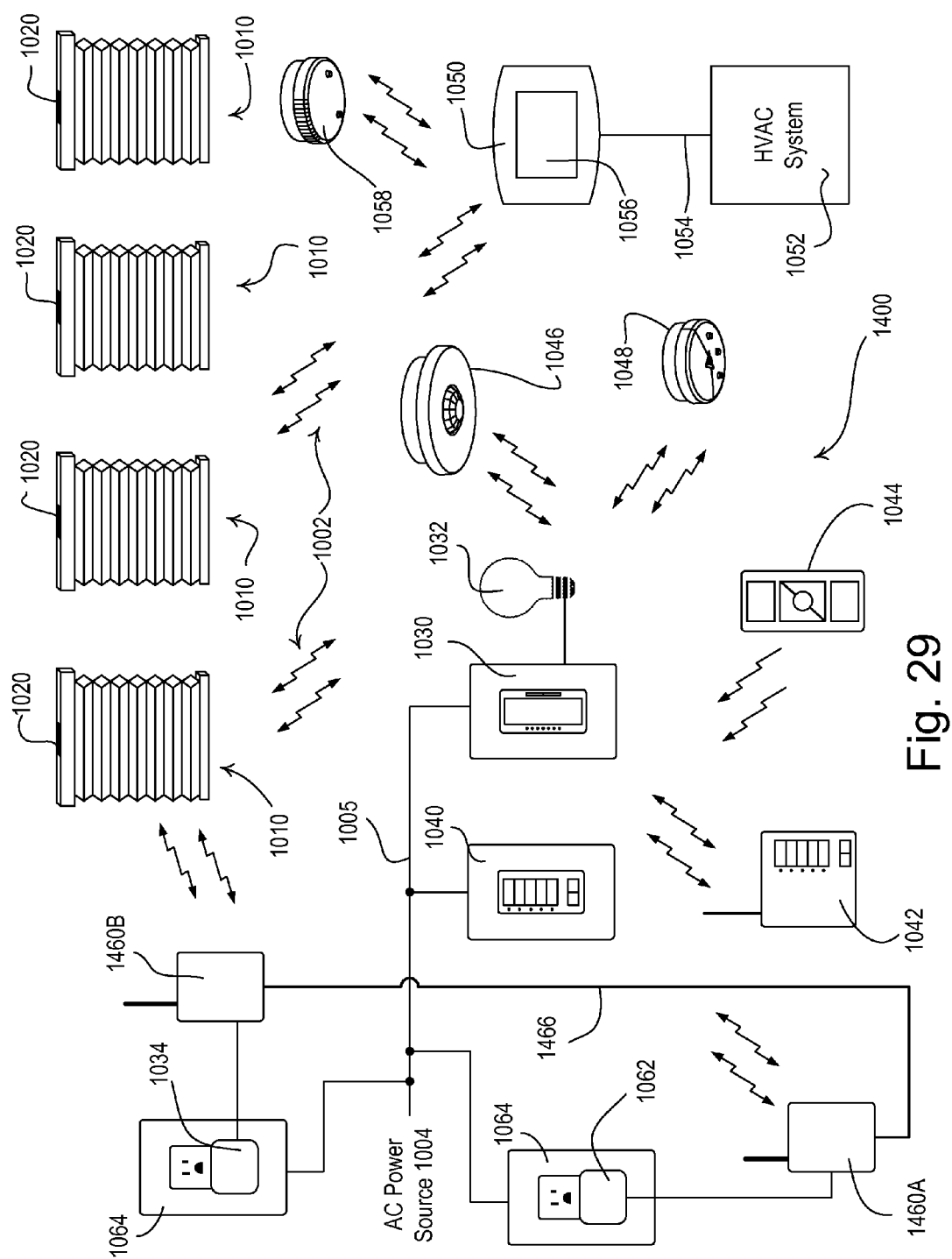
FIG. 29 is a simplified diagram of a RF load control system having two signal repeaters coupled together via a digital communication link according to a fourth embodiment of the present invention.

FIG. 29 is a simplified diagram of a RF load control system 1400 having two signal repeaters 1460A, 1460B coupled together via a digital communication link 1466 according to a fourth embodiment of the present invention. The first signal repeater 1460A is configured to transmit and receive packets via the RF signals 1002 using only the primary frequency channel A, and the second signal repeater 1460B is configured to transmit and receive packets via the RF signals 1002 using only the alternate frequency channel B. The first and second signal repeaters 1460A, 1460B are operable to transmit digital messages to each other via the digital communication link 1466, which may comprise, for example, a wired communication link, such as an RS-485 link or an Ethernet link, link, or alternatively may comprise a wireless communication link, such as an RF communication link.

In the event that the first signal repeater 1460A receives an packet that is transmitted on channel A and is addressed to at least one of the battery-powered motorized window treatments 1010, the signal repeater 1460A transmits a digital message (e.g., including the data from the packet) to the second signal repeater 1460B via the digital communication link 1466. Upon receiving the information via the digital communication link 1460B, the second signal repeater 1460B transmits the packets to the battery-powered motorized window treatments 1010 via the RF signals 1002 using the alternate frequency B. The packets transmitted to the motorized window treatments 1010 by the second signal repeater 1460B include the same (or similar) data as the packets that were received by the first signal repeater 1460A. Thus, the battery-powered motorized window treatments 1010 only listen to RF signals 1002 transmitted on the alternate frequency channel B distinct from the channel used by the other devices of the load control system 1000 in order to further preserve the battery life of the battery-powered window treatments.

Examples of battery-powered remote controls and RF control systems are described in greater detail in commonly-assigned U.S. patent application Ser. No. 12/399,126, filed Mar. 6, 2009, entitled WIRELESS BATTERY-POWERED REMOTE CONTROL HAVING MULTIPLE MOUNTING MEANS; U.S. Pat. No. 7,573,208, issued Aug. 22, 2009, entitled METHOD OF PROGRAMMING A LIGHTING PRESET FROM A RADIO-FREQUENCY REMOTE CONTROL, and U.S. patent application Ser. No. 12/033,223, filed Feb. 19, 2008, entitled COMMUNICATION PROTOCOL FOR A RADIO-FREQUENCY LOAD CONTROL SYSTEM, the entire disclosures of which are hereby incorporated by reference.

Figure 30:
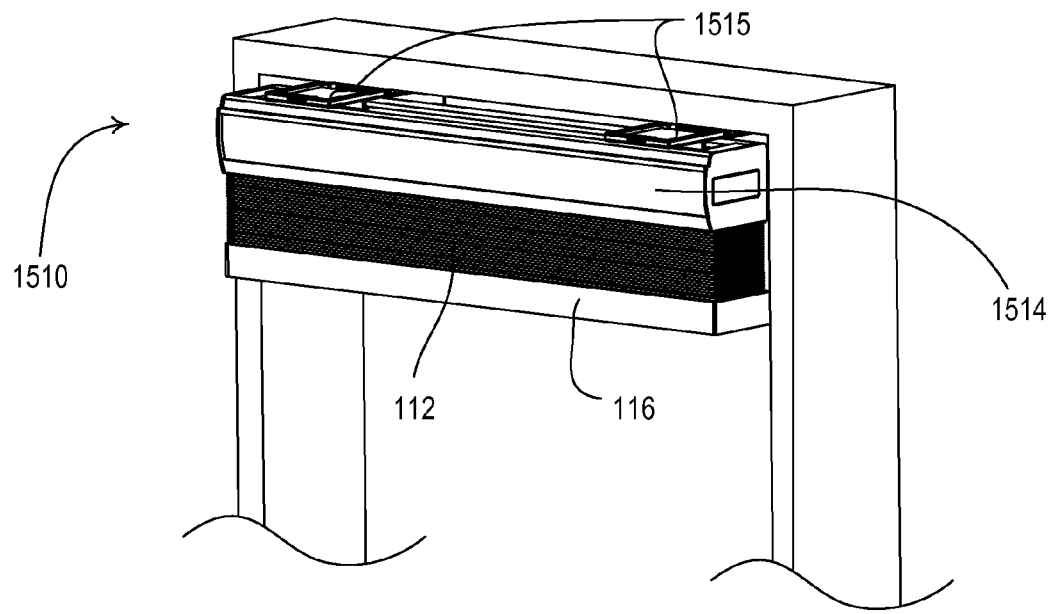
FIG. 30 is a perspective view of a motorized window treatment as the motorized window treatment is being moved to a service position according to an alternate embodiment of the present invention.
Figure 31:
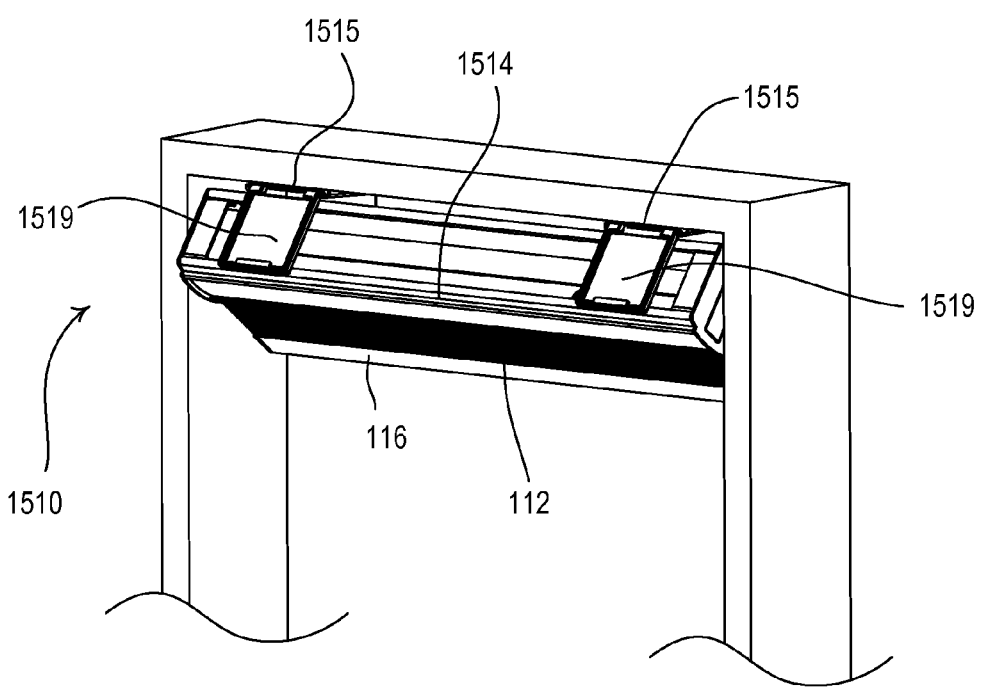
FIG. 31 is a perspective view of the motorized window treatment of FIG. 30 when the motorized window treatment is in the service position according to the alternate embodiment of the present invention.

FIGS. 30 and 31 are perspective views of a motorized window treatment 1510 according to a fifth embodiment of the present invention. The motorized window treatment 1510 of the fifth embodiment comprises a headrail 1514 that may be pulled out in a horizontal direction away from the window 104 and then rotated into a service position to allow access to the batteries 138. The motorized window treatment 1510 comprises top mounting brackets 1515 located over the top of the headrail 1514, and plates 1519 that are received in the mounting brackets. The user is operable to pull the headrail 1514 away from the window 104, such that the plates 1519 slide through the mounting brackets 1515 as shown in FIG. 30. The plates 1519 are then able to pivot with respect to the mounting brackets 1515, such that the top of the headrail 1514 may be rotated towards the user to allow access to the batteries 138 located in the headrail as shown in FIG. 31.

FIG. 32A is a perspective view and FIG. 32B is a right side view of a motorized window treatment 1610 having mounting brackets 1670 for rotating the motorized window treatment into a service position according to a sixth embodiment of the present invention. FIG. 33A is a perspective view and FIG. 33B is a right side view of the motorized window treatment 1610 when the motorized window treatment 1610 is in the service position according to the sixth embodiment of the present invention. During normal operation, the headrail 114 of the motorized window treatment 1610 is held in a locked position (as shown in FIGS. 32A and 32B).

Each mounting bracket 1670 of the motorized window treatment 1610 comprises a release button 1672, which may be actuated (e.g., pushed) to release the headrail 114 from the locked position, such that the headrail may be rotated into the service position and the batteries 138 may be accessed as shown in FIGS. 33A and 33B. The release buttons 1672 are located above the headrail 114 and protrude slightly over the internal side 122 of the headrail, such that the buttons are partially hidden from view when the motorized window treatment 1610 is installed. The release buttons 1672 may be labeled with appropriate text (such as "push") to inform the user of the required action to release the motorized window treatment 1610 from the locked position. The headrail 114 may be rotated into the service position independent of the position of the cellular shade fabric 112 between the fully-open position $P_{FULLY-OPEN}$ and the fully-closed position $P_{FULLY-CLOSED}$. The headrail 114 is flexible enough, such that the buttons 1672 of the mounting brackets 1670 may be actuated one at a time in order to release the headrail from the locked position. Accordingly, no tools are required to release the motorized window treatment 1610 from the locked position to enter the service position. Alternatively, the release buttons 1672 may be implemented as pull-tabs or the motorized window treatment 1610 could comprise latches that require tools to be unlatched. To accommodate larger cellular shade fabrics and longer headrails, additional mounting brackets 1670 may be provided along the length of the headrail 114 (i.e., the mounting brackets provide a scalable solution).

FIG. 34A is an enlarged perspective view of one of the mounting brackets 1670 in the locked position. FIG. 34B is an enlarged perspective view of the mounting bracket 1670 in the service position. The mounting bracket 1670 comprises a fixed mounting portion 1674 and a pivoting portion 1675 that is rotatably coupled to the mounting portion 1674 via an axle rod 1676. The mounting portion 1674 is adapted to be fastened to a vertical surface (e.g., a wall) via screws (not shown) received through mounting holes 1678 or to be fastened to a horizontal surface (e.g., a ceiling or the top of an opening) via screws received through mounting holes 1679. The rotating portion 1675 is adapted to be connected to the headrail 114 of the motorized window treatment 1610 via a lip 1680 and a clip 1682. Specifically, the internal side 122 of the headrail 114 is adapted to rest on the lip 1680 (as shown in FIG. 33A) and the bottom side of the external side 124 of the headrail is adapted to snap into the clip 1682 and fixedly attached to the rotating portion 1675. When a user actuates the release button 1672, the rotating portion 1675 is operable to pivot about the axle rod 1676 thus rotating the top of the headrail 114 towards the user into the service position, such that the batteries 138 may be accessed.

As shown in FIG. 32B, the axle rod 1676 about which the rotating portion 1675 pivots is located behind and below the headrail 114, such that when the motorized window treatment 1610 is released from the locked position, the center of gravity of the headrail causes the top of the headrail to rotate down on its own (i.e., without the need for the user to physically rotate the top of the headrail towards the user) with or without the batteries 138 installed in the headrail. The axle rod 1676 is positioned above the weighting element 116 (i.e., behind the cellular shade fabric 112) when the motorized window treatment 1610 is in the fully-open position $P_{FULLY-OPEN}$, such that the mounting brackets 1670 cannot be seen by the user.

Each mounting bracket 1670 further comprises a spring 1684 (FIG. 34A), which is wound around the axle rod 1676 and comprises an inside leg 1685 that is positioned on the inner side of the rotating portion 1675 and an outside leg (not shown) that is positioned on the outer side of the mounting portion 1674. The spring 1684 operates to provide a controlled movement of the motorized window treatment 1610 when the headrail 114 is released from the locked position and the rotating portion 1675 rotates about the axle rod 1676 into the service position. The inside leg 1685 contacts the rotating portion 1675 and the outside leg contacts the mounting portion 1674 to bias the rotating portion towards the mounting portion. The spring 1684 is sized such that the headrail 114 rotates down on its own, but does not rotate so far that the batteries 138 are able to fall out of the headrail. Since the user may individually actuate the buttons 1672 of the mounting brackets 1670 to cause the headrail 114 move into the service position, the user only needs one free hand available to move the motorized window treatment 1610 into the service position and change the batteries 138 (i.e., the other hand may be used to balance the user, for example, by holding onto a ladder).

Figure 35B:
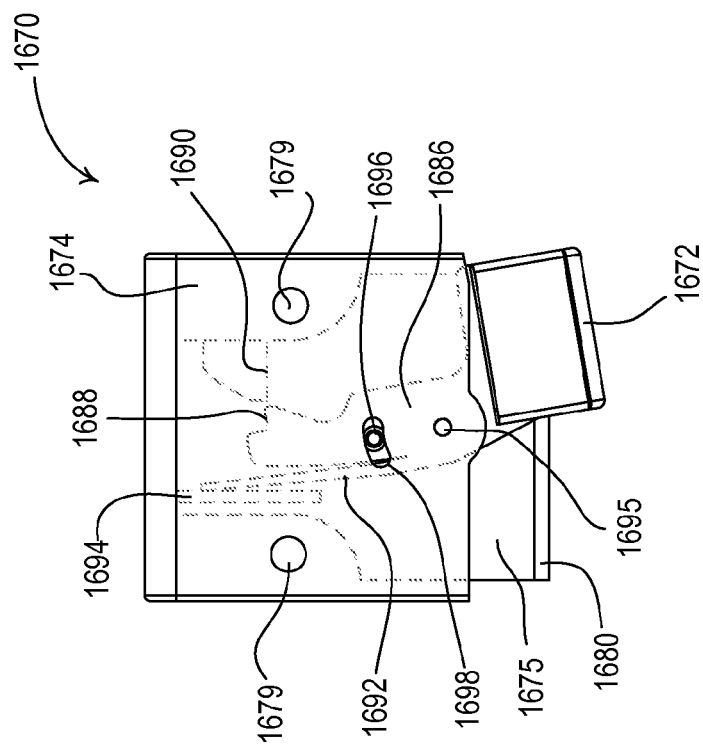
FIG. 35B is a top view of the mounting bracket of FIG. 34A as a release button is being actuated to release mounting bracket from the locked position.
Figure 35A:
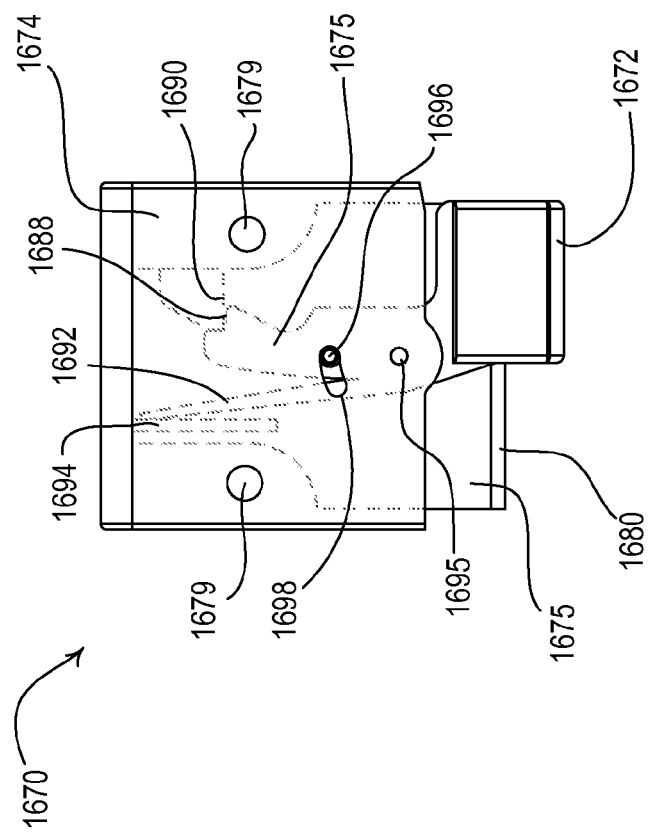
FIG. 35A is a top view of one of the mounting brackets of FIG. 34A in the locked position showing a latch mechanism in greater detail.

Each mounting bracket 1670 further comprises a latch mechanism 1686 (FIG. 34B) coupled to the respective button 1672. The latch mechanism 1686 locks the rotating portion 1675 in the locked position, and releases the rotating portion to allow the headrail 114 to move into the service position in response to an actuation of the release button 1672. FIG. 35A is a top view of one of the mounting brackets 1670 in the locked position showing the latch mechanism 1686 in greater detail. FIG. 35B is a top view of the mounting bracket 1670 as the release button 1672 is being actuated to release the rotating portion 1675 from the locked position. The latch mechanism 1686 comprises a notch 1688 adapted to contact a locking surface 1690 (FIG. 34B) of the rotating portion 1675 to hold the rotating portion in the locked position. The latch mechanism 1686 further comprises an elongated spring member 1692 adapted to push against a wall 1694 of the mounting portion 1674 to thus keep the notch 1688 locked against the locking surface 1690. When the release button 1672 is pushed in towards the mounting bracket 1670, the latch mechanism 1686 rotates about a rivet 1695, a pin 1696 travels through a channel 1698 to guide the movement of the latch mechanism, and the spring member 1692 flexes against the wall 1694. Accordingly, the notch 1688 of the latch mechanism 1686 no longer contacts the locking surface 1690 of the rotating portion 1675, such that the rotating portion and the headrail 114 are able to rotate freely about the axle rod 1676.

While the present invention has been described with reference to the battery-powered motorized window treatments having the cellular shade fabric 112, the concepts of the present invention could be applied to other types of motorized window treatments, such as, for example, roller shades, draperies, Roman shades, Venetian blinds, and tensioned roller shade systems. An example of a roller shade system is described in greater detail in commonly-assigned U.S. Pat. No. 6,983,783, issued Jan. 10, 2006, entitled MOTORIZED SHADE CONTROL SYSTEM, the entire disclosure of which is hereby incorporated by reference. An example of a drapery system is described in greater detail in commonly-assigned U.S. Pat. No. 6,994,145, issued Feb. 7, 2006, entitled MOTORIZED DRAPERY PULL SYSTEM, the entire disclosure of which is hereby incorporated by reference. An example of a Roman shade system is described in greater detail in commonly-assigned U.S. patent application Ser. No. 12/784,096, filed Mar. 20, 2010, entitled ROMAN SHADE SYSTEM, the entire disclosure of which is hereby incorporated by reference. An example of a Venetian blind system is described in greater detail in commonly-assigned U.S. patent application Ser. No. 13/233,828, filed Sep. 15, 2011, entitled MOTORIZED VENETIAN BLIND SYSTEM, the entire disclosure of which is hereby incorporated by reference. An example of a tensioned roller shade system is described in greater detail in commonly-assigned U.S. Pat. No. 8,056,601, issued Nov. 15, 2011, entitled SELF-CONTAINED TENSIONED ROLLER SHADE SYSTEM, the entire disclosure of which is hereby incorporated by reference.

Additional procedures for controlling motorized window treatments are described in greater detail in commonly-assigned, co-pending U.S. patent application Ser. No. 12/563,786, filed Aug. 11, 2009, entitled METHOD OF AUTOMATICALLY CONTROLLING A MOTORIZED WINDOW TREATMENT WHILE MINIMIZING OCCUPANT DISTRACTIONS, and U.S. patent application Ser. No. 12/845,016, filed Jul. 28, 2010, entitled LOAD CONTROL SYSTEM HAVING AN ENERGY SAVINGS MODE, the entire disclosures of which are hereby incorporated by reference.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A motorized window treatment comprising:
a headrail having first and second opposite ends;
a covering material having a top end connected to the headrail, the covering material extending from the headrail to a bottom end;
a motor drive unit including a motor and located in the center of the headrail;
two drive shafts extending from both sides of the motor drive unit and rotatably coupled to the motor drive unit thereby allowing rotations of the motor to result in rotations of the drive shafts;
first and second lift cords, the first lift cord located proximate to the first opposite end of the headrail and the second lift cord located proximate to the second opposite end of the headrail, each lift cord rotatably received around a respective one of the drive shafts and extending vertically to the bottom end of the covering material; and
at least a first compartment and a second compartment configured to hold respective first and second batteries for powering the motor drive unit, the first and second compartments located on each side of the motor drive unit, the first compartment located between the first opposite end of the headrail and the first lift cord, and the second compartment located between the second opposite end of the headrail and the second lift cord;
wherein the motor drive unit is configured to rotate the drive shaft to adjust the bottom end of the covering material between a fully-closed position and a fully-open position in response to rotations of the drive shaft, the motor drive unit further configured to receive radio-frequency (RF) signals and to control the motor in response to the received RF signals.

2. The motorized window treatment of claim 1, wherein the motor drive unit comprises an RF receiver configured to receive RF signals.

3. The motorized window treatment of claim 2, further comprising a battery-powered supply that includes the first and second batteries and generates a battery voltage.

4. The motorized window treatment of claim 3, wherein the motor drive unit is configured to monitor the magnitude of the battery voltage of the battery-powered supply, the battery-powered supply configured to enter a low-battery mode when the magnitude of the battery voltage drops below a first predetermined low-battery threshold.

5. The motorized window treatment of claim 4, wherein the RF receiver comprises an RF transceiver configured to transmit and receive RF signals.

6. The motorized window treatment of claim 5, wherein the motor drive unit is configured to transmit a digital message representative of the magnitude of the battery voltage.

7. The motorized window treatment of claim 5, wherein the motor drive unit is configured to transmit a digital message indicating that the battery voltage is low via the RF signals when operating in the low-battery mode.

8. The motorized window treatment of claim 4, wherein the RF receiver is disabled in the low-battery mode.

9. The motorized window treatment of claim 3, wherein the at least two batteries are electrically coupled in series to generate the battery voltage to power the motor drive unit.

10. The motorized window treatment of claim 9, wherein the motor drive unit comprises a positive-temperature coefficient thermistor coupled in series with the batteries for limiting the current drawn from the batteries.

11. The motorized window treatment of claim 3, wherein the motor drive unit is configured to prevent the motor from operating to lower the covering material until an upper limit for the covering material is reset after a loss of power.

12. The motorized window treatment of claim 9, wherein the at least two batteries comprise at least four D-cell batteries.

13. The motorized window treatment of claim 9, wherein the batteries have a lifetime of approximately three years.

14. The motorized window treatment of claim 2, wherein the motor drive unit further comprises a room-side interior temperature sensor configured to measure an interior temperature representative of the temperature in the room in which the window treatment is installed.

15. The motorized window treatment of claim 14, wherein the motor drive unit further comprises a window-side temperature sensor configured to measure an external temperature representative of the temperature outside a window in front of which the motorized window treatment is located.

16. The motorized window treatment of claim 15, wherein the RF receiver comprises an RF transceiver configured to transmit and receive RF signals, the motor drive unit configured to wirelessly transmit the exterior temperature via the RF signals.

17. The motorized window treatment of claim 15, wherein the motor drive unit is configured to adjust the position of the bottom end of the covering material in response to the external and internal temperatures.

18. The motorized window treatment of claim 14, wherein the RF receiver comprises an RF transceiver configured to transmit and receive RF signals, the motor drive unit configured to wirelessly transmit the interior temperature via the RF signals.

19. The motorized window treatment of claim 1, wherein the motor drive unit further comprises an H-bridge drive circuit and a controller, the controller configured to provide pulse width modulated (PWM) control signals to the H-bridge drive circuit for driving the motor to control the rotational speed of the motor.

20. The motorized window treatment of claim 19, wherein the controller is configured to ramp the rotational speed of the motor up from zero to a desired rotational speed across a ramp time when starting the motor from a stopped condition.

21. The motorized window treatment of claim 19, wherein the PWM control signals increase in duty cycle as the covering material is raised from the midway position to the fully-open position and when the covering material is lowered from the midway position to the fully-closed position.

22. The motorized window treatment of claim 1, wherein the motor drive unit further comprises a gear assembly operatively coupled to an output shaft of the motor and two output gears located on each side of the motor drive unit, each of the output gears coupled to one of the drive shafts, the motor drive unit further comprising a coupling member coupled between the gear assembly and the output gears allowing rotations of the output shaft of the motor to result in rotations of the drive shafts.

23. The motorized window treatment of claim 1, wherein the motor drive unit is configured to receive the RF signals from an RF transmitter, the RF transmitter comprising one of a battery-powered remote control, an occupancy sensor, a vacancy sensor, a daylight sensor, a temperature sensor, a humidity sensor, a security sensor, a proximity sensor, a keypad, a key fob, a cell phone, a smart phone, a tablet, a personal digital assistant, a personal computer, a timeclock, an audio-visual control, a safety device, a central control transmitter, or any combination of these RF transmitters.

24. A motor drive unit for a motorized window treatment, the motorized window treatment including a covering material, a drive shaft, and at least one lift cord rotatably received around the drive shaft and extending to a bottom of the covering material for raising and lowering the covering material, the motorized window treatment further comprising a battery-powered supply having at least one battery producing a battery voltage to power the motor drive unit, the motor drive unit comprising:
a motor; and
a controller configured to control the motor to rotate the drive shaft to raise and lower the covering material in response to received radio-frequency (RF) signals;
wherein the controller is configured to monitor the magnitude of the battery voltage of the battery-powered supply when the motor is not raising or lowering the covering material, the controller configured to enter a low-battery mode when the magnitude of the battery voltage drops below a first predetermined low-battery threshold and to move the covering material at a reduced speed in the low-battery mode.

25. The motor drive unit of claim 24, further comprising:
an RF receiver coupled to the controller and configured to receive RF signals.

26. The motor drive unit of claim 25, wherein the RF receiver comprises an RF transceiver configured to transmit and receive RF signals.

27. The motor drive unit of claim 26, wherein the controller is configured to transmit a digital message representative of the magnitude of the battery voltage.

28. The motor drive unit of claim 26, wherein the controller is configured to transmit a digital message indicating that the battery voltage is low via the RF signals when operating in the low-battery mode.

29. The motor drive unit of claim 25, wherein the RF transceiver is disabled in the low-battery mode.

30. A motorized window treatment comprising:
a covering material;
a motor drive unit configured to move the covering material between a fully-open position and a fully-closed position in response to received radio-frequency (RF) signals;
a battery-powered supply connected to and providing a voltage for powering the motor drive unit; and
wherein the motor drive unit is configured to determine when the magnitude of the voltage is too low for continued operation and reserve enough energy in the battery to allow for at least one additional movement of the covering material to the fully-open position.

31. The motorized window treatment of claim 30, wherein the motor drive unit comprises a motor coupled to the covering material and configured to adjust the position of the covering material to any position and a controller electrically connected to and configured to control the motor.

32. The motorized window treatment of claim 31, wherein the motor drive unit comprises an RF receiver configured to receive RF signals, the controller configured to disable the RF receiver when the magnitude of the voltage is too low for continued operation.

33. A motor drive unit for a motorized window treatment, the motorized window treatment including a covering material, a drive shaft, and at least one lift cord rotatably received around the drive shaft and extending to a bottom of the covering material for raising and lowering the covering material between a fully-open and fully-closed position and to any position intermediate the fully-open and fully-closed positions, the motorized window treatment further comprising a battery-powered supply having at least one battery for generating a battery voltage for powering the motor drive unit, the motor drive unit comprising:
a motor;
a controller configured to control the motor to rotate the drive shaft to raise and lower the covering material in response to received radio-frequency (RF) signals; and
a power supply configured to generate a DC supply voltage from the battery voltage, the DC supply voltage having a first nominal magnitude for powering the controller;
wherein the controller is configured to increase the magnitude of the DC supply voltage to a second increased magnitude greater than the first magnitude when the controller is driving the motor to rotate the drive shaft.

34. The motor drive unit of claim 33, further comprising:
an RF receiver coupled to the controller and configured to receive RF signals.

35. The motor drive unit of claim 34, wherein the RF receiver comprises an RF transceiver configured to transmit and receive RF signals, the controller configured to cause the RF transceiver to transmit a digital message representative of the battery voltage via the RF signals.

36. The motor drive unit of claim 34, wherein the RF receiver is configured to receive the RF signals from an RF transmitter, the RF transmitter comprising one of a battery-powered remote control, an occupancy sensor, a vacancy sensor, a daylight sensor, a temperature sensor, a humidity sensor, a security sensor, a proximity sensor, a keypad, a key fob, a cell phone, a smart phone, a tablet, a personal digital assistant, a personal computer, a timeclock, an audio-visual control, a safety device, a central control transmitter, or any combination of these RF transmitters.

37. The motor drive unit of claim 33, wherein the motor is connected to and powered directly from the battery voltage.

38. A motorized window treatment comprising:
a covering material for the window, the covering material moveable between a fully-open and fully-closed position and to any position intermediate the fully-open and fully-closed positions:
a drive shaft;
at least one lift cord rotatably received around the drive shaft and extending to a bottom of the covering material for raising and lowering the covering material;
a motor drive unit having a motor coupled to the drive shaft to rotate the drive shaft to raise and lower the covering material, the motor drive unit having a sensor arrangement coupled to the drive shaft to sense movement of the drive shaft and used to determine the position of the bottom of the covering material, the motor drive unit having a controller electrically coupled to the sensor arrangement to determine the position of the bottom of the covering material between the fully-open and fully-closed positions from at least one sensor signal from the sensor arrangement, the motor drive unit having a memory coupled to the controller to store position data related to the determined position, the controller configured to control the motor to raise and lower the covering material in response to received radio-frequency (RF) signal;
a battery-powered supply configured to power the motor drive unit;
a supplemental power source for the control unit, the supplemental power source configured to maintain a charged voltage for a period of time adequate to maintain the position data when the battery-powered supply is removed and changed;
whereby the battery-powered supply can be removed without loss of the position data.

39. The motorized window treatment of claim 38, wherein the RF signals are received from an RF remote control.

40. The motorized window treatment of claim 39, wherein the fully-open and fully-closed positions of the motorized window treatment may be adjusted by actuating one or more buttons on the remote control.

41. The motorized window treatment of claim 40, wherein the remote control is associated with the motorized window treatment by actuating an actuator on the motor drive unit and then actuating at least one of the buttons on the remote control.

42. The motorized window treatment of claim 39, further comprising:
an RF receiver coupled to the controller and configured to receive the RF signals.

43. The motorized window treatment of claim 39, further comprising:
an RF transceiver coupled to the controller and configured to transmit and receive RF signals.

44. The motorized window treatment of claim 38, wherein the supplemental power source comprises a capacitor coupled to the battery-powered supply.

45. The motorized window treatment of claim 38, wherein the supplemental power source comprises a further battery coupled to the control unit for providing power to the control unit to maintain power to the control unit when the battery-powered supply is removed.

46. The motorized window treatment of claim 38, wherein the memory comprises an internal memory of the controller.

47. A motorized window treatment comprising:
a covering material for a window moveable between a fully-open and a fully-closed position and any position intermediate the fully-open and fully-closed positions:
a drive shaft;
at least one lift cord rotatably received around the drive shaft and extending to a bottom of the covering material for raising and lowering the covering material;
a motor drive unit having a motor coupled to the drive shaft to rotate the drive shaft to raise and lower the covering material, the motor drive unit having a sensor arrangement coupled to the drive shaft to sense movement of the drive shaft and used to determine the position of the bottom of the covering material, the motor drive unit having a controller electrically coupled to the sensor arrangement to determine the position of the bottom of the covering material between the fully-open and fully-closed positions from at least one sensor signal from the sensor arrangement, the controller configured to control the motor to raise and lower the covering material in response to received radio-frequency (RF) signals;
wherein the covering material is engageable by a user to manually position the covering material at any position between the fully-open and fully-closed positions and wherein the sensor arrangement provides the at least one sensor signal to the controller so that the controller can determine the position of the covering material when the covering material is manually adjusted.

48. The motorized window treatment of claim 47, wherein the controller further comprises a microprocessor having a sleep mode, the microprocessor using reduced electrical power during the sleep mode to conserve battery power.

49. The motorized window treatment of claim 48, wherein the motor produces an electromotive force when the window treatment is moved manually, the microprocessor configured to be responsive to the electromotive force to cause the microprocessor to change from the sleep mode to an active mode, the microprocessor configured to receive and process the sensor signal to determine the position of the covering material when the covering material is manually adjusted.

50. The motorized window treatment of claim 48, wherein the motor drive unit comprises an RF receiver configured to receive RF signals, the controller configured to control the RF receiver into a sleep mode in which the RF receiver consumes less power.

51. A motorized window treatment comprising:
a covering material;
a drive shaft;
at least one lift cord rotatably received around the drive shaft and arranged to extend to a bottom end of the covering material in such a way that the lift cord provides a torque on the drive shaft;

a motor drive unit having a motor coupled to the drive shaft and configured to rotate the drive shaft to raise and lower the covering material in response to received radio-frequency (RF) signals, the motor drive unit configured to rotate the drive shaft to raise and lower the covering material between a fully-open position and a fully-closed position in response to the received RF signals; and a spring assist assembly coupled to the drive shaft and configured to provide a constant amount of torque on the drive shaft in a direction opposite a direction of the torque provided on the drive shaft by the lift cord;

wherein an amount of energy required by the motor to drive the drive shaft is reduced by the spring assist assembly, and the constant amount of torque provided by the spring assist assembly is approximately equal to the torque provided on the drive shaft by the at least one lift cord when the bottom end of the covering material is positioned half-way between the fully-open position and the fully-closed position.

52. The motorized window treatment of claim 51, wherein an amount of energy required by the motor to drive the drive shaft is reduced by the spring assist assembly such that net energy is provided by the motor to raise the covering material during approximately half the distance between the fully-closed and fully-open position.

53. The motorized window treatment of claim 52, wherein net energy is provided by the motor when the covering material is raised between half-way and the fully-open position and when the covering material is lowered between half-way and the fully-closed position.

54. The motorized window treatment of claim 51, further comprising:

a plurality of batteries coupled in series and configured to generate a battery voltage for powering the motor drive unit.

55. The motorized window treatment of claim 54, wherein the batteries have a lifetime of approximately three years.

56. The motorized window treatment of claim 55, wherein the batteries comprise at least four D-cell batteries.

57. The motorized window treatment of claim 51, wherein the motor drive unit further comprises an RF receiver configured to receive the RF signals.

58. The motorized window treatment of claim 57, wherein the controller comprises a microprocessor configured to receive signals from the RF receiver and to control the RF receiver, the processor configured to control the RF receiver to place the RF receiver in a low power mode or turn the RF receiver off to conserve battery power.

59. The motorized window treatment of claim 51, wherein the motor drive unit further comprises an RF transceiver configured to transmit and receive RF signals.

60. The motorized window treatment of claim 51, wherein the spring assist assembly comprises a constant-force spring configured to provide the constant amount of torque on the drive shaft in a direction opposite a direction of the torque provided on the drive shaft by the lift cord.

61. The motorized window treatment of claim 51, wherein the spring assist assembly is configured provide a torque to the drive shaft to raise the covering material to a position approximately midway between the fully-closed and fully-open position without substantial energy being provided by the motor, the spring assist assembly configured to assist the motor to raise the covering material above the midway position to the fully-open position, the spring assist assembly configured to provide a torque on the drive shaft resisting downward motion of the covering material when the covering material is lowered from the fully-open position to the fully-closed position.

62. The motorized window treatment of claim 61, wherein the motor is configured to provide a torque on the drive shaft to wind up the spring assist unit when the covering material is lowered from the midway position to the fully-closed position.

\* \* \* \* \*